(12) United States Patent
Iyer et al.

(10) Patent No.: US 11,343,243 B2
(45) Date of Patent: May 24, 2022

(54) MACHINE-TO-MACHINE STREAMING AUTHENTICATION OF NETWORK ELEMENTS

(71) Applicant: CORSHA, INC., Vienna, VA (US)

(72) Inventors: Anusha Iyer, Vienna, VA (US); Christopher Simkins, McLean, VA (US)

(73) Assignee: CORSHA, INC., Vienna, VA (US)

( * ) Notice: Subject to any disclaimer, the term of this patent is extended or adjusted under 35 U.S.C. 154(b) by 219 days.

(21) Appl. No.: 16/653,506

(22) Filed: Oct. 15, 2019

(65) Prior Publication Data

US 2020/0244652 A1 Jul. 30, 2020

Related U.S. Application Data

(63) Continuation-in-part of application No. 16/110,536, filed on Aug. 23, 2018, now Pat. No. 10,992,651.

(60) Provisional application No. 62/745,037, filed on Oct. 12, 2018, provisional application No. 62/582,177, filed on Nov. 6, 2017, provisional application No. 62/549,259, filed on Aug. 23, 2017.

(51) Int. Cl.
*H04L 29/06* (2006.01)
*H04W 4/70* (2018.01)
*H04L 9/32* (2006.01)
*H04L 9/06* (2006.01)

(52) U.S. Cl.
CPC ........ *H04L 63/0869* (2013.01); *H04L 9/0637* (2013.01); *H04L 9/3247* (2013.01); *H04L 9/3273* (2013.01); *H04W 4/70* (2018.02); *H04L 2209/38* (2013.01)

(58) Field of Classification Search
CPC . H04L 63/0869; H04L 9/3247; H04L 9/0637; H04L 9/3273; H04L 2209/38; H04L 9/3239; H04L 67/1097; H04L 9/0861; H04L 63/083; H04W 4/70; H04W 12/06; H04W 4/027; H04W 4/40; G06F 21/602; G06F 21/105
See application file for complete search history.

(56) References Cited

U.S. PATENT DOCUMENTS

2006/0095783 A1 5/2006 Nunnelley
2009/0276803 A1 11/2009 Weaver
(Continued)

OTHER PUBLICATIONS

Written Opinion issued by the International Bureau in corresponding International Application No. PCT/US2018/047698, dated Dec. 10, 2018.
(Continued)

*Primary Examiner* — Abu S Sholeman
(74) *Attorney, Agent, or Firm* — Sughrue Mion, PLLC

(57) ABSTRACT

A system for providing dynamic, multi-factor authentication for machine-to-machine connections using unique authentication streams of chained, cryptographic blocks or codes by generating and managing a root authentication stream of chained cryptographic blocks representing an enterprise. The root authentication stream may be utilized by deployed machine instances to instantiate the unique authentication streams for each of the deployed machine instances, thereby enabling secure and continuous authentication for the machine-to-machine connections.

12 Claims, 26 Drawing Sheets

(56) References Cited

U.S. PATENT DOCUMENTS

| | | | |
|---|---|---|---|
| 2010/0169640 A1* | 7/2010 | Smith | H04L 63/0815 |
| | | | 713/155 |
| 2013/0275376 A1* | 10/2013 | Hudlow | G07F 17/3241 |
| | | | 707/639 |
| 2015/0186657 A1* | 7/2015 | Nakhjiri | H04L 9/0894 |
| | | | 713/155 |
| 2015/0215777 A1 | 7/2015 | Si et al. | |
| 2015/0326632 A1 | 11/2015 | Lammers et al. | |
| 2015/0370584 A1 | 12/2015 | Ito | |
| 2016/0204942 A1 | 7/2016 | Bohli et al. | |
| 2017/0220672 A1 | 8/2017 | Sainani et al. | |
| 2017/0236132 A1 | 8/2017 | Haxholdt et al. | |
| 2018/0270777 A1* | 9/2018 | Zhang | H04L 61/1588 |

OTHER PUBLICATIONS

International Search Report, issued by International Searching Authority in corresponding International Application No. PCT/US2018/047698, dated Dec. 10, 2018.

Hyong, "Progressive Query Processing", A Thesis Submitted for the Degree of Doctor of Philosophy School of Computing National University of Singapore 2008 (224 pages total).

* cited by examiner

FIG. 11A Initialize a Root Stream for an Organization
An Organization sets up Corsha for the first time in their Enterprise. They need to initialize and set off a root Stream that is continually updated and leveraged to deploy other streams in the organization.
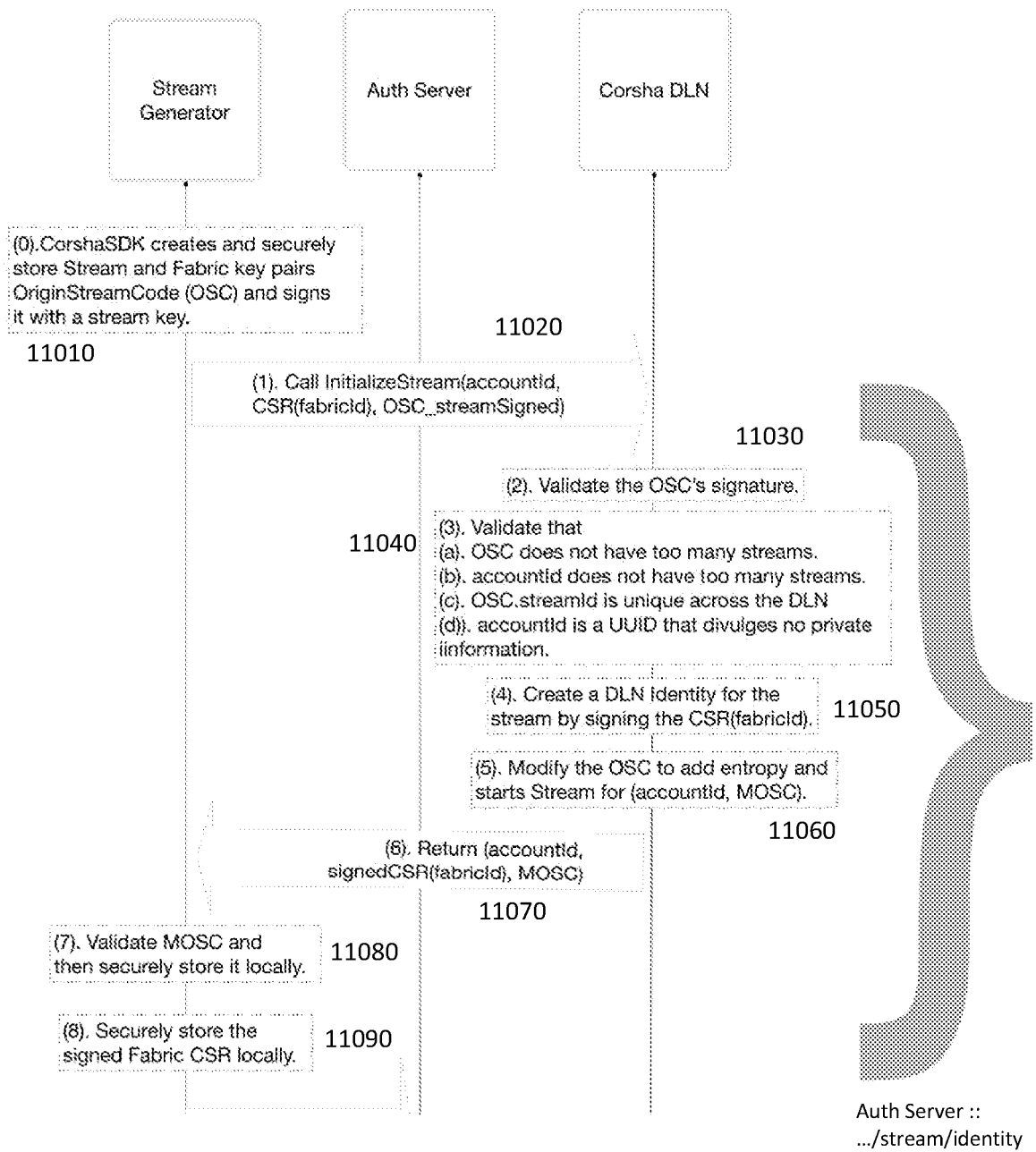
Auth Server ::
.../stream/identity FIG. 11B Initialize a Root Stream for an Organization
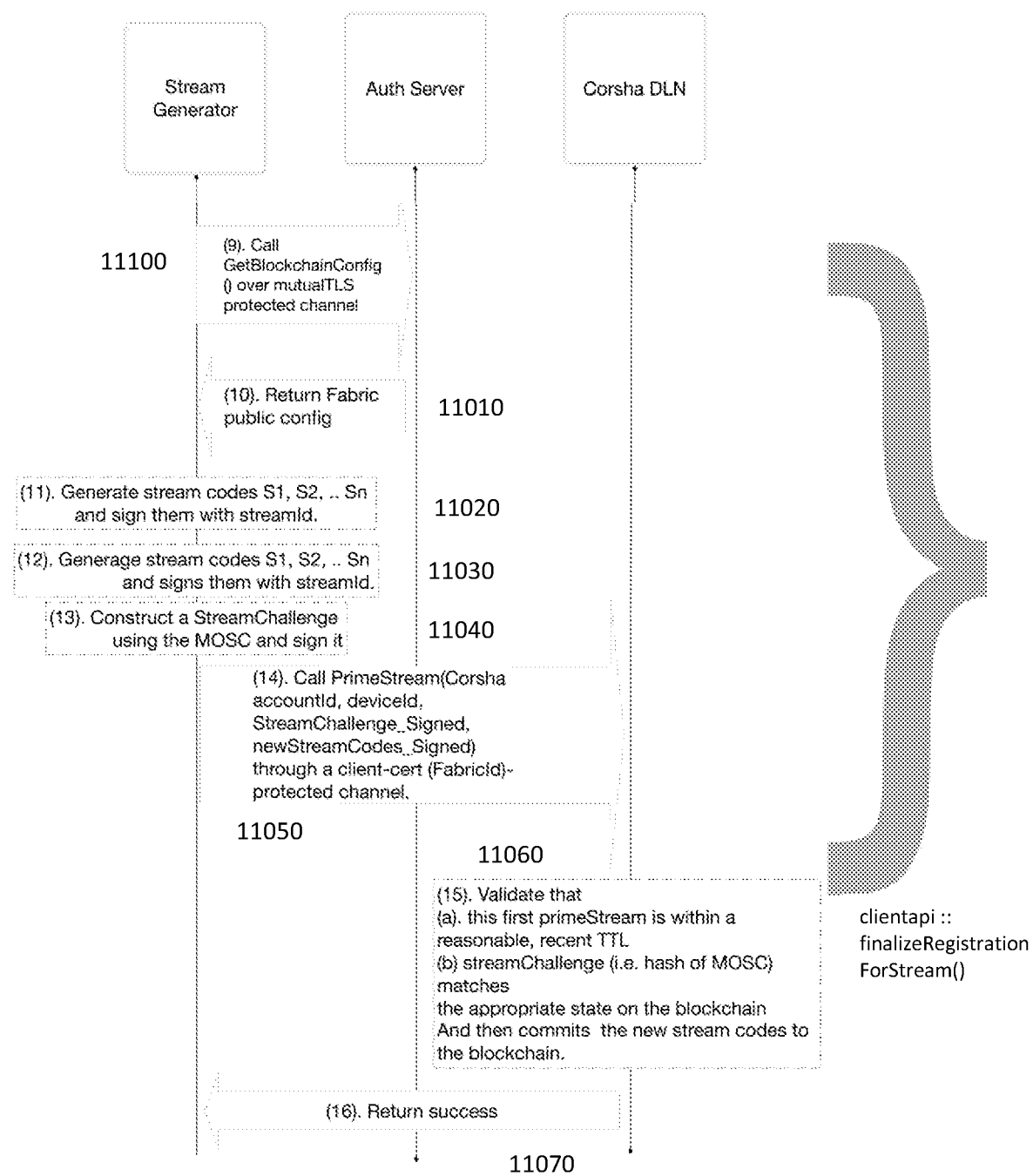

Customer enterprise stream evolution

Authenticate from Machine to Application Server
Machine Authenticator attempts to authenticate to an application server. This is a simple version of the workflow where the StreamChallenge is the last n stream codes in the Authenticator's stream.

MACHINE-TO-MACHINE STREAMING AUTHENTICATION OF NETWORK ELEMENTS

CROSS-REFERENCE TO RELATED APPLICATIONS

This application claims the benefit of U.S. Provisional Patent Application No. 62/745,037 filed on Oct. 12, 2018, and this application is a Continuation-in-Part of U.S. patent application Ser. No. 16/110,536, which claims the benefit of U.S. Provisional Patent Application No. 62/549,259 filed on Aug. 23, 2017, U.S. Provisional Patent Application No. 62/582,177 filed on Nov. 6, 2017, the disclosures of which are herein incorporated by reference in their entireties.

BACKGROUND

With the increasing adoption of technologies such as containerization and automated orchestration of software running on third party elements, microservice architectures, expansive Internet of Things (IoT) deployments and engineering workflows around contiguous integration and continuous deployment, API-based access to software running in diverse, hybrid deployment contexts is a crucial aspect of software-as-a-service (SaaS) and cloud-based software product offerings. Diverse, hybrid deployment contexts may include on-premise network elements, third party network elements such as public cloud platforms, private datacenters, virtual servers, IoT devices, mobile devices, orchestration platforms such as Terraform or Kubernetes. When adopted, while traditional multi-factor authentication ("MFA") solutions act as additional authentication factors for human accounts, these solutions do not apply for machine-to-machine authentication, such as API-based authentication. Accordingly, for machine-to-machine based authentication, what is required for a suitable MFA factor is an automated approach that does not rely on human action or any human or device attributes.

SUMMARY

According to an embodiment, there is provided a system for machine-to-machine authentication, including a stream generator configured to generate a root enterprise authentication stream of an enterprise, the root enterprise authentication stream including a plurality of enterprise stream blocks, and configured to generate a machine authentication stream of a machine configured to access a resource of the enterprise, the machine authentication stream including a plurality of machine stream blocks generated based on at least one enterprise stream block among the plurality of enterprise stream blocks.

The stream generator may be configured to generate the machine authentication stream based on a fork of the root enterprise authentication stream.

The at least one machine stream block of the plurality of machine stream blocks may be a fork of the at least one enterprise stream block.

The system may further include a primer including a system that couples the machine authenticator with the machine at a time of deployment of the machine to service the machine with stream challenge requests, complete stream registration to the machine authentication stream, and manage the machine authentication stream.

The primer may be configured to request the stream generator to generate the machine authentication stream based on a machine identifier of the machine, a job identifier of the job, or an environmental variable secret associated with at least one of the machine or the job.

The stream generator may be further configured to initialize the root enterprise authentication stream to a distributed ledger network comprising a plurality of distributed nodes, each node among the plurality of distributed nodes storing the plurality of enterprise stream blocks.

The system may further include a memory configured to securely store the plurality of enterprise stream blocks.

The stream generator may be further configured to select the plurality of enterprise stream blocks, sign the plurality of enterprise stream blocks with a signing key associated with the root enterprise authentication stream, and transmit the plurality of enterprise stream blocks signed with the signing key to the distributed network ledger.

The system may further include an authentication server configured to receive a root stream challenge, from an authenticator of the machine, to initialize the machine authentication stream based on at least one enterprise stream block, verify the root stream challenge based on verification of the at least one enterprise stream block by the distributed ledger network, and initialize the machine authentication stream based on a result of the verification.

The authenticator may be configured to transmit the plurality of machine stream blocks to the distributed network ledger based on the initialized machine authentication stream, to commit the plurality of machine stream blocks to the distributed network ledger.

The plurality of machine stream blocks may include at least one first machine stream block based on the at least one enterprise stream block and at least one second machine stream block generated by the authenticator of the machine.

The resource may be an application server of the enterprise. The authentication server may be further configured to receive a stream challenge for credentials to access the application server from the authenticator, the stream challenge including a payload of a hash value of recently written machine stream blocks from among the plurality of machine stream blocks recently written to the machine authentication stream or the recently written selected machine stream blocks, to verify the stream challenge based on verification of the payload by the distributed ledger network, and to return an authentication result to the authenticator based on a result of the verification of the payload. The machine accesses the application server based the authentication result.

BRIEF DESCRIPTION OF THE DRAWINGS

The drawings constitute part of this specification and illustrate example implementations of authentication using chained identifiers.

FIGS. 11A and 11B illustrate a method of initializing a root stream for an organization according to an embodiment of the disclosure;

DETAILED DESCRIPTION

This disclosure relates to a system and method for authentication using streams of chained identifiers, also referred to as stream blocks, and an apparatus adapted for use in such a system. One implementation of the system includes a distributed ledger as a store for the chained identifiers and a method of distributed ledger operation. The distributed ledger in one example implementation is a blockchain. For a brief overview of blockchain technology, the reader may consult, for example, United States Published Patent Application 20170366348A1. This document's discussion of blockchain technology found in paragraphs 0030 through 0031 and their associated figures are incorporated herein by this reference.

Figure 1:
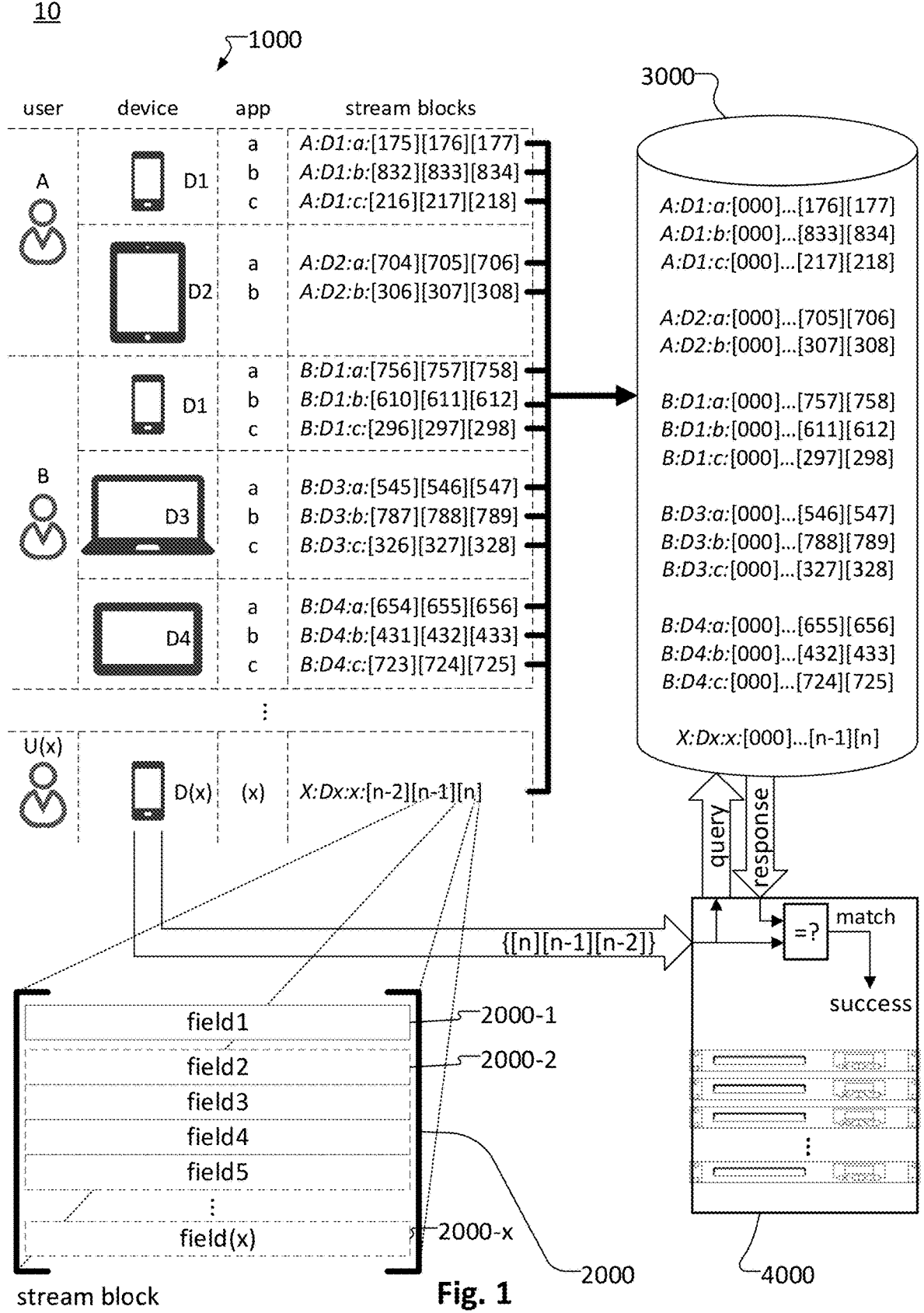
FIG. 1 provides a high level, simplified, schematic style overview of an example implementation.

FIG. 1 illustrates, in a high level, simplified, schematic style, a system 10 that performs authentication using stream blocks. FIG. 1 illustrates a user base 1000, a stream block 2000, a chained identifier store 3000, and an authentication server 4000.

See the column "user" depicted in FIG. 1. User base 1000 includes at least one user A and optionally includes other users such as user B, and optionally includes an arbitrarily large number of users. One of the users depicted in FIG. 1 is a generically representative user U(x). User U(x) represents any given user.

The one or more users each have one or more respective devices. See the column "device" in FIG. 1. For example, user A has two respective devices: device D1 and device D2. User B has three respective devices: device D1, device D3, and device D4. User U(x) has one or more respective devices including a generically representative device D(x). Device D(x) of user U(x) represents any given device of any given user.

In one example implementation of the user base 1000, two users share a common device such as a laptop or a terminal. In this example, the device D1 of user A is the same physical device as device D1 of user B and D1 represents a universally unique identifier of this particular device. In this instance the device, when used by one user, would be identified by one stream of chained identifiers. When used by the other user the device would be identified by a different stream.

In FIG. 1, a device D(x) is a discrete machine such as a smart watch, mobile phone, tablet, workstation, voice-controlled home unit, or the like. In an alternative example, the device D(x) is a browser running on a discrete machine. In yet another alternative example, the device D(x) is a smart, connected device such as a smart thermostat, a smart household appliance, a household robot such as a floor cleaner, or the like. More broadly device D(x) may be characterized as a machine, where machines may include servers, virtual or physical, pods in orchestration platforms, application containers, mobile devices, applications on mobile devices, IoT devices, etc.

Each device D(x) stores or has access to one or more applications that require authentication of the user U(x). In FIG. 1, the applications are generally depicted by lower-case letters in the column "apps" of the user base 1000. The term "apps" is not intended to be limited only to an application available from one of the popular app stores but is meant to more generally refer to any software application that involves an authentication event. In FIG. 1, user A has a respective device D1 that uses respective apps "a", "b", and "c". User A has a respective device D2 that uses respective apps "a" and "b". User B's three respective devices each use respective apps "a", "b", and "c". The device D(x) of user U(x) runs a generically representative application "(x)". App (x) of device D(x) of user U(x) represents any given application running on any given device of any given user.

See the column "stream blocks" in FIG. 1. The first row includes the following symbols in italic font: "A:D1:a:". The symbols represent, in order, an identifier "A" that signifies user A; an identifier "DI" that signifies device D1 and, in view of its position after identifier "A", further signifies device D1 of user A; an identifier "a" that signifies app "a" and, in view of its position after the identifiers "A:D1", further signifies app "a" running on device D1 of user A. Similarly, the final row in the column "stream blocks" includes the following symbols: "X:Dx:x:". These symbols signify app "x" (i.e., any given application) running on device Dx (i.e., any given device) of user U(x) (i.e., any given user). These symbols in italic font may be thought of in a general sense as explanatory indicia.

These explanatory indicia are provided for the sake of this explanation only so that the reader can more easily track how the stream blocks are created, stored, communicated, and used. For the sake of the discussion below, the explanatory indicia may also be referred to as "stream identifiers".

Each of the stream identifiers may be understood to relate, on a one-to-one basis, to a corresponding stream of stream blocks that begins with an original (or origin) stream block [000] and continues with a first stream block [001], a second stream block [002], and so on, up until a current stream block [n]. Here, the numbers in between square brackets are ordinal numbers that tell the order in which a given stream block was produced within a given stream of stream blocks.

Return to the column "stream blocks" in FIG. 1. The first row pertains to stream identifier A:D1:a:. This stream includes the symbols "[175][176][177]" representing three individual stream blocks. The stream block [177] is the one hundred seventy-seventh stream block produced for the given stream after the origin stream block [000]. In FIG. 1, the current stream block in stream identifier A:D1:a: is [177]. The first preceding stream block relative to [177] is [176]. The second preceding stream block relative to [177] is [175]. In the example shown in FIG. 1, device D1 of user A locally stores the three most recent stream blocks of stream identifier A:D1:a:. In the state shown in FIG. 1, all of the stream from [000] to [177] have been previously output from device D1 of user A. The stream blocks prior to [175] have also, in one example implementation, previously been discarded by the device.

The final row pertains to stream identifier X:Dx:x:. The device Dx of user U(x) locally stores the three most recent stream blocks of stream X:Dx:x:, namely, the current stream block [n], the first preceding stream block [n−1], and the second preceding stream block [n−2]. The number of stream blocks stored locally is configurable. Other example implementations store a number of stream blocks other than three.

The locally stored stream blocks may be thought of as a moving window into a given stream of stream blocks. For example, in the first row in the column "stream blocks", the locally-stored stream blocks include [175], [176], and [177]. At a future time, stream block [178] will be produced and communicated outside of device D1 of user A and will also be stored as one of the locally-stored stream blocks with the result that stream block [175] will no longer be considered part of the window. The window at that future time will include [176], [177], and [178]. Since the content of the three most recent stream blocks changes with each newly-generated stream block, the view of the three most recent stream blocks is thereby a moving window into the stream.

In FIG. 1, each app is authenticated using streaming blocks. Each app secured by this streaming authentication that runs on a given device has a corresponding stream of stream blocks. Each such stream begins with an origin stream block [000]. Each subsequent stream block that is produced extends the stream. Here, "stream" does not imply the nonstop generation and outputting of stream blocks. Instead, a "stream" is an ordered set of stream blocks for a given app running on a given device of a given user over time.

The moving window of each stream of stream blocks depicted in FIG. 1 is configured as three, namely, the current stream block, the first preceding stream block, and the second preceding stream block. The number of stream blocks in the moving window may be alternatively expressed as w=3 where w represents the size of the moving window and 3 indicates the number of stream blocks considered to be within the window.

Although this discussion generally explains example implementations where the moving window size is w=3, this value is configurable: in other example implementations, the moving window is a size other than w=3.

A more general expression for the set m of the stream blocks of a given stream within the moving window is given by:

$$m = \|_{i=0}^{w-1} [n-i]$$

where the ∥ operator indicates a concatenation operation or similar and where [n−i] represents the stream block in the stream having the ordinal position of the current stream block less i. Thus, for a moving window with a window size of w=10, the set m of stream blocks in the moving window includes [n][n−1][n−2] . . . [n−9]. Here, [n] is the current stream block; [n−1] is the immediate precedent of [n]; [n−2] is the immediate precedent of [n−1] and so on. The stream blocks are stored, in one implementation, in a secure local storage. The stream blocks are stored, in various implementations, in a ring data structure, a list data structure, a queue data structure, or the like.

FIG. 1 shows a more detailed view of an example of a given stream block 2000 according to one example. The stream block 2000 includes one or more fields identified as field1 2000-1, field2 2000-2, etc., up to the final field field(x) 2000-x. The fields of stream block 2000 are shown stacked one on top of the other for the sake of explanation and understandability. The fields are shown as having an identical length, but this too is only for the sake of explanation and does not imply that the actual fields need to be the same length. The fields are shown in order from 1 to x, but this does not imply any particular importance unless stated otherwise below.

In one example, the stream block 2000 may be thought of as a block of information that has a number of fields. The fields, according to this example implementation, contain (1) a version number that designates the format of the block; (2) a sequence number for the block; (3) a timestamp taken from when the block was created; (4) an identifier for the user or account; (5) an identifier for the device; (6) an identifier for the app on this device when used by the indicated user (also referred to as a number); (7) a hash of the immediately preceding block from the same stream identifier; and (8) a random number that changes with each block and adds cryptographic entropy to the block. The first through eighth fields are hashed to form another field: (9) a hash of the current block. In one implementation, the block is signed with a private key. In other implementations, the transport network that carries the block is trusted at a level that precludes the need to sign the block. The fields, taken together, constitute a "stream block" (here, the term "stream block" is used to distinguish this type of block from other blocks such as the chain block discussed later).

In the one example just described, certain fields (field4, field5, and field6) contain information that could be used to identify a particular user. In other words, such fields contain personally identifiable information (PII).

In an alternative implementation, these fields are replaced with random numbers generated as unique identifiers. The correspondence, between these random numbers generated as unique identifiers to logical user accounts, for a given app, is maintained in a location (such as customer account registry 4700 described below) that maximizes the protection of the PII of user U(x). In this alternative implementation, no PII is transmitted.

In detail, the fields, according to this alternative implementation, contain (1) a version number that designates the format of the block; (2) a sequence number for the block; (3) a timestamp taken from when the block was created; (4) a random number generated as a unique identifier for the user or account, that is, an account identifier; (5) a random number generated as a unique identifier for the device; (6) a random number generated as a unique identifier for the app on this device when used by the indicated user (also referred to as a number); (7) a hash of the immediately preceding block from the same stream identifier; and (8) a random number generated as a cryptographic 'salt' to increase entropy. The first through eighth fields are hashed to form another field: (9) a hash of the current block.

Here, the stream blocks contain indications of the user, a device of the user, and an app of the device. Since the indications are random numbers the indications are free of personally identifiable information.

In the one example implementation and the alternative implementation just described, each stream block is generated from a given stream identifier and is unique to the user U(x), the device D(x), and the app (x). Each stream block therefore is an identifier for the user operating the app on the device. Since each current stream block (other than origin stream blocks) contains a hash of its first preceding stream block, the stream blocks are chained. The stream is therefore a stream of chained identifiers.

Each stream block [n] after stream block [000] (also referred to as an Origin Stream Block or OStBlk) is affected by its first preceding stream block that, in turn, was previously affected by its respective first preceding stream block, and so forth. The stream of chained identifiers evolves with each new stream block, and the unpredictability of each new stream block imbues the stream with a non-deterministic but emergent quality that reflects a totality of previous affects through the entire chain. The uniqueness of each stream of stream blocks enables the use of the stream in an authentication operation.

Chained identifier store 3000 in FIG. 1 stores the chained identifiers (i.e., the stream blocks). As before, the items appearing in italic font are explanatory indicia provided so that the reader can more easily track the flow of stream blocks from device to chained identifier store 3000 and are not necessarily part of the actual data stored. In this example, the chained identifier store 3000 stores each stream block from each app (x) of each device D(x) of each user U(x) from the origin stream block [000] to the current stream block [n].

Each device D(x) in the user base 1000 produces stream blocks, and the stream blocks are communicated to and stored in the chained identifier store 3000, generally as they are produced (although communication delays can delay the storing of stream blocks as discussed below). In one example implementation, each device D(x) generates one stream block [n] on a periodic basis, such as every few seconds or minutes. The production continues without cease on this periodic basis so long as the device D(x) has power. The device D(x) attempts to communicate the stream block [n] for storage in the chained identifier store 3000 as soon as the stream block is produced. When a given device D(x) cannot communicate the current stream block for storage in the chained identifier store 3000, in one implementation the given device D(x) maintains a backlog pool of stream blocks to be transmitted once communication is restored. In another example implementation, when the capacity for storing the backlog pool on the given device D(x) is exhausted, the oldest uncommitted one or more stream blocks are deleted to make room for storing the new current stream block as discussed below in the context of FIG. 9. One concrete implementation uses a ring buffer.

In another example implementation, each device D(x) generates stream blocks on the periodic basis already mentioned, and also in response to a predetermined event such as in response to detecting device power-on, initial registration of the device on the network, or in response to an authentication event. For example, when the stream in chained identifier store 3000 is not sufficiently recent (i.e., is "stale"), the device is prompted to freshen the stream by generating and writing new stream blocks to the chained identifier store 3000.

In the foregoing example implementations, once the device D(x) has been configured or adapted in a manner described further below (see FIG. 2) the production and communication of streams of stream blocks occur without user intervention and without the need for user awareness of these activities.

The continuing, periodic or semi-periodic flow of stream blocks from all the devices of the user base 1000 to the chained identifier store 3000 is depicted in FIG. 1 by a set of bold lines emanating from the right-hand side of each of the streams A:D1:a: through X:Dx:x: and terminating in a solid, bold arrowhead that touches the left edge of chained identifier store 3000.

The chained identifier store 3000 is graphically depicted as a database. In one example, the chained identifier store 3000 is a relational database management system. In another example, the chained identifier store 3000 is implemented as a distributed relational database. In yet another example, to be described below in more detail, the chained identifier store 3000 is a distributed ledger or, in a specific implementation, is a blockchain (see FIG. 3).

The authentication server 4000 in FIG. 1 is responsible for handling an authentication event. For example, assume user U(x) attempts to use device D(x) to run app (x). Here, app (x) involves access to content or functionality that cannot be gained without authentication.

In one example implementation, authentication is performed using only the chained identifiers without the need of a username and password. In another example implementation, user U(x) is subjected to a username/password type of authentication challenge, and the chained identifiers are used as an additional authentication factor. In other example implementations, the chained identifiers are used in conjunction with any combination of one or more other authentication factors.

Referring back to FIG. 1, with the user base 1000 and chained identifier store 3000 in the state shown, user U(x) attempts to access app (x) on device D(x). The access attempt is addressed to or subsequently directed to authentication server 4000. Authentication server 4000 responds to the access attempt by issuing a streaming block authentication challenge that requests the device D(x) to respond with stream blocks in the moving window for the app (x).

As shown in FIG. 1, the device D(x) responds to the streaming block authentication challenge in this implementation by transmitting to the authentication server 4000 all of the contents of the moving window for app (x), namely, stream blocks [n], [n−1], and [n−2] (see the hollow arrow between D(x) and authentication server 4000). The contents of the moving window are depicted in FIG. 1 between curly braces. Here, the curly braces signify only that the stream blocks are suitably formatted for transmission to the authentication server 4000. For example, the contents of the moving window are serialized according to a predetermined format acceptable to the authentication server 4000 and then packetized for network communication. Further, for example, the packets are encrypted.

Since the authentication server does not store the stream blocks as they are produced, but has only the present transmitted moving window, the authentication server must issue a query to the chained identifier store 3000 to request a set of the stream blocks, of the stream X:Dx:x: (i.e., the stream corresponding to the use of app (x) on device D(x) by user U(x)), previously received by the chained identifier store 3000.

The chained identifier store 3000 responds to the query by providing the requested set of previously received stream blocks. The requested set of stream blocks in one example implementation includes just the same number of stream blocks as are in the moving window. In an alternative example, the requested set of stream blocks includes more stream blocks than are in the moving window so as to account for the possibility of minor communications or processing delays. The query of the authentication server 4000 and the response of the chained identifier store 3000 are depicted in FIG. 1 by hollow arrows labeled respectively as "query" and "response."

The authentication server in this example compares each stream block received directly from the device D(x) with the corresponding stream blocks received from the chained identifier store 3000 in response to the query. This operation is depicted within authentication server 4000 by a process that receives two inputs and outputs success when the inputs match. When each stream block of the device's moving window matches a corresponding one retrieved from the chained identifier store 3000, then the user U(x) is deemed to have successfully met the streaming block authentication challenge. In this situation, the authentication server 4000 outputs an indication of success indicating proper authentication for the streaming stream blocks factor.

In an alternative implementation, the authentication server 4000 simply sends the received moving window of stream blocks to the chained identifier store 3000 together with a request to check those stream blocks against the given stream. Here, the chained identifier store 3000 makes the determination as to whether the moving window of stream blocks sufficiently corresponds to the given stream that the authentication response of the user's device should be deemed valid.

In the implementation just discussed, a streaming block authentication challenge is made to the device D(x), and the reply includes the stream proof. This reply includes stream blocks from the moving window. In another implementation, the device does not wait for a streaming block authentication challenge before sending the stream proof. Instead, on occasions where the device D(x) is in an unauthenticated state, the device sends the stream proof as part of a message requesting access.

In the implementation discussed above in FIG. 1 and also below in FIG. 4, the reply to the streaming block authentication challenge includes a stream proof of all the stream blocks of the moving window. In other implementations, the stream proof includes fewer than all of the stream blocks of the moving window. Both implementations are more generally described as the sending of stream blocks "from" or "of" the moving window (in contrast to the sending of the moving window, which implies that all of the stream blocks in the moving window are sent). In one implementation, the stream proof output by the device D(x) includes stream blocks of the moving window. In another implementation, the stream proof includes just a hash for each of the stream blocks.

Some example implementations thus include a plurality of stream blocks as the stream proof, i.e., full copies of the stream blocks. Other example implementations include as the stream proof information sufficient to show possession of the plurality of stream blocks, i.e., hashes of the stream blocks. In the latter case, the stream proof is, in a more general sense, said to include proof of possession of a plurality of stream blocks since hashes are not the only way to show proof of possession and other proofs are used in various alternative implementations.

The implementation in which hashes of stream blocks are sent as the stream proof, instead of the stream blocks themselves, improves the internal efficiency of the device D(x), the authentication server 4000, and the chained identifier store 3000, not to mention the network itself.

The internal efficiency of the device D(x) is improved in that the module that formulates the stream proof needs to send much less data. In the example of stream block 2000, only the ninth field is sent, reducing the amount of data to be sent by at least 75%. The hash for each stream block is computed at the time the stream block is generated, so no additional hash processing is necessary, thereby avoiding the need to expend hardware processor cycles to generate the hash values to be sent. In addition, sending the hash of a stream block is sufficient to demonstrate possession of the stream block since the probability of correctly guessing a given hash value is low. Moreover, where the stream proof includes the respective hash value for more than one block, the odds against correctly guessing all hash values increases exponentially.

The authentication server 4000 also gains efficiency in this implementation of stream proof by sending only hashes. The message containing the stream proof is much shorter, and fewer cycles of the hardware processor are spent in handling the message. Similarly, the authentication server interacts with the chained identifier store 3000 by comparatively succinct communications.

The improvement to efficiency of the chained identifier store 3000 comes from a faster comparison operation. Although in one implementation the chained identifier store 3000 is equipped with machine code that enables its nodes to handle stream proofs in the form of complete stream blocks, in other implementations the nodes are enabled also by other machine code to handle stream proofs in the form of only hashes. Determining an exact match for each hash in a stream proof is less processor-intensive and less memory-intensive than determining an exact match for each stream block. The reduction in processor and memory use can be as much as 75%.

The network itself finds in the stream-proof-by-hash approach a reduced level of traffic when stream proofs are sent compared to the stream-proof-by-block approach. Some of the technical effects of authentication using streaming stream blocks are now discussed.

Authentication using streaming stream blocks as a separate factor compares favorably with authentication using a random one-time password (OTP), which is typically in the form of a numeric code, dynamically provided through SMS or email at the time of an authentication event. First, an OTP provided through SMS or the like is provided by the server to the device and is therefore generated by the server. Outputting the moving window of streaming stream blocks, on the other hand, does not require the server to generate anything. This has the technical effect of simplifying the logic that must be provided on the server and also reduces the load on the server's memory and processor.

Second, when an OTP is dynamically supplied to a user the user must view, remember, and type in the OTP. These tasks become more difficult as OTPs trend longer and devices trend smaller. The moving window of streaming stream blocks, on the other hand, does not require the user to perform any data entry: the data in the moving window are stored when created and simply supplied by the device in response to an authentication challenge.

Third, when a dynamic, random OTP is offered to users as an authentication factor, the offer is typically optional. In order to avoid driving customers to less-burdensome online platforms that do not require extra steps at login, enterprises typically give users the option to opt-in to the use of the OTP or retain the option of not using the OTP. Users who value a simplified authentication experience often select to opt-out of using such an OTP because the added security is not worth the delay or difficulty of waiting for, viewing, remembering, and typing in the OTP. On the other hand, the automatic outputting of the moving window of streaming stream blocks need not involve the user at all and achieves added security without any effect on the user authentication experience.

Fourth, when the server communicates the dynamic, random OTP to the user, the user must receive the OTP outside the application of interest. For example, a user logging into their bank must switch to their messaging application to view the OTP that the server provides, and then must switch back to the banking app to complete the login. On the other hand, since the automatic output of the moving window of streaming stream blocks requires no user action, the user need not leave the application of interest to have the added security of this authentication factor.

Fifth, it is possible that an outsider could convince or order the SMS telecom provider to permit the OTP to be sent to a device in addition to or instead of the authorized user. Where the OTP is sent is completely under control of the telecom provider. On the other hand, the use of streaming stream blocks places no reliance on the telecom provider to participate in the authentication event.

Sixth, to produce the next random OTP, the OTP system requires a central table or database to correlate the specified device, to be authenticated, with a seed or root cryptographic value. An outsider could compromise the stored central table and predict the next OTP for a given device. In an OTP system, only the next OTP is relevant to an authentication event, without any need to know the value of the precedent OTPs produced prior to compromise of the central table. On the other hand, the use of streaming stream blocks means that authentication cannot be accomplished by compromise or prediction of the next stream block, but instead requires access to previous stream blocks in order to participate in the authentication event.

Authentication using streaming stream blocks achieves all of the advantages of using a random, dynamic OTP. Use of an OTP has the advantage that the next OTP to be provided cannot be predicted by outsiders, but this is also true of the moving window of streaming stream blocks. Although each stream block does have some data that stays the same over a given stream (such as the version, the account or user identifier, the device identifier, the stream identifier), each stream block also has some data that varies: the sequence number within the given stream, the time stamp, the hash of the first preceding stream block, the random number serving as the cryptographic salt, the hash of the fields of the current stream block. The content of a succeeding stream block therefore cannot be predicted. Furthermore, the likelihood of making a correct random guess for the next OTP (typically four to eight digits) is much higher than that of making a correct random guess for the much longer next stream block. In addition, some cyber-attacks have targeted seed-to-device tables stored in centralized enterprise databases that contain the cryptographic information to predict OTPs for specific devices. Authentication using streaming that originates from the device is not susceptible to such attacks.

Authentication using streaming stream blocks as a separate factor compares favorably also with authentication using a random number provided by an onboard authenticator app or an external authenticator device (also referred to as a hardware token). The onboard authenticator app, like an OTP, interrupts the user by requiring the user to access the app, view a number having several digits, memorize the number, switch back to the application of interest, and then enter the number. Similarly, a hardware token requires the user to physically obtain and view the device, study the number, and enter it into the application of interest. On the other hand, authentication with streaming stream blocks avoids the user's involvement in any of the foregoing operations and avoids the need for the user to carry a separate device. Hardware token systems have also been subjected to attacks seeking to discover a centralized seed-to-device table in order to predict OTPs generated by the hardware token.

Once the device D(x) of a user U(x) is adapted to automatically generate a stream block 2000 on a periodic or other basis for each app (x) requiring authentication and output it to chained identifier store 3000, and is adapted to automatically respond to an authentication event with authentication server 4000 by outputting the moving window of w stream blocks, then the device is configured for fully automatic operation. Here, "fully automatic operation" means only that the generation and output of a stream block takes place without user prompting or intervention and the outputting of the moving window takes place without user prompting or intervention. In a further implementation, the automatic operation is also invisible to the user.

The structural manner in which a given device D(x) is configured is now discussed.

A device D(x) has a hardware processor (defined below) and, in some example implementations, multiple hardware processors. Unless otherwise stated, the discussion below and the appended claims pertain to both the single hardware processor case and the multiple hardware processor case, using a singular "processor" for the sake of convenience. The hardware processor has a small amount of memory including registers, buffers, and cache which are used by the processor to store information for short periods of time. Such information may include instructions or data.

A hardware processor is a type of integrated circuit that contains a vast number of transistors and other electrical components interconnected so as to function as an array of logic gates in a pattern that yields predictable outputs in response to a vector of predefined machine code inputs. The hardware processor is adapted to perform a predefined set of basic operations in response to receiving a corresponding basic instruction, the corresponding basic instruction being one of a plurality of machine codes defining a predetermined native instruction set for the hardware processor. The set of predefined machine codes is finite and well-defined for each hardware processor, as are the corresponding basic operations. The set of predefined machine codes that may validly be provided as input to a given hardware processor defines the native instruction set of the hardware processor.

The machine codes of the native instruction set of a hardware processor are input to the hardware processor in binary form. In binary form, the machine codes constitute particular logical inputs that enter the pattern of logic gates that is hard-wired into (i.e., manufactured as) the hardware processor, resulting in a predictable output that depends on the particular machine code used.

Modern software is typically authored in a form other than binary and then converted through various processes such as compilation or interpretation into binary form. The machine codes must be input into a given hardware processor in binary form.

Software is often referred to as being either operating system software or applications software. In general, operating system software is thought to provide a bridge or a level of generality between the hardware of a given computer system and the application software. In general, applications software is thought to provide a bridge or a level of generality between the operating system of a given computer system and a user. Regardless, at the time software is executed, it is executed in binary form as machine codes selected from the native instruction set of the given hardware processor.

Modern software is complex, performing numerous functions and often amounting to millions of lines of source code. Each line of source code represents one or more (typically many more) individual instructions selected from the native instruction set of a hardware processor. Hardware processors have registers, buffers, cache, and the like which can store binary information. The amount of such storage is much smaller than the set of machine codes that implement a given software "program" or "app."

The set of machine codes are therefore stored in a memory that the hardware processor can access. In other words, the memory is under control of the hardware processor. The hardware processor, when executing a particular set of machine codes selected from the native instruction set, loads the machine codes from the memory, executes the machine codes, and then loads other machine codes from the memory.

The device D(x) in some implementations has a receiver/transmitter unit with which it communicates to the outside world. The receiver/transmitter unit is under control of the hardware processor. In various implementations, the receiver/transmitter unit communicates variously through a mobile telephone network, a satellite network, a wireless local area network, a short-range wireless network such as a personal area network, a citizens' band radio network, or the like. In some implementations, the receiver/transmitter unit has no radio but connects instead through a wired medium such as a cable. In some implementations, the device has more than one receiver/transmitter unit for communication with the outside world. In the implementations discussed below, for the sake of explanation and not limitation, the communication is described as taking place over the Internet, but alternative network implementations are used in alternative implementations.

The device D(x) in some implementations has an input/output unit with which it interacts with a user. The input/output unit is under control of the hardware processor. In various implementations, the input/output receives inputs from, for example, a keyboard, a touch screen, a stylus, a microphone, a mouse, a motion sensor, a physical button, an embedded camera, a fingerprint sensor, or the like. In various implementations, the input/output provides outputs to, for example, a display, a speaker, an output port, a vibration unit, or the like.

Figure 2:
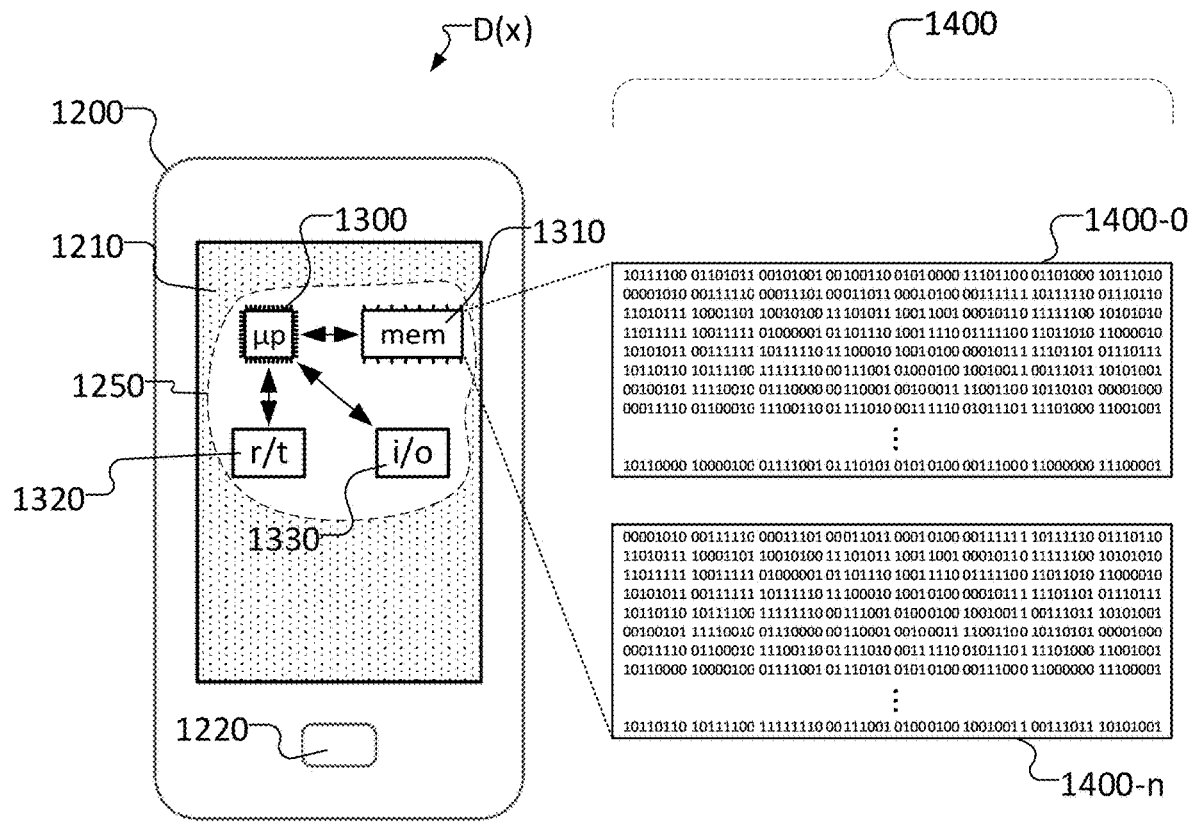
FIG. 2 shows, in simplified schematic form, an example of any given device of any given user.

FIG. 2 shows, in simplified schematic form, an example of any given device D(x) of any given user U(x). Although the device illustrated in FIG. 2 is a mobile phone, other implementations include a tablet, a smart watch, a smart thermostat or other household device, a smart television, a laptop computer, a desktop computer, an e-reader, a drone, an autonomous vehicle, an embedded system, or the like.

In FIG. 2, the device D(x) is indicated as having an enclosing body or case 1200. Within device D(x) is a display overlaid with a touch-sensitive membrane to form a touch screen 1210. The device possesses one or more physical user interface buttons 1220. In other implementations, the device has no physical user interface buttons. In FIG. 2 a cutaway 1250 reveals a highly simplified schematic of some internal components of the device D(x). Hardware processor 1300 communicates with and exercises control over a memory 1310, a receiver/transmitter unit 1320, and an input/output unit 1330.

FIG. 2 also illustrates the storage, in memory 1310, of machine codes 1400. The machine codes 1400 are selected from the native instruction set relevant to the given hardware processor 1300. In more detail, the memory 1310 contains numerous sets of the machine codes 1400 such as a zeroth set 1400-0 selected from the native instruction set, through an n-th set 1400-n selected from the native instruction set. The zeroth set 1400-0 of the machine codes 1400 is illustrated as containing an arbitrary number of machine codes in binary format, suitable for execution on the hardware processor 1300 once loaded from the memory 1310. Likewise, the n-th set 1400-n of machine codes 1400 also contains an arbitrary number of machine codes in binary format. As used here, "arbitrary" does not mean that the codes themselves are unknown or undefined; rather, the count of how many individual machine codes in a given set varies with the functionality that the machine codes are intended to impart, and the particular count of them is not a limitative factor.

The precise implementation of the memory is performed according to the engineering needs of the given device. The memory may be implemented as a hard drive, a solid-state device, a flash memory, an external memory stick, a DRAM, or the like. Furthermore, as used herein, the term "memory" encompasses lower-level implementations where the machine codes pertain to a dedicated security processor such as in a trusted platform environment and/or are stored at a level such as described in the unified extensible firmware interface (UEFI), in a basic input-output system (BIOS), or are reflected in the makeup of a specialized integrated circuit.

To configure a device D(x) to perform authentication using streaming stream blocks, the memory 1310 is modified to include a stream block generation module comprising a first set of the machine codes (for example, a first set 1400-1 of the machine codes 1400 or the like, not separately illustrated), selected from the native instruction set, adapted to enable the processor to generate a stream block 2000 (such as the example stream block implementations described above).

Configuration of the device D(x) also includes causing the memory 1310 to include a stream block streaming module comprising a second set of the machine codes selected from the native instruction set, adapted to enable the processor to output the stream block 2000 via the receiver/transmitter unit 1320 (for storage in the chained identifier store 3000).

Configuration of the device D(x) also includes modifying the memory 1310 to include a moving window output module comprising a third set of the machine codes selected from the native instruction set, adapted to enable the processor to output the m moving window stream blocks in connection with an authentication event.

With the memory 1310 of the device D(x) thus modified, the device D(x) is adapted to perform streaming authentication using stream blocks according to the implementations mentioned above.

Additional implementations and further details of example implementations will now be discussed, first with respect to FIG. 3, which depicts in a highly simplified, schematic manner, an alternative implementation of a specific system 11 that performs streaming authentication using stream blocks.

Figure 3:
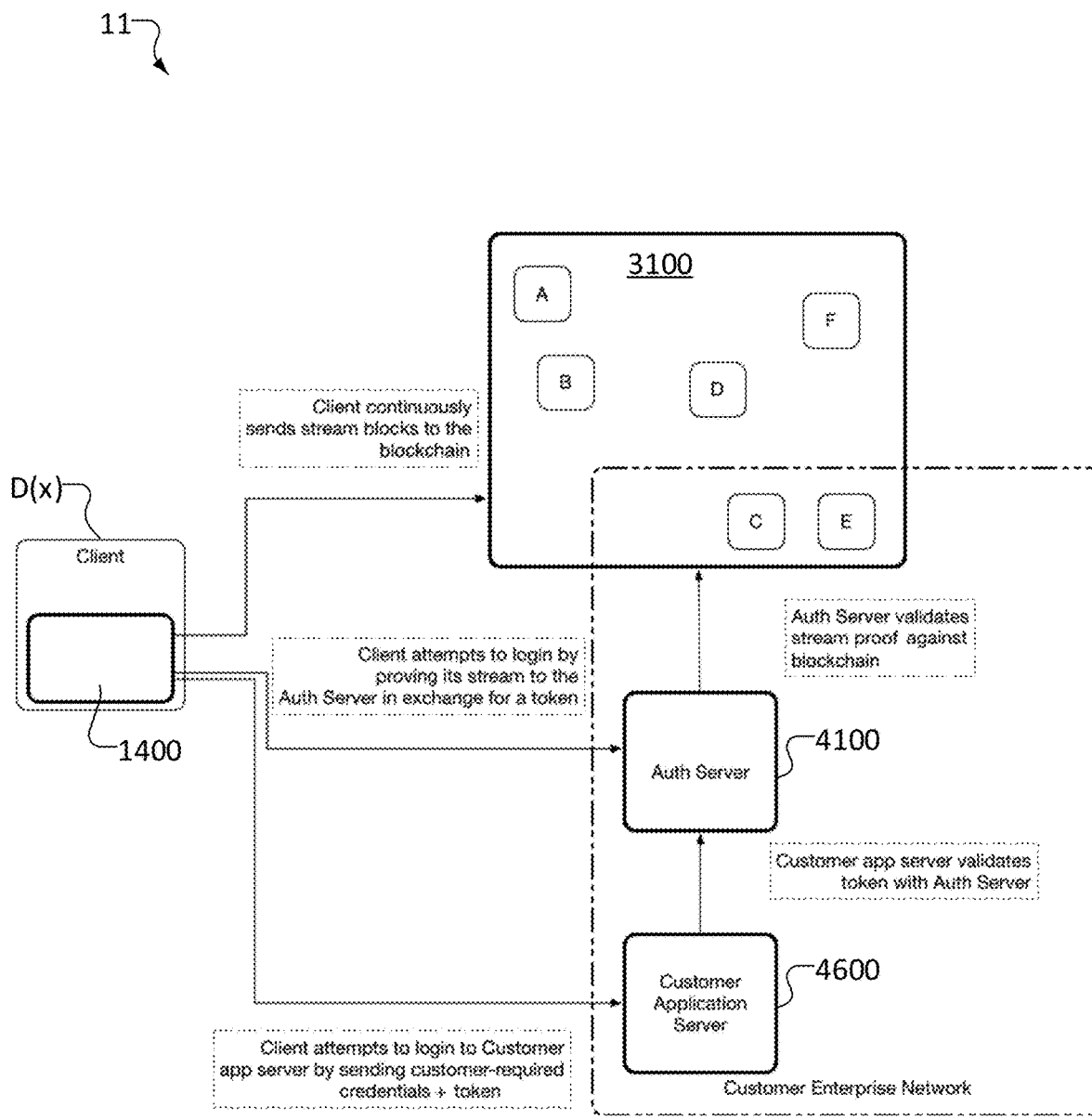
FIG. 3 depicts in a highly simplified, schematic manner, an alternative implementation of a chained identifier store and an alternative implementation of an authentication server.

The implementation shown in FIG. 3 embodies the concept of a customer that has an existing application such as a social media app or the like, and of a security services provider that augments the customer's system to be able to perform authentication using streaming stream blocks.

The specific system 11 includes a chained identifier store 3000 which, more specifically, is implemented using distributed ledger technology (DLT). The DLT in one implementation is blockchain. To reflect the use of DLT in the chained identifier store 3000, FIG. 3 refers to distributed ledger 3100 as a specific species of chained identifier store 3000. Distributed ledger 3100 is a specific kind of chained identifier store 3000. Distributed ledger 3100 is, in this implementation, a private, permissioned distributed ledger system. One non-limitative, concrete example of such a system suitable for use in this implementation is HYPERLEDGER FABRIC, a project of THE LINUX FOUNDATION. Other distributed ledger technology may be employed in alternative implementations. The distributed ledger 3100 has independent nodes A-F which cooperate to receive, collect, and store stream blocks such as stream block 2000 from the devices in user base 1000. The stream blocks received from the devices in user base 1000 are collected as transactions and are stored in the distributed ledger 3100 as blocks referred to herein as "chain blocks." The chain blocks stored by distributed ledger 3100 are larger than stream blocks such as stream block 2000 and contain multiple stream blocks from multiple users U(x). In other words, the stream blocks are constituent elements of chain blocks. In this implementation, the chain blocks are stored as a blockchain where each chain block contains a hash of its immediate precedent (like the stream blocks where each stream block contains a hash of its immediate precedent too).

The specific system 11 includes an independent authentication server 4100 that is a species of the authentication server 4000 previously discussed. Independent authentication server 4100 is described as being "independent" since it has functions independent of those in customer application server 4600. In this implementation, the customer application server 4600 is provided by the customer and the independent authentication server 4100 is provided by the security services provider but operates within the customer's enterprise network (shown as a chained line in FIG. 3). In an example implementation, the nodes of a distributed ledger (blockchain) A-F are provided by the security services provider but hosted in part by the security services provider and in part by the customer.

D(x) indicates a representative device of a representative user U(x), as previously discussed, and now also referred to as a client. The device D(x) is already configured with machine codes 1400 selected from a predetermined native instruction set of the hardware processor 1300 (see FIG. 2) of the device D(x).

In general, at a high level, the implementation of the specific system 11 is similar to the operation of system 10 previously described but with a few additions. Prior to an authentication event, client device D(x) repeatedly generates and sends stream blocks such as stream block 2000 to the distributed ledger 3100. In particular, the client device D(x) is pre-configured to transmit its stream blocks to one or more of the nodes A-F. The nodes A-F cooperate to combine the received stream blocks (the stream blocks from the various clients) into a chain block whenever the number of received transactions reaches a threshold value or whenever a predefined passage of time has elapsed prior to the number of transactions reaching the threshold value. Each chain block is added to the copy of the blockchain maintained at each of the nodes A-F.

When the user U(x) operates device D(x) to use application (x) to access the customer application server 4600, the machine codes 1400 previously configured in the device D(x) first sends the stream blocks retained in moving window m to the independent authentication server 4100. These stream blocks may be thought of as a "stream proof." The independent authentication server 4100 validates these stream blocks against values previously stored in the distributed ledger 3100. In particular, the independent authentication server 4100 sends a query to the distributed ledger 3100 which may be directed to one or more of the nodes A-F. When the reply from the distributed ledger 3100 indicates that the stream proof is valid, the independent authentication server 4100 requests and automatically generates an authentication token. The independent authentication server 4100 provides this temporary authentication token to the client device D(x).

After receipt of the token, and under control of the hardware processor 1300 executing the machine code 1400 configured in the memory 1310 of the device D(x), the device forwards the token, together with the user's credentials such as a username and password, or the like, to the customer application server 4600.

The customer application server uses the token as an authentication factor and uses the supplied credentials as another factor of authentication. The customer application server forwards the token for verification to the authentication server. In other implementations, factors different from or in addition to the user's credentials are used. In still other implementations, the token is used as a sole authentication factor.

Although more detail is provided below, some of the additional technical effects of authentication using stream blocks stored in a blockchain-based chained identifier store are worth noting here. These technical effects are in addition to those mentioned with respect to the system 10 previously discussed.

Since a blockchain-based chained identifier store is used to distribute and store blocks of cryptographically verifiable data in a way that records are made immutable and decentralized, authentication by validating a stream proof is performed with no central storage of security credentials, keys, passwords, or secret material. Furthermore, the use of a blockchain distributed among some or all of the nodes A-F overcomes risks associated with the compromise of any one of the nodes. For example, if a node such as node C is compromised, the insertion of false values into its ledger cannot be inserted without detection by the other nodes.

The compromise of a node, in addition, yields no information useful in predicting or generating the content of future stream blocks. Assuming the compromise of the node is detected, and it is prevented from receiving further stream blocks and chain blocks, the value of the compromised information will quickly diminish. For example, assume the moving window holds only three stream blocks, and the client sends out a new stream block every minute. The ability of the party with the compromised node, to use its already-stored stream blocks to attempt to obtain a token, passes in as quickly as one minute.

Moreover, although some users tend to use the same password for multiple accounts, and compromise of the password of a user for one app can convey access to other apps, the stream blocks differ for each different app (x) and are essentially randomized data. A theft of stream blocks of one app has no relevance to any other app and does not reveal any personally identifiable information, biometrics, cryptographic keys, passwords, or even security questions.

Figure 4:
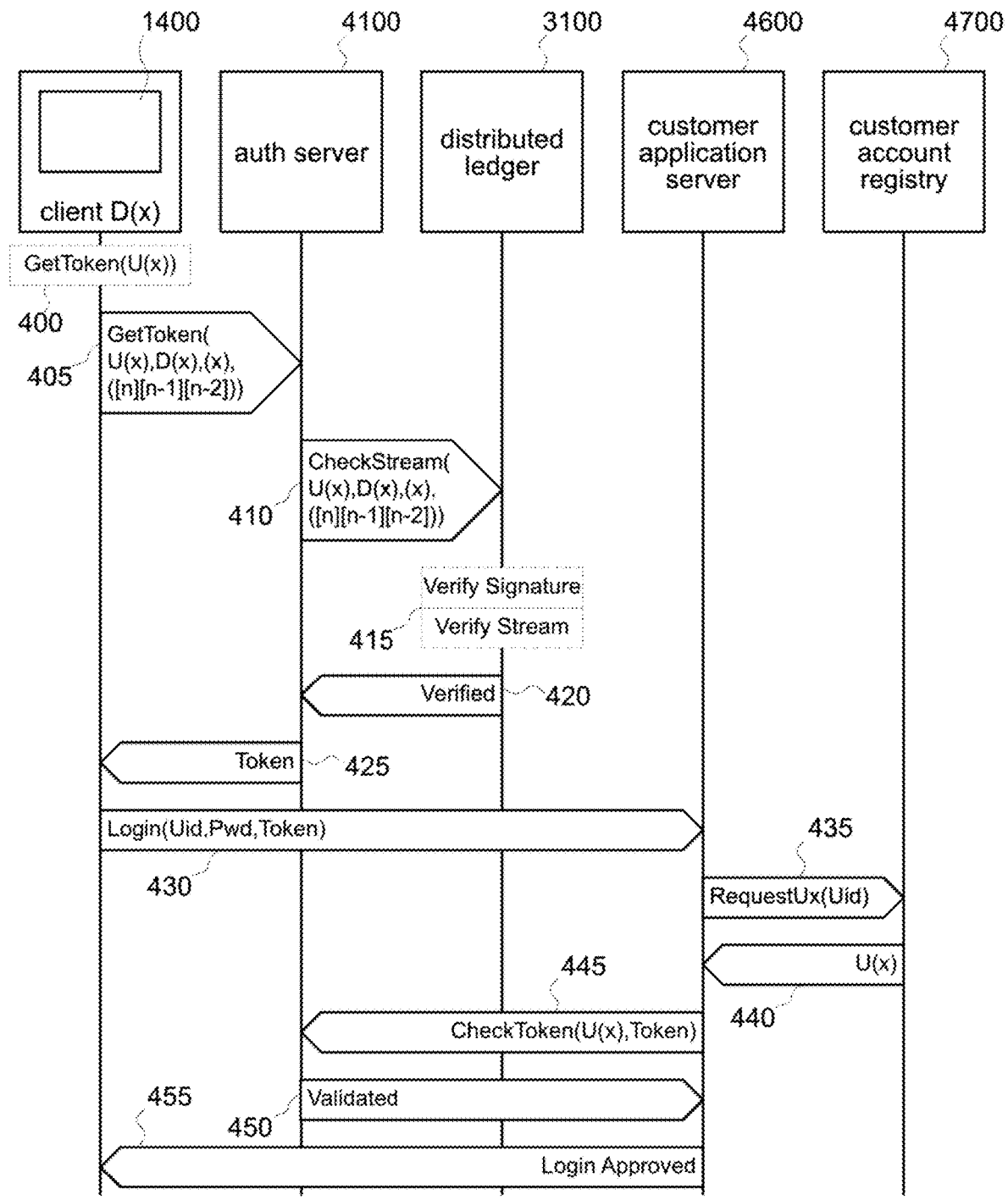
FIG. 4 depicts a general sequence of actions in one algorithm that effects an authentication operation in one example implementation.

FIG. 4 depicts a general sequence of actions in one algorithm that effects an authentication operation in one example implementation. Compared to FIG. 3, FIG. 4 also shows a customer account registry 4700. The customer account registry 4700 stores information as to a correspondence between random numbers, generated as unique identifiers, and particular user identity, device identity, and app identity information. When used to identify any given user, such a random number is a value that uniquely represents the account for user U(x); when identifying any given device, such a random number is a value that uniquely represents the device D(x); and when identifying any given app, such a random number is a value that uniquely represents the app (x).

FIG. 4 shows numerous implementation details that are provided for the sake of providing a concrete explanation and teaching example. The precise implementation details such as function names, argument names, and the like are non-limitative.

In FIG. 4, a user U(x) attempts to access an online application (x) that requires authentication. In response to the requirement to authenticate, a client function GetToken( ) 400 is called using U(x) as an argument. The client function GetToken responds to the call by issuing an application program interface (API) call to the independent authentication server 4100 to invoke a similarly-named function GetToken of the independent authentication server 4100, supplying additional arguments such as the complete stream identifier (i.e., U(x), D(x), (x) in this example) and the stream proof (i.e., in this example, [n][n−1][n−2]). The call to the independent authentication server 4100 to obtain a token is, in this context, referred to as a token request message 405 that includes a plurality of chained identifiers. More specifically, in this implementation, the token request message 405 includes a stream identifier and the moving window of w stream blocks 2000 in connection with an authentication event.

As previously discussed, the stream proof in one implementation includes the plurality of stream blocks themselves as the chained identifiers. As also previously discussed, the stream proof in alternative implementations includes proof of possession of a plurality of stream blocks as the chained identifiers, instead of the full blocks. The teaching examples reflected in FIG. 4 and FIG. 5, and described elsewhere in relation to authentication events, are amenable to implementation of stream proof by blocks and also stream proof by proof of possession.

The independent authentication server 4100 receives the token request message 405. It thereafter generates a call to the distributed ledger 3100 API to invoke a function CheckStream( ), supplying as arguments the stream identifier and the stream proof. Here the stream proof is a plurality of stream blocks 2000 received in the token request message 405. In alternative implementations, the stream proof is a number of hashes showing proof of possession of the corresponding stream blocks. This call is more generally a verification query 410.

In this example implementation, distributed ledger 3100 receives the verification query 410 and performs a verification operation 415 with respect to the one of the respective streams that matches the stream identifier and the stream proof. In other words, the verification query includes a stream proof to be verified for one of the respective streams. The verification operation 415 in this implementation includes verifying a digital signature of each of the stream blocks and verifying whether the stream proof contains values corresponding to stored stream blocks of the particular one of the respective streams. In the implementation where the verification query 410 includes a stream proof with hashes instead of complete blocks, the verification operation 415 includes verifying whether the hashes are found in the previously stored contents, namely, in the stored stream blocks. The verification determination is therefore more generally based on whether the stream proof contains values corresponding to the stored stream blocks, whether the values are hashes or complete blocks. The distributed ledger 3100 responds to the verification query 410 with a verification determination 420 indicating whether the verification operation 415 produced an affirmative result.

When the verification determination 420 is in the affirmative, the independent authentication server 4100 generates a token 425 and transmits it to the client device D(x). The token 425, in an implementation, includes a field useful in limiting the duration of time in which the token 425 is considered valid by the system 10 or the specific system 11.

The device D(x) then prompts the user U(x) to supply a username (Uid) and password (Pwd) for the app (x). Next, the device D(x) generates a login request message 430 to the customer application server 4600 to call function Login( ) of the API of the customer application server 4600, supplying as arguments the Uid, Pwd, and token 425.

The customer application server 4600 receives the login request message 430. To validate the token 425 the customer application server 4600 accesses or sends a correspondence request message 435 to the customer account registry 4700 to obtain the value of the random number that uniquely identifies user U(x) and corresponds to the username Uid. This operation is necessary in the implementation where the independent authentication server 4100 does not contain the username Uid but does contain the random number for identifying U(x). The customer account registry 4700 responds to the correspondence request message 435 by supplying 440 the value of U(x) to the customer application server 4600. Now the customer application server 4600 has the information it needs to check the validity of the token 425 with the independent authentication server 4100.

The customer application server 4600 issues a token verification request 445 that invokes function CheckToken( ) of the independent authentication server 4100, supplying as arguments U(x) and the token 425. The independent authentication server 4100 replies with a token verification determination 450 indicating whether the token 425 is valid. This determination is based on whether a predetermined passage of time since generation of the token 425 exceeds a predetermined threshold, in one implementation. In another implementation, the determination is based on whether the user to which the token 425 was issued also matches the user U(x) indicated in the token verification request 445.

After receiving the token verification determination 450, the customer application server 4600 replies to the login request message 430 with a login determination message 455 indicating whether the login request is granted or denied. When the token verification determination 450 is in the affirmative, and when the supplied username Uid and password Pwd are accepted, the customer application server 4600 grants the login request.

Figure 5:
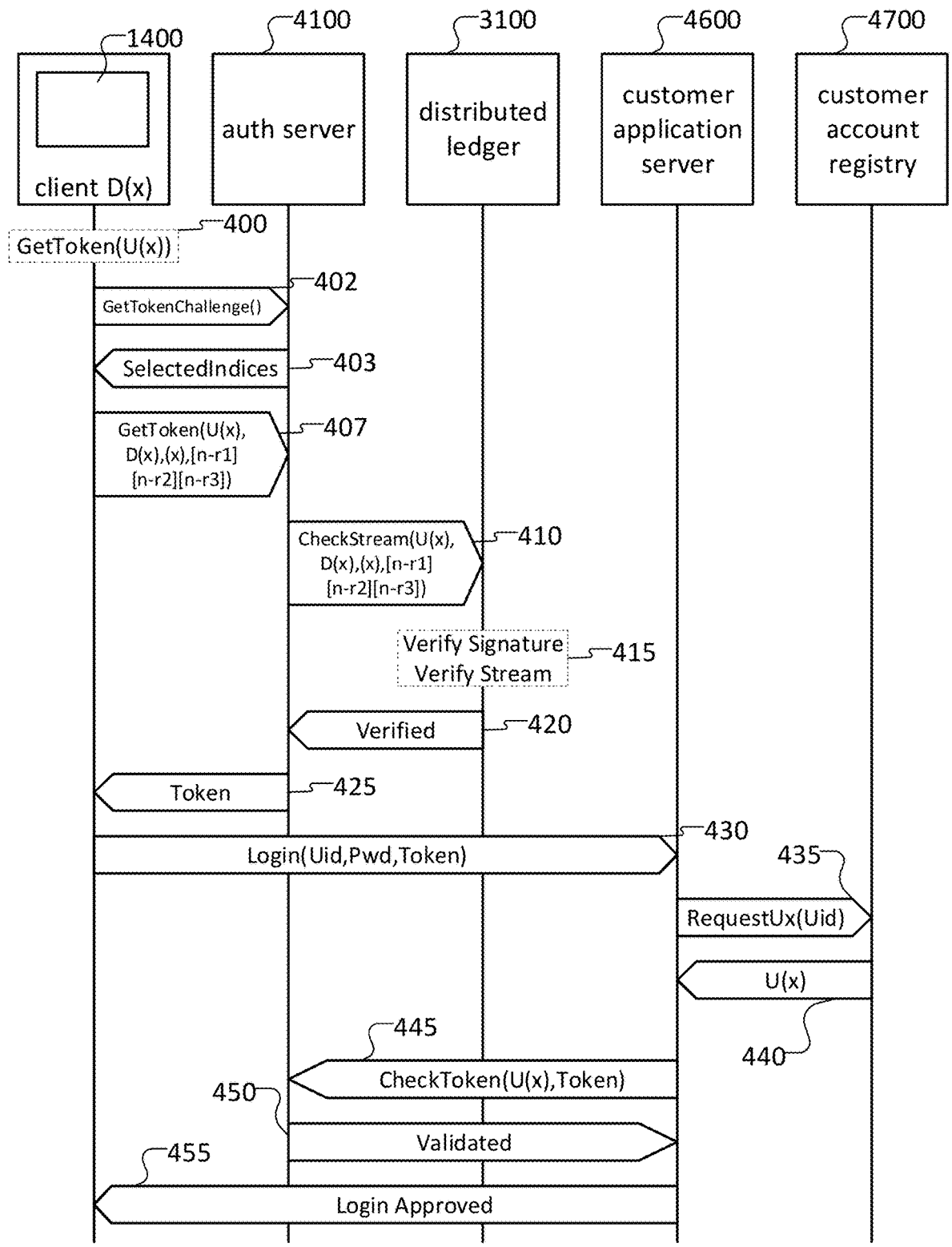
FIG. 5 depicts a general sequence of actions in another algorithm that effects an authentication operation in another example implementation.

FIG. 5 depicts a general sequence of actions in another algorithm that effects an authentication operation in another example implementation. This figure shows numerous implementation details that help provide a concrete explanation and teaching example but are non-limitative.

One main difference between the operations in FIG. 5, compared to the operations shown in FIG. 4, is that the authentication server dynamically shapes the stream challenge and identifies a selected subset of the moving window as the stream proof. In FIG. 4, the stream proof is the moving window. In FIG. 5, however, the stream proof includes certain stream blocks selected from the set of stream blocks that make up the moving window. In FIG. 5, the client function GetToken( ) 400 responds to being called by issuing an API call to the independent authentication server 4100 to invoke a function GetTokenChallenge( ) This message is referred to as an index indication request message 402. The independent authentication server 4100 receives the index indication request message 402 and reacts using logic that constitutes an index indication module to select one or more numbers pertaining to stream blocks. In this implementation numbers are random integer values selected from a range of values based on the size of the moving window w.

For example, assume the size of the moving window w is nine. In this instance, the moving window includes the current stream block [n] (which may be written as [n−0]), the first preceding stream block [n−1], etc. up through stream block [n−8]. The random numbers in such an implementation have values from 0 through 8. To put it more generally, a random number r is eligible for selection when $r \in \{0, 1, \ldots, w\}$ Continuing with this example, assume that the GetTokenChallenge( ) function of the independent authentication server 4100 selects three random values represented by r1, r2, and r3. In this example, the random values are r1=2, r2=6, and r3=5. The particular stream blocks of the client device moving window are selected using these random values.

The independent authentication server 4100 replies to the index indication request message 402 with an index indication message 403. The index indication message 403 includes content that indicates the random number(s) selected (in this example, the indices are 2, 6, and 5).

After receiving the index indication message 403, the client prepares a responsive token request 407 containing the stream identifier (U(x), D(x), (x)) and the stream blocks from the moving window that correspond to the indices indicated in the index indication message 403. In this example, r1=2, r2=6, and r3=5. Therefore, the responsive token request 407 is generated with a stream proof that supplies stream blocks [n−r1][n−r2][n−r3], namely stream blocks [n−2][n−6][n−5] (the second preceding stream block, the sixth preceding stream block, and the fifth preceding stream block).

Processing continues afterward in the manner already described in the context of FIG. 4.

Figure 6:
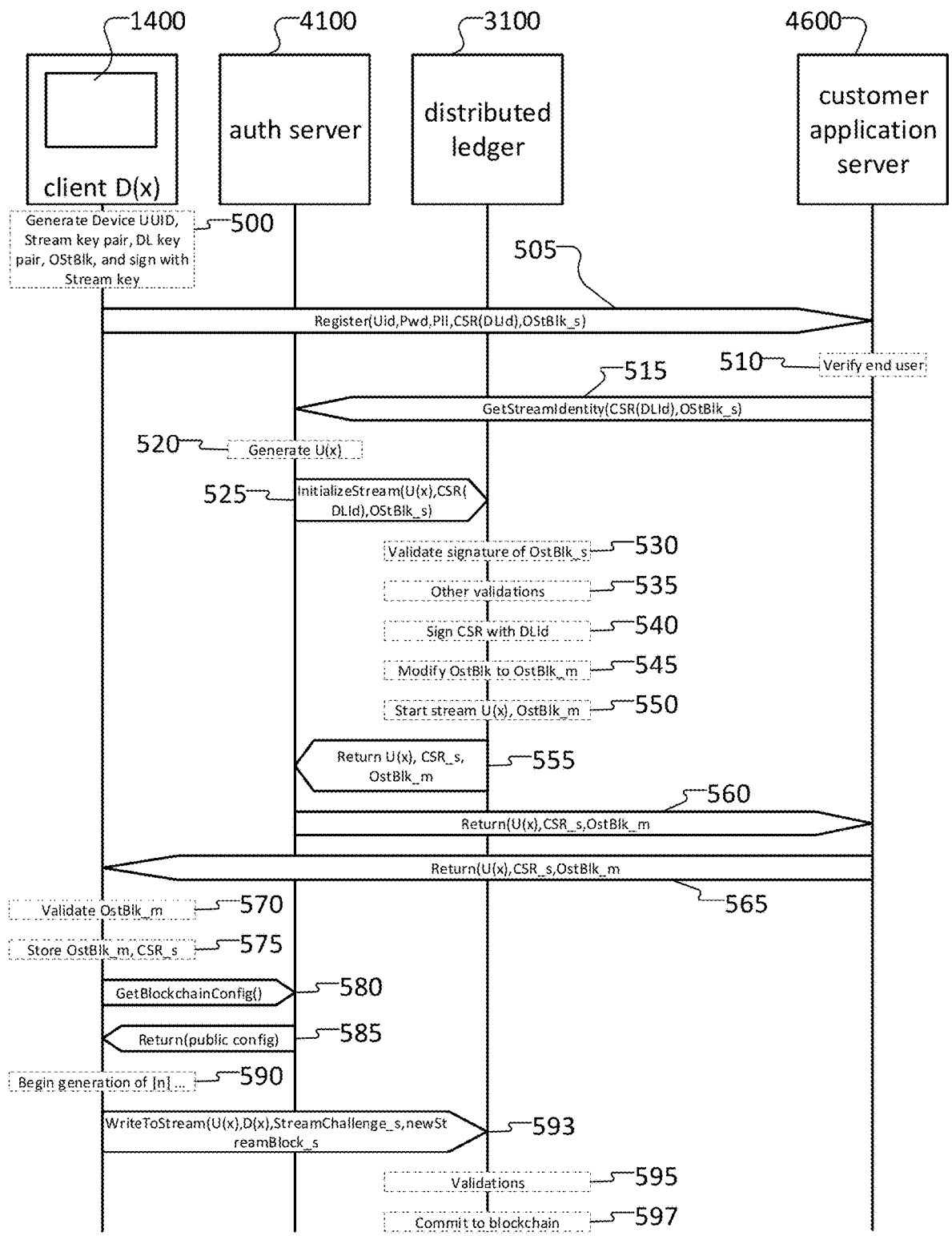
FIG. 6 depicts a general sequence of actions in an algorithm for registration of a new account and for registration of an associated device.

FIG. 6 shows one registration process for a new user and a new device. In FIG. 6, machine codes 1400 must first be installed or loaded onto a device (shown as D(x)) of a client. In a registration initialization step 500, the client device generates an application level identifier (UUID). The machine codes 1400 create key pairs for use with the stream to be set up and also for use with the distributed ledger 3100. The machine codes 1400 also create a partially-filled in origin stream block OStBlk for the stream to be set up, and signs the partial origin stream block OStBlk with the stream key of the originator to produce a signed origin stream block OStBlk_s.

An initial registration message 505 is sent from the client device D(x) to the customer application server 4600. This initial registration message 505 contains, for example, the username Uid and password Pwd for the account that the user already has with the app. The customer application server 4600 verifies the Uid and Pwd from the initial registration message 505 and, if successful, sends a stream identity request message 515 to the independent authentication server 4100. The stream identity request message 515 includes, e.g., a certificate signing request (CSR) and the signed origin stream block OStBlk_s.

Upon receipt of the stream identity request message 515, the independent authentication server 4100 generates a random number to uniquely identify the account U(x), avoiding the need to reference the actual Uid in the independent authentication server 4100 or in the distributed ledger 3100. As mentioned above, the customer application server 4600 accesses a customer account registry 4700 as necessary to determine how the U(x) value and the Uid correspond. At this point in the process, however, the customer application server 4600 has not yet been provided with the value of U(x). Note that, in this registration process, the Uid is not made available to the independent authentication server 4100 or the distributed ledger 3100.

After the value of U(x) is generated, the independent authentication server 4100 sends a stream initialization request message 525 to the distributed ledger 3100. In this example, the stream initialization request message 525 contains the random number generated to uniquely identify U(x), a certificate signing request CSR, and the signed origin stream block OStBlk_s.

Responsive to the stream initialization request message 525, the distributed ledger 3100 validates the signature of the OStBlk_s in a signature validation step 530. In step 535, other validations are performed. In various implementations, the validations include checking that the number of existing streams of D(x) and of U(x) does not exceed a predetermined threshold, checking that the stream identifier is unique across the distributed ledger, and/or checking that the value of U(x) does not divulge any PII.

After the other validation checks, the distributed ledger 3100 signs (step 540) the certificate signing request CSR using its private key (represented as DLId), giving a signed certificate signing request CSR_s. The distributed ledger 3100 also modifies (step 545) the OStBlk with its own random data to give a modified origin stream block (also referred to as a complete origin stream block) for the stream OStBlk_m. This OStBlk_m becomes the origin stream block for a new stream that pertains to the use by account U(x) of device D(x) to run application (x), in step 550. Thereafter, in step 555, the distributed ledger 3100 outputs to the independent authentication server 4100 a stream initiation message 555 with U(x), the signed certificate signing request CSR_s, and the OStBlk_m.

Now the independent authentication server 4100 can reply to the stream identity request message 515 with a stream identity response message 560 containing, e.g., the value for U(x), the signed certificate signing request CSR_s, and the OStBlk_m.

The customer application server 4600 uses its knowledge of the end user's account information such as the Uid and Pwd to update customer account registry 4700 to hold the correspondence between the Uid and the value of U(x). The customer application server 4600 also now replies to the initial registration message 505 with an initial registration response message 565.

The client device D(x) validates the signature of the OStBlk_m using the public key of the distributed ledger 3100 in step 570 and then stores the OStBlk_m and the signed certificate signing request CSR_s. After requesting (step 580) and receiving (step 585) the public configuration for the distributed ledger 3100, the machine codes 1400 starts generating the stream blocks [n] etc. With each stream block, in an example implementation, the machine codes

1400, representing the logic of a streaming module in the client, invoke the function WriteToStream of the distributed ledger 3100. The streaming module is thus adapted to output a write request message 593 and includes, for example, the stream name U(x),D(x),(x), the new stream block [n] signed using the private key for the stream (represented as "newStreamBlock_s"; this stream key pair was generated in step 500). The write request message 593 also includes information the distributed ledger 3100 requires for authentication, referred to hereafter as a stream challenge. In one implementation, a standing stream challenge (StreamChallenge in write request message 593 in FIG. 6) is for the device to provide the stream blocks of the moving window in their entirety. In another implementation, the device must provide only certain portions of the stream blocks, or even just the hashes of the precedent stream blocks of the moving window. The stream challenge is signed, in certain implementations, with the private key of the distributed ledger (DL) key pair generated in step 500 and the signed result is represented in FIG. 6 as "StreamChallenge_s".

The distributed ledger 3100 responds to the write request message 593 by various validations used in example implementations including ensuring the time between the sending of the write request message 593 and its receipt at the distributed ledger 3100 is within a predetermined threshold. In step 597, the stream block [n] is committed to the blockchain by invoking a commit function. When enough new stream blocks are received from the various client devices, a new chain block is added to the distributed ledger 3100.

Figure 7:
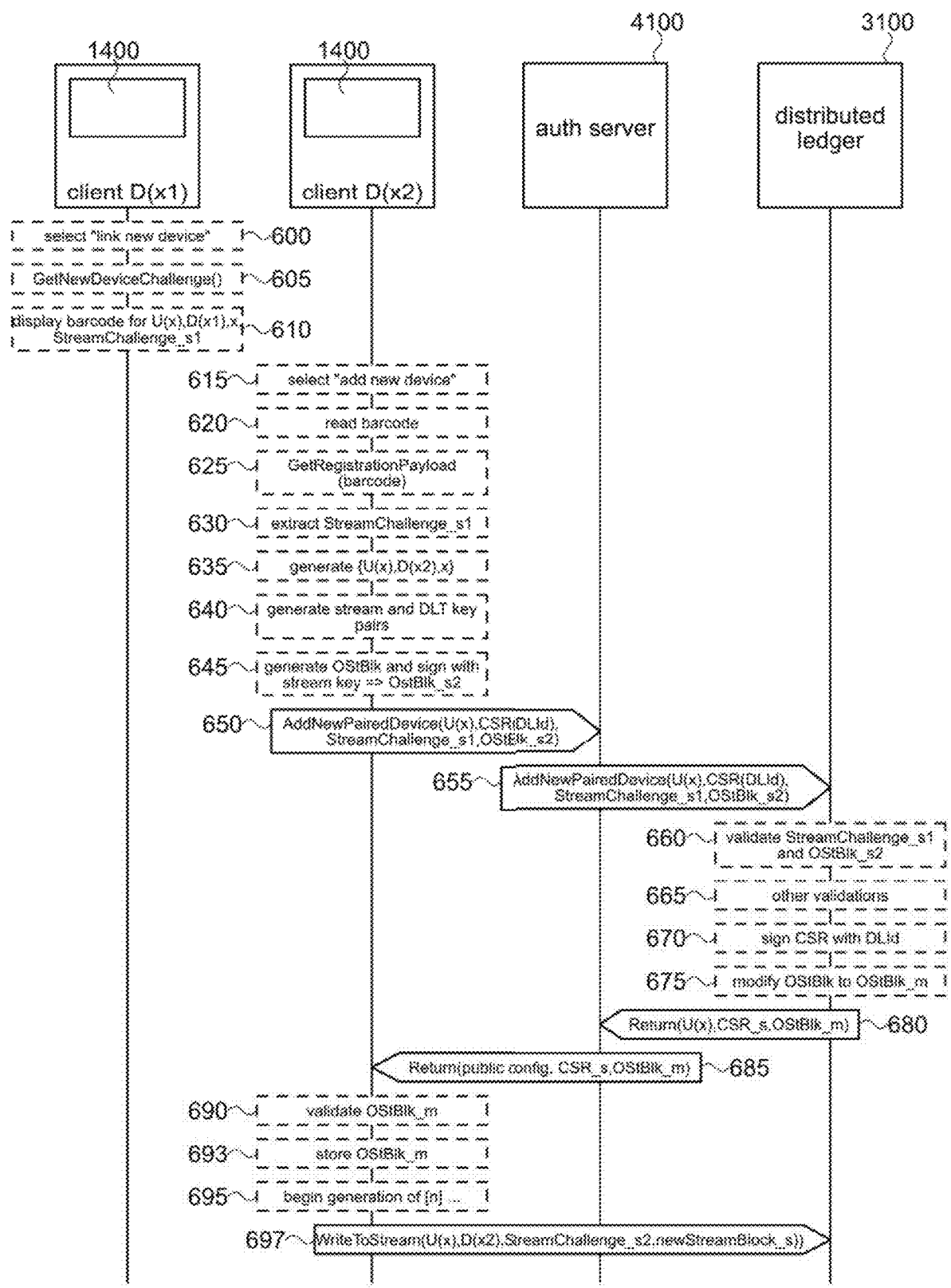
FIG. 7 depicts a general sequence of actions in an algorithm for registering a new device of an existing account.

FIG. 7 shows an example implementation of a registration process for use when an end user U(x) has an already-registered device D(x1) registered for use with an app (x) and is streaming chained identifiers [n] to the distributed ledger 3100. To access their account from a device to be registered D(x2), a registration process similar to that shown in FIG. 6 is used in one implementation. In FIG. 7, however, the registration process for the device to be registered D(x2) takes advantage of the user's possession of the already-registered device D(x1).

In FIG. 7, an already-registered device D(x1) runs app (x). Through a user interface, the user selects a function that links a new device such as function "link new device" shown in step 600. The underlying machine codes 1400 respond by invoking a function shown in the figure, for example, as GetNewDeviceChallenge( ) in step 605. The machine codes 1400 generate a barcode from a number of values. The barcode includes data that identifies the stream name U(x), D(x),(x). The barcode further includes the stream challenge for already-registered device D(x1) signed with the private key of the DL key pair generated by already-registered device D(x1) and represented in step 610 as StreamChallenge_s1. This barcode is referred to as a "stream barcode".

Through a user interface, on the device to be registered D(x2), the user selects a function to add D(x2) such as "add new device" shown in step 615. The underlying machine codes 1400 respond by opening the camera to read the stream barcode from the screen of D(x1) in step 620. The use of a barcode is an example implementation. Other ways of providing the same information from D(x1) to D(x2) are employed in other implementations.

The machine codes 1400 of the device to be registered D(x2) are given access to the raw barcode information captured by the camera of the device to be registered D(x2) through a function (shown as GetRegistrationPayload(barcode)) in step 625. In step 630 the signed stream challenge prepared by D(x1) is extracted and saved. The stream name U(x),D(x2),(x) is generated in step 635. A key pair for this stream is generated by D(x2) in step 640, as well as a key pair for this stream to use with the distributed ledger 3100 (a DLT key pair).

In step 645 the origin stream block [000] for the stream U(x),D(x2),(x) is generated in part and signed with the stream key generated in step 640, giving signed origin stream block OStBlk_s2.

The machine codes 1400 in the device to be registered D(x2) call a function of the independent authentication server 4100 by passing a new device pairing message 650 containing U(x), a certificate signing request CSR, the stream challenge signed by D(x1) (StreamChallenge_s1), and the partial origin block signed by D(x2) (OStBlk_s2). The independent authentication server 4100 in turn calls a function on the distributed ledger 3100 to add a new paired device with a similar new device pairing message 655.

The distributed ledger 3100 validates both the signature of D(x1) as to StreamChallenge_s1 and the signature of D(x2) as to the signed partial origin block OStBlk_s2 in step 660. Other validations are performed in various implementations in step 665 (see step 535, above, for more detail). In step 670 the certificate signing request CSR is signed using the distributed ledger's key giving CSR_s.

Processing continues in a manner similar to that already described in the context of FIG. 6 with the modification of the origin stream block to give OStBlk_m (step 675), the return of initial registration response message (step 680) to the independent authentication server 4100 and eventually to D(x2) (step 685), the validation and storage of the OStBlk_m (steps 690 and 693), and the generation of stream blocks [n] . . . , etc., in step 695. Each generated block is written to the stream U(x),D(x2),(x) via a write request message 697 like write request message 593 discussed in FIG. 6.

Figure 8:
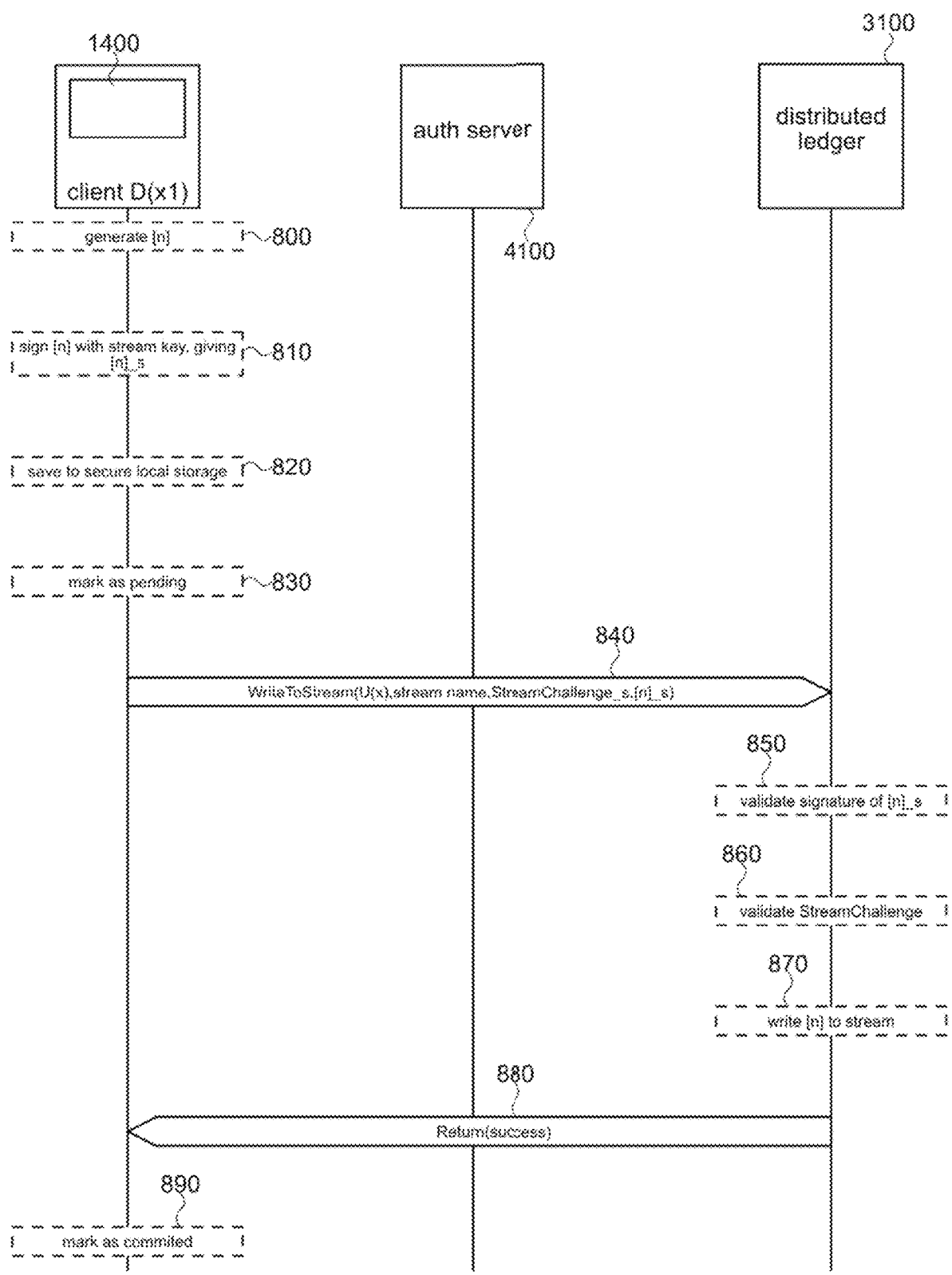
FIG. 8 depicts a general sequence of actions in an algorithm for writing a stream block to a distributed ledger system.

The operations associated with writing new stream block [n] to a stream will now be discussed in the context of FIG. 8. In general, the distributed ledger 3100 receives write request messages including information pertaining to stream blocks. The stream blocks pertain to stream names and so form respective streams of the stream blocks. Each of the stream blocks (other than the origin stream blocks) is chained to an immediate precedent stream block within each of the respective streams.

In this example implementation, processing begins at step 800 where a stream block [n] such as stream block 2000 is generated. In step 810, the block is signed with the key for the given stream. The signed stream block is represented as [n]_s. The stream block [n] is saved to a secure local storage of the device D(x) in step 820 and has a status of "pending" in step 830. In step 840 a write request message is sent to the distributed ledger 3100. The message includes the identifier for the account U(x), the stream name U(x),D(x),(x), a signed stream challenge StreamChallenge_s, and the signed stream block to be written [n]_s.

The distributed ledger 3100 validates the signatures and the stream challenge in steps 850 and 860, and then includes the stream block [n] in stream U(x),D(x),(x) by adding it to a chain block stored in the distributed ledger 3100. Successful completion is returned in step 880, after which the status of the stream block [n] is becomes "committed."

In one alternative implementation, the entirety of the content of the new stream block [n] is not included in the write request message 840. In this implementation, the ninth field as discussed with respect to stream block 2000 is omitted since the chained identifier store 3000 can compute such a hash itself. In this implementation, the chained identifier store 3000 performs this hash computation itself for each block and stores the result locally in connection with the given block to facilitate the later processing of stream proofs.

This alternative implementation avoids the transmission of information that can be readily computed, reduces the network load, and improves security by avoiding the exposure to interception of the complete stream block.

In yet another alternative implementation, the seventh field as discussed in the context of stream block 2000, namely, the hash of the immediate precedent in the stream, is also not transmitted. The chained identifier store 3000 already has all of the stream blocks from the origin block [000] up to [n], and determines for itself the hash for the immediate precedent of any given stream block. In this implementation, unless a party, who intercepts the stream information minus the hashes, possesses the entire stream back to the origin block, that party can never correctly compute the missing hashes.

In implementations where entire stream blocks are sent from the device D(x) to the chained identifier store 3000 (or the distributed ledger 3100), the write request message is said to "include stream blocks". In implementations in which the entire stream blocks are not transmitted, but omit either or both of the hash fields for the current or immediate precedent stream blocks, and rely on the chained identifier store 3000 (or the distributed ledger 3100) to compute the omitted hash value(s), the write request message is said to include "stream block information less one or more block hash values" or is said to be "free of one or more block hash values". A more general way to refer to either implementation is to say that the write request message includes "stream block information" or includes "information pertaining to stream blocks".

Figure 9:
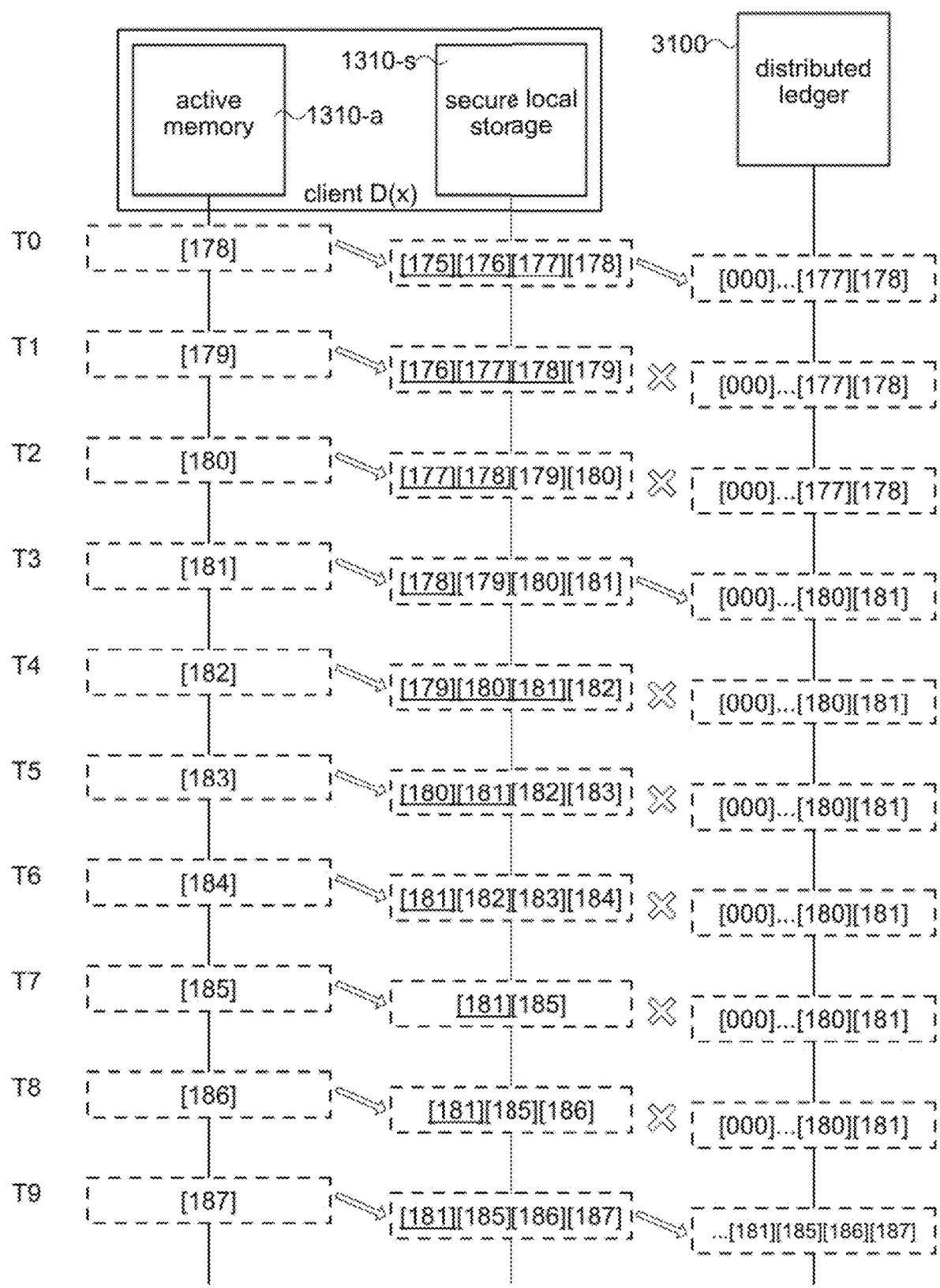
FIG. 9 explains, in pictorial form, an algorithm for handling communication interruptions arising while writing stream blocks to a distributed ledger system.

FIG. 9 illustrates an implementation of processing when the client D(x) is offline for a short time. In FIG. 9, the client device D(x) is shown with active memory 1310-*a* and secure local storage 1310-*s* as aspects of memory 1310 illustrated in FIG. 2.

At a given time T0, the active memory 1310-*a* stores newly-generated stream block [178] of a given stream U(x),D(x),(x). Stream block [178] is stored substantially simultaneously in secure local storage 1310-*s*. The secure local storage 1310-*s* stores all of the stream blocks in the moving window w. In this implementation example, the maximum size of the secure local storage 1310-*s* allocated for storing stream blocks [n] is enough to hold four stream blocks. At T0, the secure local storage 1310-*s* stores previously-generated stream blocks [175][176][177] and newly-generated stream block [178]. As explained above, stream block [178] is initially marked with a pending status, but when distributed ledger 3100 reports that the stream block has been successfully committed, the stream block [178] is also marked with a committed status indicator. In FIG. 9, each committed one of the plurality of stream blocks is shown as underlined in secure local storage 1310-*s*. The distributed ledger 3100 stores the entire stream of stream blocks from the origin stream block [000] through stream block [178].

By the time of T1 in this example, stream block [178] has been marked as committed and is shown as underlined in secure local storage 1310-*s*. At a next given time T1, the next stream block [179] is generated in the active memory 1310-*a* and then is stored in the secure local storage 1310-*s*. The limited space allocated from secure local storage 1310-*s* requires the deletion of stream block [175]. At this time, however, the stream block [179] is prevented by network or other effects from being sent to the distributed ledger 3100 as represented by a hollow "x". Therefore, the distributed ledger 3100 does not yet store newly-generated stream block [179].

At a next given time T2, stream block [180] is generated in active memory 1310-*a* and written into secure local storage 1310-*s*, causing stream block [176] to be deleted locally. The temporary connection issue with memory 1310 still prevents any writes to the stream.

At time T3, as stream block [181] causes the deletion of [177] from the secure local storage 1310-*s*, the connection problem is resolved and all the pending blocks [179] . . . [181] are written to the distributed ledger 3100. Since the connection issue was resolved before the exhaustion of the capacity of the secure local storage 1310-*s* to store pending stream blocks, no stream blocks were lost.

At time T4, the connection with hardware processor 1300 goes out again, and progress continues at time T5 as with T2, and again at time T6.

At time T7, however, the generation of stream block [185] would result in the exhaustion of the capacity of secure local storage 1310-*s* to store pending blocks. To maintain the integrity of the stream so that each stream block is linked to its predecessor, the stream block [185] is generated so as to contain the hash of stream block [181] as its immediately preceding stream block. Stream blocks [182]-[184] (i.e., the ones of the plurality of stream blocks in the moving window lacking the committed status indicator) are dropped by a deletion operation and never sent to distributed ledger 3100. Their absence makes room for more stream blocks, and so at times T8 and T9 new pending stream blocks [186] and [187] are respectively generated. At time T9, the connection with distributed ledger 3100 is working and so stream blocks [185]-[187] take their place in the chain after stream block [181].

To review, the secure local storage 1310-*s* stores stream blocks, making room as needed to accommodate new stream blocks but always retaining at least one committed stream block. Once a threshold indicates that further storage of another stream block cannot be accommodated without deleting the most-recently committed stream block (for example, in response to a communication status with the chained identifier store), the pending stream blocks are purged, and newly-generated stream blocks are chained to the most-recently committed stream block.

The following is an example application programming interface (API) The API is provided as a teaching example of how a concrete implementation of the algorithms described above could be approached.

Table 1 below provides sample data structures that relate to the sample algorithms in Tables 2 through 9. These tables include statements that resemble a high-level programming language. Those familiar with this field will understand how to vary the numerous specific details of this teaching example to develop machine codes appropriate to the hardware processor of their computing system, server, and/or device.

TABLE 1

API structure definitions

```
package blocks
const (
   // StreamBlockVersion is the current supported/implemented
   StreamBlock struct version.
   StreamBlockVersion uint32 = <version>
```

TABLE 1-continued

API structure definitions

```
// StreamBlockLengthBytes is the length [in bytes] of a
StreamBlockStruct data struct.
Stream BlockLengthBytes = <int>
// StreamIDLengthBytes is the length [in bytes] of the Stream ID.
StreamIDLengthBytes = <int>
// StreamBlockSignatureLength is the length [in bytes] of the
cryptographic signature
StreamBlockSignatureLength = <int>
// StreamBlockSaltLength is the length [in bytes] of the fresh salt
of a block StreamBlockSaltLength = <int>
// StreamBlockHashLength is the length [in bytes] of the
SHA3-256 hash of a block
StreamBlockHashLength = <int>
// StreamBlockBodyLengthBytes is the length [in bytes] of just
the hashed and signed material;
// that is to say, the block body sans BlockHash and Signature
StreamBlockBodyLengthBytes = StreamBlockLengthBytes -
(StreamBlockHashLength + StreamBlockSignatureLength)
)
const (
  // MaxStreamBlockChainLength is the maximum number of blocks
  that may be either stored
  // locally at a client or transmitted by a client to Fabric.
  // The StreamBlockChain needs to be limited in size in order to
  not exceed reasonable limits of
  // secure storage or transmission
  MaxStreamBlockChainLength = <int>
  // StreamChallengeLength is number of stream blocks that need to
  be sent as proof that an identity
  // is authorized to perform an action with that stream, i.e. extend
  the stream or
  // login using the stream
  StreamChallengeLength = <int>
)
/*
StreamBlockChain is the struct representing the array of blocks
*/
type StreamBlockChain struct {
  Version uint32
  Blocks [MaxStreamBlockChainLength]StreamBlock
}
/*
StreamBlock is the struct representing the concrete stream block
within Chaincode, it currently represents the version "1" block.
*/
type StreamBlock struct {
  Version uint32
  SequenceNum uint32
  Time int64
  AccountID [16]byte
  DeviceID [16]byte
  Stream ID [StreamIDLengthBytes]byte
  PrevBlockHash [32]byte
  Salt [StreamBlockSaltLength]byte
  BlockHash [StreamBlockHashLength]byte
  Signature [StreamBlockSignatureLength]byte
}
```

ConstructOriginStreamBlock generates and returns an origin hash block. At this stage, the client only partially fills in the fields of the originHashBlock, submits it upon a Registration request. Upon successful registration, it receives back a fully filled in and signed originStreamBlock that then begins the root of its stream chain. The block is signed by the privateKey that is passed is as privateKeyBytes.

TABLE 2

ConstructOriginStreamBlock

```
func ConstructOriginStreamBlock(deviceID string, streamID []byte,
streamPrivateKeyBytes []byte) (originStreamBlock StreamBlock,
err error) {
```

TABLE 2-continued

ConstructOriginStreamBlock

```
  //DeviceID as bytes
  deviceIDAsBytes, _ := uuid.Parse(deviceID)
  // Check length of streamID. This is the public key
  if len(streamID)!= StreamIDLengthBytes {
    return StreamBlock{}, error()
  }
  streamBlock := StreamBlock{
    Version: StreamBlockVersion,
    SequenceNum: 0,
    Time: <currentTime>,
    DeviceID: deviceIDAsBytes,
    StreamID: streamID,
  }
  // Compute the hash the StreamBlock
  hash, _ := streamBlock.HashStreamBlock()
  streamBlock.BlockHash = hash
  // Sign the stream block
  signature, _:= streamBlock.Sign(streamPrivateKeyBytes)
  streamBlock.Signature = signature
  return streamBlock, nil
}
```

ConstructNextStreamBlock takes a stream block and generates the next one is sequence. This means that it increments the sequenceNum, sets newBlock.PrevBlockHash=block.BlockHash, sets a new salt, hashes, and signs the block.

TABLE 3

ConstructNextStreamBlock

```
func ConstructNextStreamBlock(block StreamBlock,
streamPrivateKeyBytes []byte)
(newStreamBlock StreamBlock, err error) {
  newBlock := StreamBlock{
    Version: StreamBlockVersion,
    SequenceNum: block.SequenceNum + 1,
    Time: <currentTime>
    AccountID: block.AccountID,
    DeviceID: block.DeviceID,
    StreamID: block.StreamID,
  }
  // Set the prevHash of the block to the hash of the previous
  stream block newBlock.PrevBlockHash, =
  block.HashStreamBlock()
  // Set the Salt of the newBlock
  // Generate a fresh salt
  newBlock.Salt, := GetRandomBytes(StreamBlockSaltLength)
  // Compute the hash the streamBlock
  hash, err := newBlock.HashStreamBlock()
  newBlock.BlockHash = hash
  // Sign the stream block
  signature, := newBlock.Sign(streamPrivateKeyBytes)
  newBlock.Signature := signature
  return newBlock, nil
}
```

Sign is a StreamBlock method that signs a block, adds the signature string to the block.

TABLE 4

Sign

```
func (block StreamBlock) Sign(privateKeyBytes []byte)
(signature []byte, err error) {
  // Hash the streamBlock. This will generate a hash of all
  fields in the stream
  block
```

TABLE 4-continued

| Sign |
|---|
| // except for hash itself and signature<br>  hash, := block.HashStreamBlock()<br>  // Sign the stream block using its hash as input<br>  signature, _ = Sign(hash, privateKeyBytes)<br>  return signature, nil<br>} |

VerifyAsOriginBlock is a special case of verifyBlock that verifies an origin block cryptographic signature according to our rules for origin blocks. Because these blocks do not have a chain (they are the root), they are only partially complete blocks and therefore special cases of the verification process.

TABLE 5

| VerifyAsOriginBlock |
|---|
| func (block StreamBlock) VerifyAsOriginBlock() (bool, error) {<br>  // Block can't be an origin block<br>  if block.SequenceNum!= 0 {<br>    return false, nil<br>  }<br>  modifiedBlock := block<br>  /* Zero the fields the clients didn't know at origin signing time */<br>  modifiedBlock.AccountID = [16]byte{}<br>  modifiedBlock.PrevBlockHash = [32]byte{}<br>  modifiedBlock.Salt = [32]byte{}<br>  tryHash, := modifiedBlock.HashStreamBlock()<br>  if!CompareHashes(tryHash, block.BlockHash) {<br>    // Expected hash and declared (in-block) hash do not match<br>    return false, nil<br>  }<br>  return CheckSignature(tryHash, block.Signature, block.Stream ID)<br>} |

VerifyBlock verifies that a StreamBlock is a proper, well-formed and cryptographically correct block to extend the chain represented by 'history'. The parameter 'history' represents the full chain history. If it is empty, only 'block' is verified to be cryptographically self-consistent, regardless of the value of 'shallow' NOTE: 'history' is expected to be ordered with oldest-first (index 0). The parameter ' shallow' determines whether the entire chain should be checked, or just the previous block in the chain. To be clear: With 'shallow=true' 'block' is verified against 'history[len(history)-1]' only, while with 'shallow=false' the entire chain is checked.

TABLE 6

| VerifyBlock |
|---|
| func (block StreamBlock) VerifyBlock(history []StreamBlock) (bool, error) {<br>  if history == nil \|\| len(history) == 0 {<br>    return false, error()<br>  }<br>  // NOTE: history should be oldest-first/most-recent-last<br>  lastBlock := history[len(history)-1]<br>  if block.Version!= lastBlock.Version {<br>    return false, error()<br>  }<br>  if block.AccountID!= lastBlock.AccountID {<br>    return false, error()<br>  }<br>  if block.DeviceID!= lastBlock.DeviceID {<br>    return false, error()<br>  }<br>  if block.StreamID!= lastBlock.StreamID {<br>    return false, error()<br>  } |

TABLE 6-continued

| VerifyBlock |
|---|
| // Can't add a block that is older than latest<br>  if block.Time < lastBlock.Time {<br>    return false, error()<br>  }<br>  // Sequence number must be latest + 1<br>  if block.SequenceNum!= (lastBlock.SequenceNum + 1) {<br>    return false, error()<br>  }<br>  // Make sure Salt is not trivial/zero-byte data<br>  emptyByteVar := [32]byte{}<br>  if block.Salt == emptyByteVar {<br>    return false, error()<br>  }<br>  // Make sure BlockHash is... actually the hash of the block<br>  actualHash, err := block. HashStreamBlock()<br>  if err!= nil {<br>    return false, error()<br>  }<br>  if!CompareHashes(actualHash, block.BlockHash) {<br>    return false, error()<br>  }<br>  signatureOk, := CheckSignature(block.BlockHash, block.Signature, block.StreamID)<br>  if!signatureOk {<br>    return false, error()<br>  }<br>  computedPrevBlockHash, _ := lastBlock.HashStreamBlock()<br>  if!CompareHashes(computedPrevBlockHash, block.PrevBlockHash) {<br>    return false, error()<br>  }<br>  return true, nil<br>} |

HashStreamBlock is a helper function to hash a stream block. This will hash all of the fields of the StreamBlock minus BlockHash and Signature, which are not used in hashing

TABLE 7

| HashStreamBlock |
|---|
| func (block StreamBlock) HashStreamBlock() ([32]byte, error) {<br>  // Serialize streamBlock to bytes<br>  hash := sha3.Sum256(block.ToBytes())<br>  return hash, nil<br>} |

MakeStreamChallenge is a simple challenge variation that creates the stream challenge for a given stream history.

TABLE 8

| MakeStreamChallenge |
|---|
| func MakeStreamChallenge(history []Stream Block) ([32]byte, error) {<br>  // To hash the stream history, simply concatenate them as a contiguous<br>  // stream of bytes which will be our hash input<br>  var concatBlockBuffer bytes.Buffer<br>  for block in range history {<br>    // Serialize each block to a byte representation<br>    blockBytes := block.ToBytes()<br>    // Append the hash-able part of the block to our concat buffer<br>    lenWritten, err :=<br>    concatBlockBuffer.Write(blockBytes[0: StreamBlockBodyLengthBytes])<br>  } |

TABLE 8-continued

MakeStreamChallenge

```
    // Now that we have concatenated all of the hash-able parts of
    our blocks together in a contiguous buffer, we hash it
    hash := sha3.Sum256(concatBlockBuffer.Bytes())
    return hash, nil
}
```

CheckStreamChallenge compares supplied hash+signature (streamChallengeSigned) of last N many blocks against given blocks in the ledger (lastNBlocks)

TABLE 9

CheckStreamChallenge

```
func CheckStreamChallenge(corshaAccountID, streamID,
streamChallengeSigned
string, lastNBlocks []StreamBlock) (bool, error) {
if len(corshaAccountID) == 0 {
    return false, error()
}
if len(streamIDBase64) == 0 {
    return false, error()
}
if len(streamChallengeSigned) == 0 {
    return false, error()
}
// Currently requiring either 1 block for history or
StreamChallengeLength
// number of blocks. If checkStreamChallenge is called from
primeStream then
// lastNBlocks must have just one block (originStreamBlock).
// All other calls to checkStreamChallenge after primeStream can
// expect to have the minimum number of challenge blocks in the history
N := len(lastNBlocks)
if N!= 1 && N!= StreamChallengeLength {
return false, error()
}
// Get hash and signature bytes
hash := streamChallenge.Hash
signature := streamChallenge.Signature
// Verify signature
signatureOk, err := CheckSignature(hash, signature, streamID)
if!signatureOk {
return false, error()
}
// Check that pub key is the same as the one used in our actual block/
stream history?
// NOTE: we ensured len(streamBlocks) > 0 at the start of this func
if lastNBlocks[0].StreamID!= streamIDArray {
    // This would be a sign of someone trying to abuse chaincode args
    return false, error()
}
ourHash, err := MakeStreamChallenge(lastNBlocks)
if!CompareHashes(ourHash, hash) {
    return false, error()
}
// At this point:
// - The supplied challenge was properly signed,
// - The stream ID/pub key used in signing matches the streamID
already in the ledger
// - The supplied hash matches what we get when we hash the last
N blocks from the ledger
// for the given stream.
// So challenge accepted
return true, nil
}
```

AppendBlock appends a new block to the given StreamBlockChain. If StreamBlockChain is already full, an item will be deleted from the front. Note: The proposed block will be verified to make sure it is good to add to this chain

TABLE 10

AppendBlock

```
func (stream StreamBlockChain) AppendBlock(proposedBlock
StreamBlock) error {
success, err := proposedBlock.VerifyBlock(stream.Blocks, true)
if!success {
    return error()
}
len := stream.Length()
if len == MaxStreamBlockChainLength {
    // Our stream chain is full and we need to pop one off the front
    in order to add
    // this new proposed block
    stream.Blocks.popHead()
    len--
}
stream.Blocks[len] = proposedBlock
return nil
}
```

The foregoing API is not intended to provide a complete solution, but just an implementation example for the algorithms described earlier. Further functions are necessary to provide a complete solution.

One further function involves logout by the user. In an example implementation, the customer application server 4600 handles this through session management.

Yet another further function involves handling a user's deletion of a particular stream U(x),D(x),(x) from a device. When an account within an app has been deleted from a device, the stream is frozen at the distributed ledger 3100 so that no further writes or login attempts may be made using that stream. Upon detection that a stream has been deleted from a device, a call is placed from the device to the independent authentication server 4100. The call identifies the user's account U(x) and the stream U(x),D(x),(x), and includes a stream challenge signed by the client. The independent authentication server 4100 deletes any pending tokens for U(x), and then the independent authentication server 4100 calls a function of the distributed ledger 3100 to delete the stream.

The distributed ledger 3100 validates the request, revokes the authority of any identifiers associated with the stream, and then marks the stream as frozen.

Another further function for a complete implementation involves deregistering the entire account for a user. When an account is deregistered, its associated streams must all be frozen. Deletion of the streams is an option, but freezing the streams permits a full audit history. In the context of the above examples, the customer application server 4600 sends the independent authentication server 4100 an instruction to deregister the entire account of user U(x). When deregistering an account, the independent authentication server 4100 deletes any pending login tokens for the U(x). The independent authentication server 4100 then calls the distributed ledger 3100 to mark all streams associated with U(x) as frozen and revokes the authority of any identifiers associated with the U(x).

In one implementation, communications between the client device D(x), the independent authentication server 4100, and the distributed ledger 3100 are all implemented using mutual TLS.

The multiple concrete implementations above are provided so the reader already familiar with this technology is taught how to obtain the benefits of enhanced security.

The implementations discussed above also have the beneficial effect of increased efficiency for users, reducing the operations that users are forced to undertake and reducing the time users must spend in completing authentication operations.

Moreover, the increased efficiency also is realized in the internal functioning of the devices themselves, including the client device U(x), the independent authentication server 4100, the customer application server 4600, and the distributed ledger 3100. For example, by streaming the chained identifiers in the background, a client device has fewer operations to perform at the time of an authentication event when compared with OTP or other multifactor systems.

Other API features and other functions will occur to those familiar with this technology, and such variations are to be expected in the light of the complete and detailed teaching examples provided above.

Figure 10:
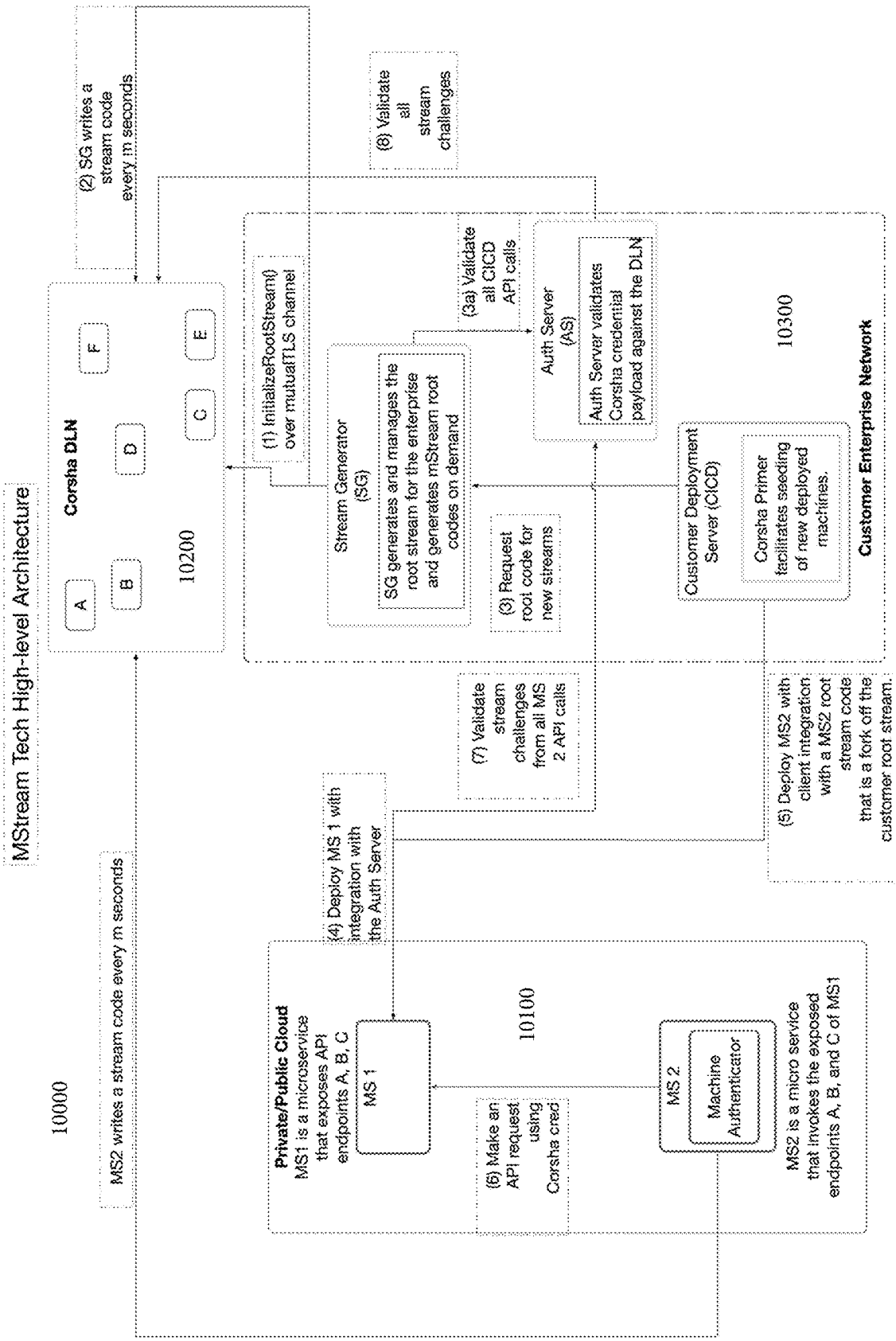
FIG. 10 illustrates a system and framework according to an embodiment of the disclosure.

FIG. 10 illustrates a system and framework according to an embodiment of the disclosure.

The system and framework illustrated in FIG. 10 provide for secure authentication of machines using a streaming multi-factor authentication model.

Streaming authentication provides a dynamic, out-of-band authentication factor for securing machine-to-machine connections. The architecture illustrated in FIG. 10 provides properties of a dynamic, one-time use, dynamically evolving credential that can be used to authenticate machine-to-machine connections, such as application programming interface (API) calls. Embodiments and operations of the general streaming multi-factor authentication model have been described above with respect to FIGS. 1 to 9.

A common use case of the system and framework 10000 illustrated in FIG. 10 is the authentication of machines or network elements, such as microservices, running in docker containers that are seeking to access a network of an enterprise via an API. In the context of machine-to-machine connections and authentication, a machine may include servers, virtual or physical, pods in orchestration platforms, application containers, mobile devices, applications on mobile devices, IoT devices, etc. In such a model, the enterprise may be concerned with ensuring that only authorized machines are allowed to access the customer enterprise network through the API.

In one iteration, the enterprise is the responsible party that implements the framework and requires streaming authentication for network access.

In another iteration, the owner of the machine is the responsible party that initiates use of the framework for authentication when, for example, the network is a software-as-a-service (SaaS) platform that stores data belonging to the owner of the machine. In this latter iteration, the enterprise may architect the network to allow for implementation of the framework, thereby enabling the responsible party to essentially "turn on" or activate the streaming authentication enabled by this framework. This model may be similar to models in which public cloud providers create frameworks for custom implementation of third-party multi-factor authentication solutions for authenticating end users.

Accordingly, the system and framework illustrated in FIG. 10 may rely on a per machine seeding process that forks and leverages the trust of a root stream of an enterprise via an authenticator of the machine (i.e., a respective machine authenticator of a deployed machine). Thereby, a stream generator may sufficiently correlate an owner of the machine with legitimate access to the presented account credentials. On positive correlation, the machine authenticator may initiate an authentication stream that associates the machine to the responsible party itself that has been authorized to have legitimate network access, for example to an API. Thus, when the machine authenticator is successfully seeded, the authenticator may prime its authentication stream with the distributed ledger network from the seeded machine state.

For example, as illustrated in FIG. 10, the system and framework 10000 may include a private or public cloud network 10100, a distributed ledger network (DLN) 10200, and a customer enterprise network 10300.

One or more machines may be provided in the private or public cloud network 10100, for example such as servers or instances of virtual machines executing on one or more servers.

A machine, for example, may include at least one microservice. However, the configuration of a machine including at least one microservice is merely an example, and the machine may include any implementation for providing an authenticator and an authentication stream as described herein. FIG. 10 illustrates a first microservice MS1 and a second microservice MS2, but the architecture of the microservices is not limited to the only configuration of FIG. 10.

The microservice may be a first microservice MS1 that exposes API endpoints and is deployed in conjunction with an authentication server and validates stream challenges provided for API calls against an authentication server AS.

The microservice may also be a second microservice MS2 of a machine authenticator (i.e., a respective machine authenticator of a deployed machine) that writes a stream code or stream block to the DLN 10200 and invokes the exposed endpoints to make an API request using credentials. The second microservice MS2 may be coupled with or provide for execution of a machine authenticator that emits a continuous and periodic authentication stream for the purpose of authenticating to an exposed API endpoint of the first microservice MS1 or a collection of exposed APIs from a machine or a collection of machines. The machine authenticator as well as the network client may be able to communicate with and be co-located with the machine. The machine authenticator may be distributed as a single binary or as containerized application, or as a proxy or as a collection of multiple containerized applications. For example, the second microservice MS2 may be deployed with a machine authenticator that manages a unique authentication stream that represents second microservice MS2.

A unique machine authenticator executes alongside each of the deployed machines of the enterprise. Thus, when multiple deployed machines exist, each of the deployed machines may include its own unique authenticator that generates an authentication stream specific to the particular deployed machine. These deployed machines may be microservices or other end points such as edge devices. The machine authenticator may complete the registration for the machine's authentication stream (using the root registration payload provided by the stream generator), update that stream by periodically writing to the stream, and provide the machine functionality to produce credentials for invoking API calls to other machines.

Once the machine authenticator has been verified through its deployment payload, the machine (e.g., second microservice MS2 and machine authenticator) may establish a continual stream of authentication blocks that are transmitted and written to the distributed ledger network DLN 10200. On a configurable time interval, the machine authenticator will transmit over a secure channel an instance-specific stream code to the distributed ledger network DLN. The entry will incorporate non-personalized and non-identifying data blocks into a single hash block or code in order uniquely associate the hash with the registered machine. The entry and data blocks may be described as non-personalized and non-identifying because the entry and data blocks are not dependent on personal attributes of any end human user or machine environment. However, the unique combination of data blocks is implicitly identifying, and hence such combination may be associated with the machine for the sake of authentication. The machine authenticator will also store some quantity of most recently committed stream blocks or codes in secure local storage, for subsequent presentation and for verification of the machine at the point of authentication, such as by the authentication server AS.

If the machine does not possess network connectivity to the distributed ledger network DLN, the machine authenticator may cache the pending stream blocks or codes. When connectivity to the distributed ledger network DLN is restored, the machine authenticator may submit the pending stream blocks for appending to the authentication stream to the distributed ledger network DLN. This guarantees continuity in the authentication stream even given periods of offline activity.

Via the machine authenticator, the enterprise may utilize the framework as either a primary or an additional authentication factor in addition to the traditional static API token or any other primary factor that is utilized to authenticate API requests of a machine. The machine authenticator supports seeding of an authentication stream, continuously streaming endpoint-specific hashes in stream blocks to the DLN 10200, communicating with the authentication server AS, and deregistering the authentication stream when the API no longer needs to be accessed.

The machine authenticator will generate stream machine blocks on the machine based on known and established stream block protocols, as described above, using random number generation accompanied to uniquely identify the authentication stream associated with the machine. The machine authenticator may continuously and dynamically stream these machine stream blocks to the DLN 10200 and in one instance will communicate with the customer enterprise network through encrypted channels. In another instance, the communication may be through unencrypted channels.

The machine authenticator may emit a single stream to authenticate a collection of API endpoints for a given machine. For example, a particular machine may be executing a webserver that exposes multiple representational state transfer (REST) API endpoints. A machine may use one stream to authenticate to another machine via the API and then call any of its API endpoints.

The DLN 10200 may be implemented as a distributed ledger of nodes (A, B, F, etc.) (e.g., a blockchain) maintaining nodes that will hold the streamed authentication information and will be used for authentication by the authentication server AS. The DLN 10200 may store stream codes or stream blocks provided by the authenticator of the machine. The DLN 10200 may also store stream codes or stream blocks provided by a stream generator SG of an enterprise of the customer enterprise network 10300 (i.e., enterprise stream blocks). In order to preserve the property of least privilege, clients are only permitted to write to the DLN 10200 while the authentication server AS may only initialize streams and read from the DLN 10200.

Other functions and descriptions of the DLN 10200 may be similar to those of the chained identifier store 3000 described with respect to FIG. 1, and thus a redundant description thereof is omitted.

The customer enterprise network 10300 may be a network of an enterprise. The customer enterprise network 10300 may include a stream generator SG, an authentication server AS, and a customer deployment server CICD. Although FIG. 10 illustrates a particular configuration of the customer enterprise network 10300, the configuration of the customer enterprise network 10300 is merely an example and the customer enterprise network 10300 and elements thereof, including the customer deployment server CICD, authentication server AS, and stream generator SG, may be distributed across various environments and platforms, including on-premises servers, cloud platforms, infrastructure as a service (IaaS), and private data centers.

The stream generator SG of the customer enterprise network 10300 may generate and manage a root enterprise stream of the enterprise and generate seeds on demand, such as forked stream codes, which are forked from the root enterprise stream code, such as by request of the customer deployment server CICD or agent of the CICD server upon deployment of a machine. Additionally, new stream codes generated by the stream generator SG for a root stream initialized with the root stream code, as well as seeds for deployed machines such as the forked root stream codes, may be provided to the DLN 10200. Thus, the stream generator SG may be considered as a client of the DLN 10200. Any new stream codes may be periodically provided to the DLN 10200, such as every n or m seconds, every minute, etc. to extend any valid authentication stream.

Figure 12A:
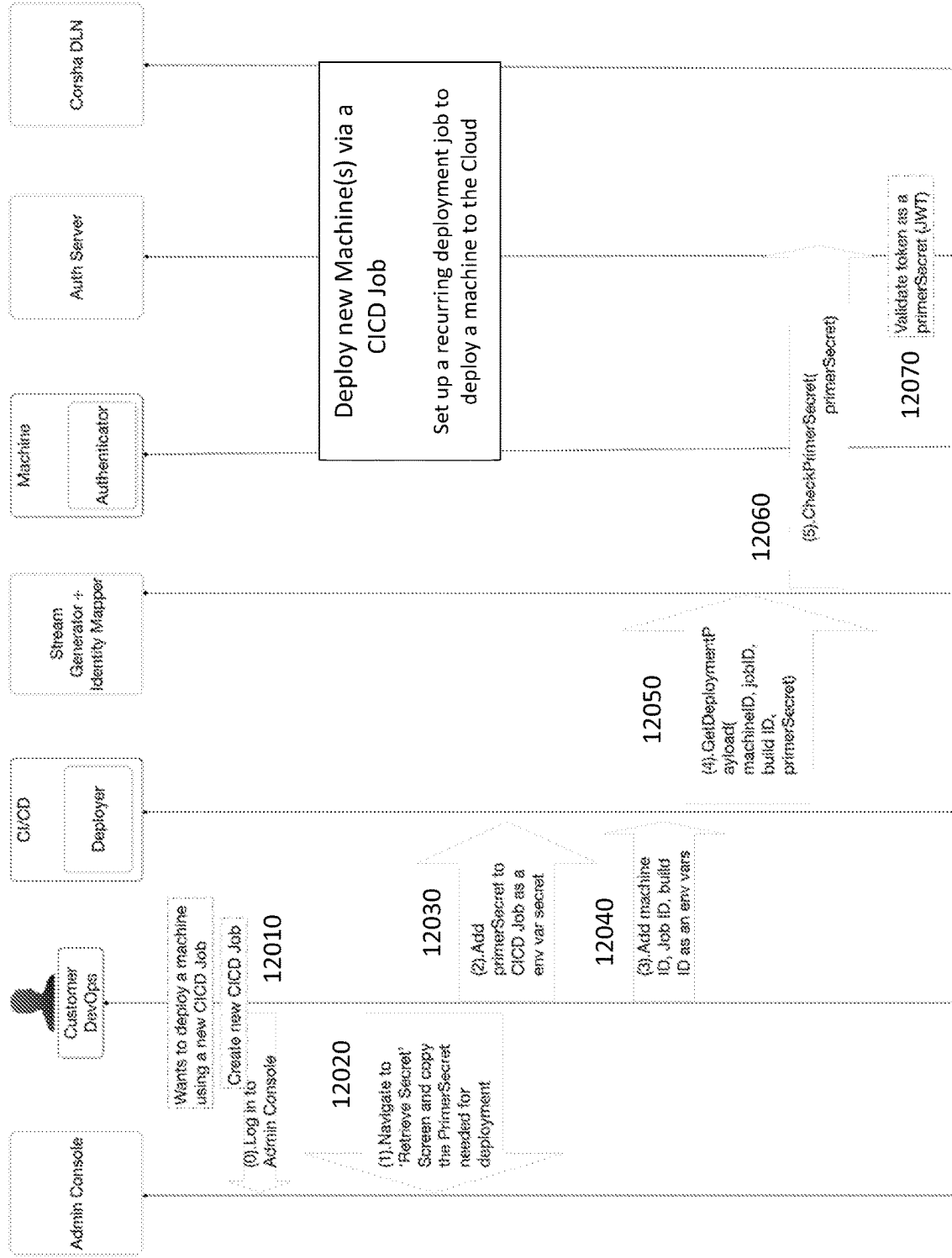
FIGS. 12A, 12B, 12C, 12D, 12E, 12F, and 12G illustrate a method and diagram of a machine authenticator initializing an authentication stream according to an embodiment of the disclosure.
Figure 12B:
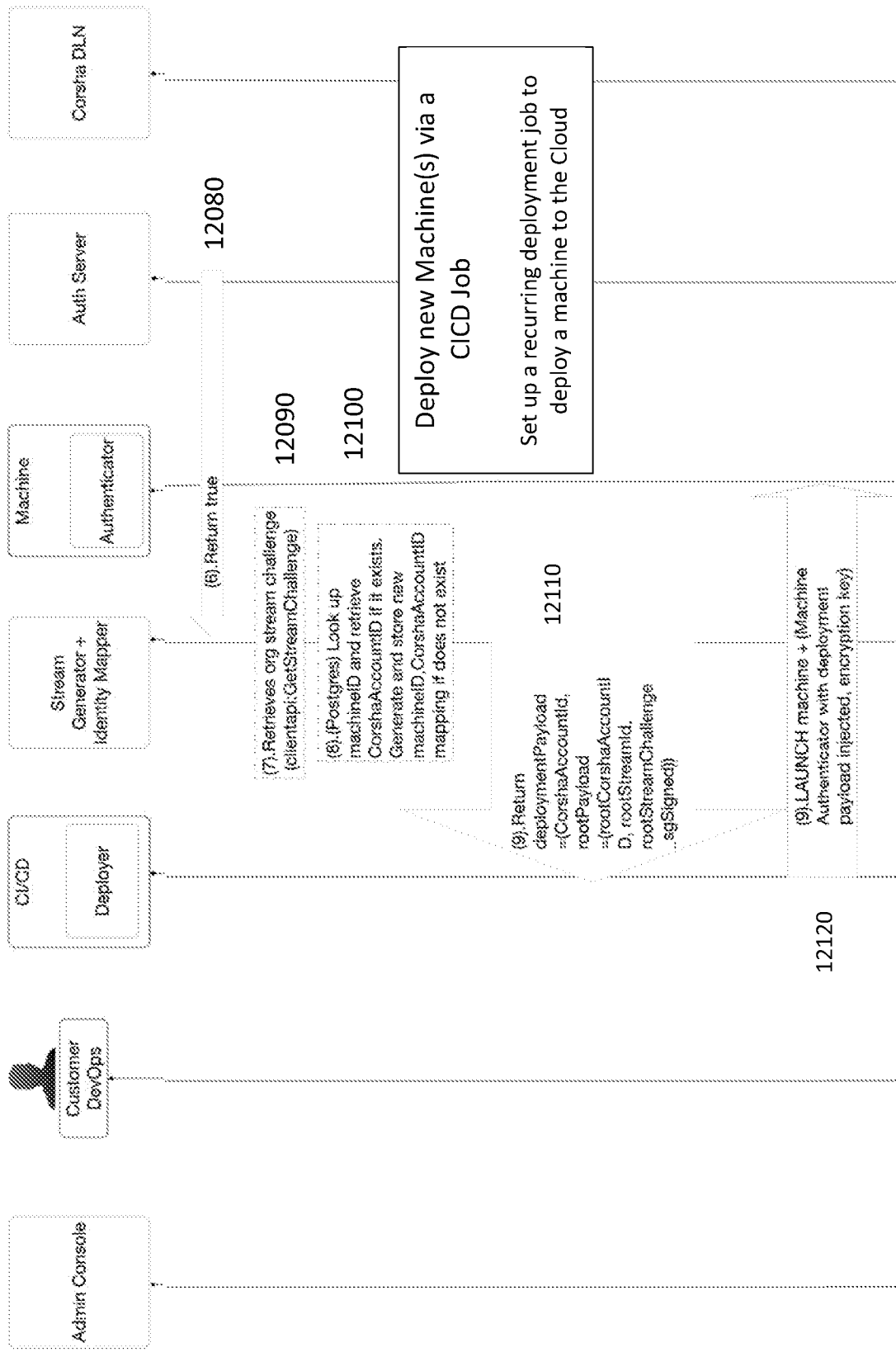
Figure 12C:
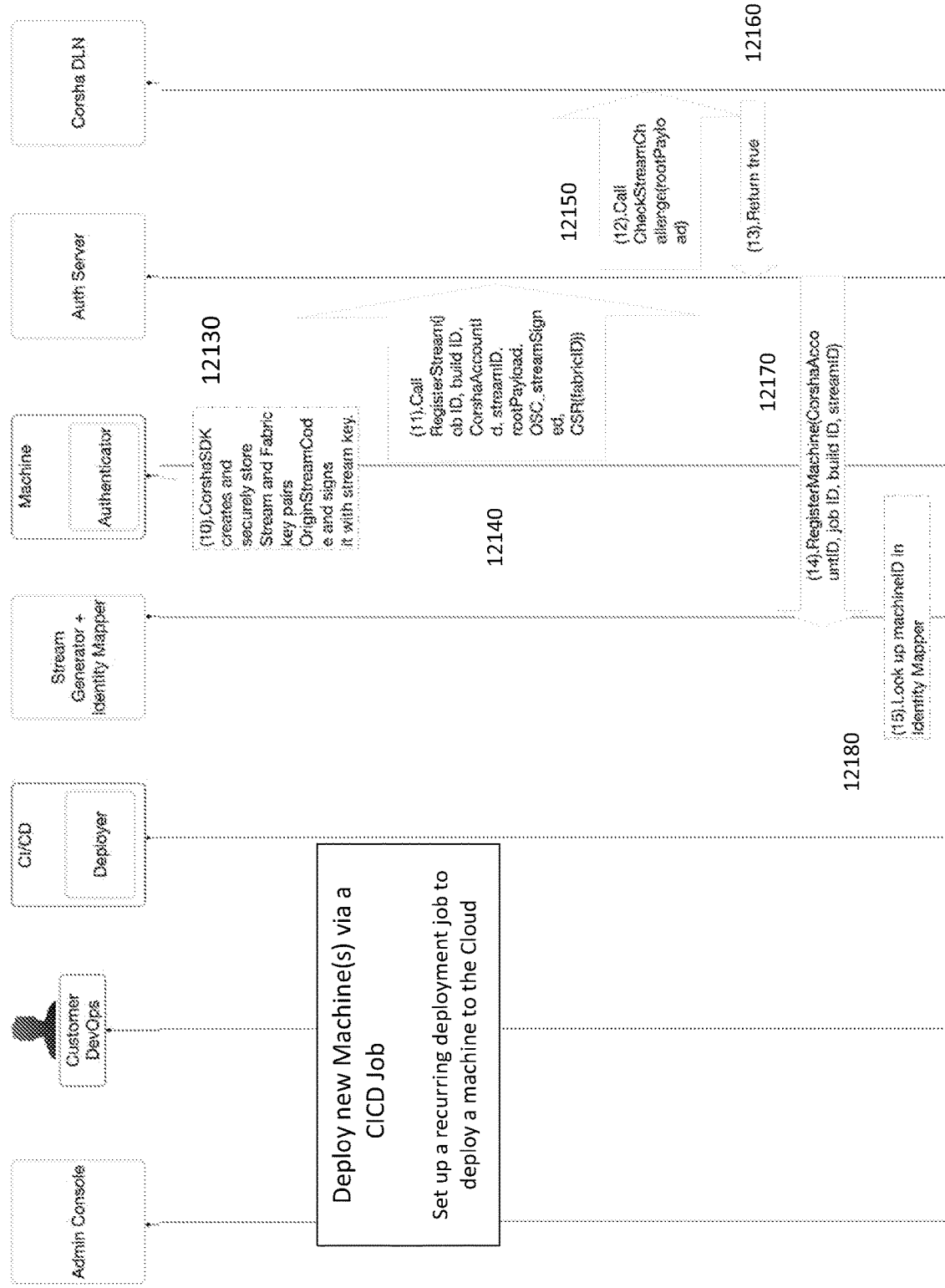
Figure 12D:
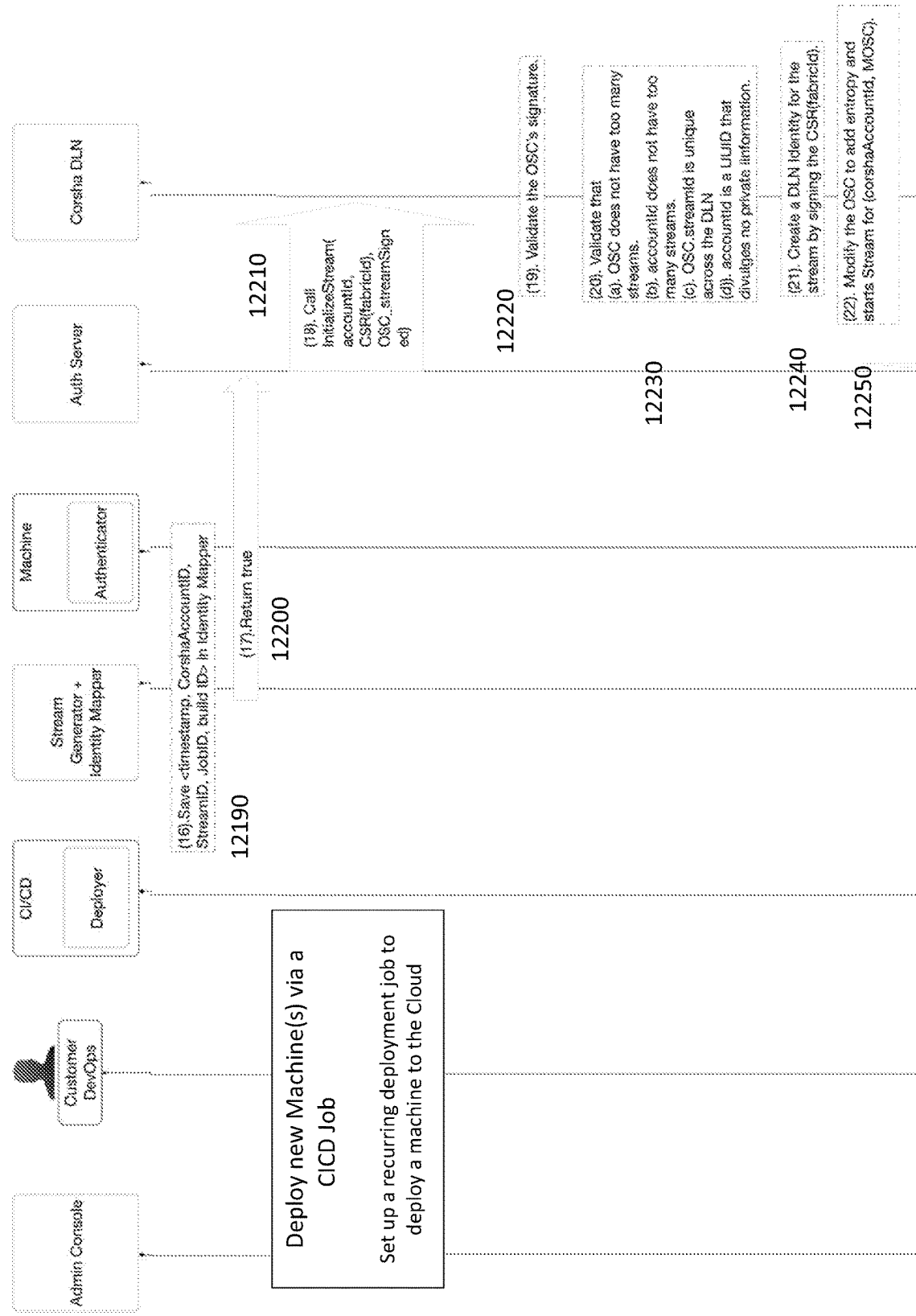
Figure 12E:
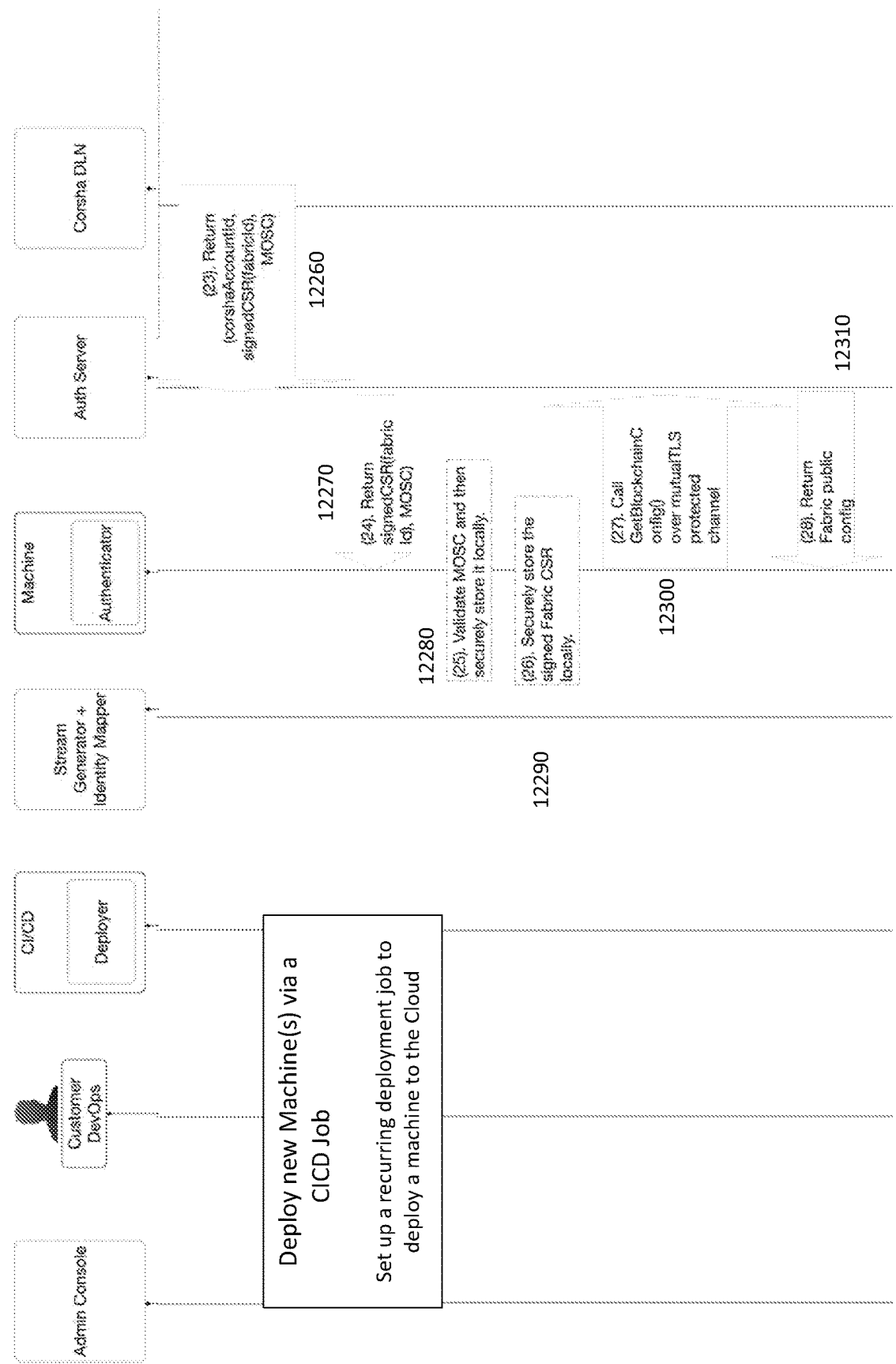
Figure 12F:
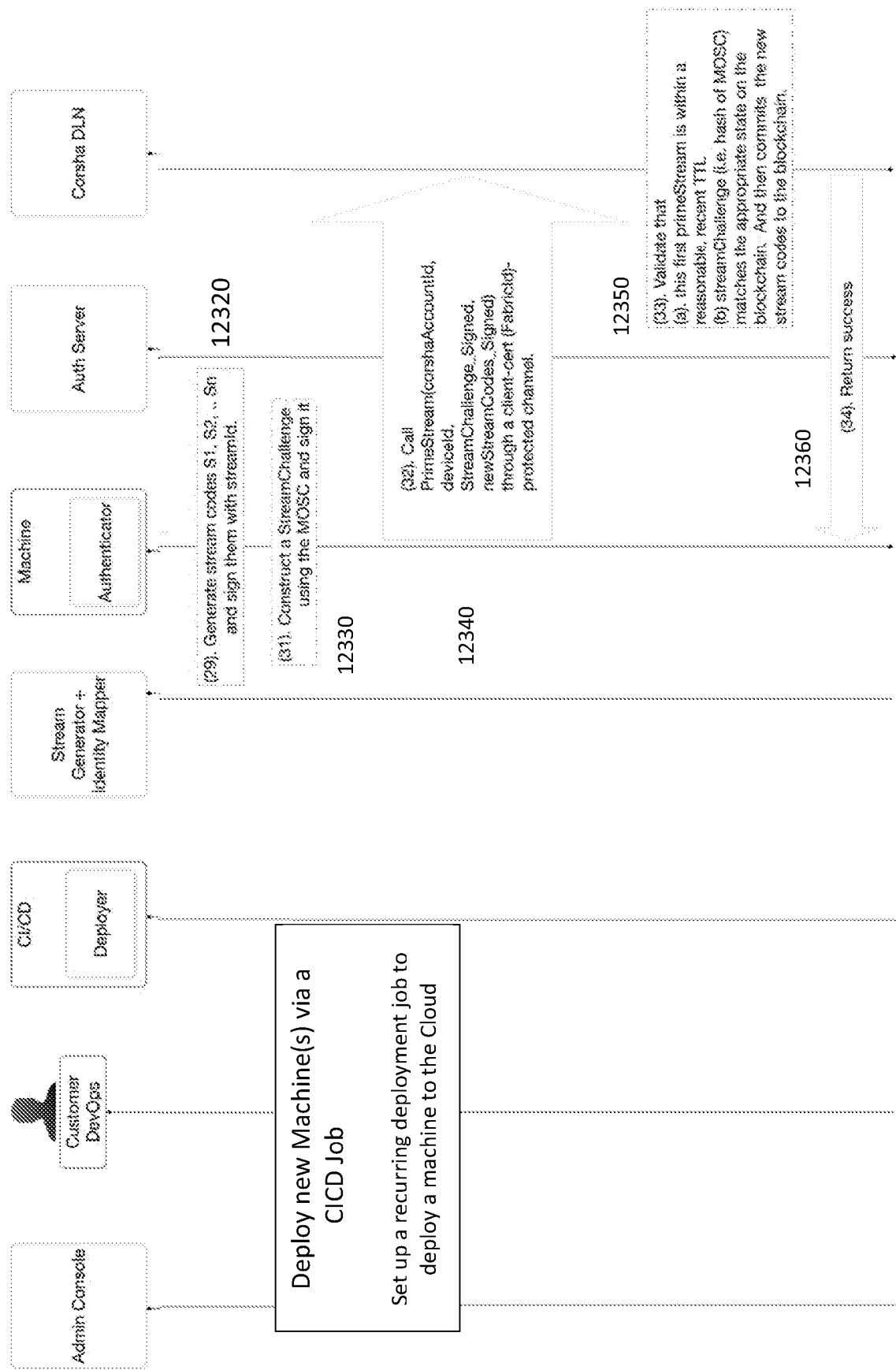

The SG may be a service that initiates and maintains the root stream of the customer enterprise and provides forks off of this root stream. Presenting a valid head of root organization stream may act as the proof of identity and membership necessary for newly deployed client services to register and leverage their own authentication streams. The initialization of an authentication stream of a machine is described below with respect to FIGS. 12A-B.

The stream generator SG may be a command-line or web application server exposed via a remote API or through a web interface. Although FIG. 10 illustrates a particular configuration of the stream generator SG within the customer enterprise network 10300, the configuration of stream generator SG is not limited thereto and the stream generator SG may be implemented together with any component of the customer enterprise network 10300. For example, the stream generator SG may be implemented together with the authentication server AS.

As part of a deployment, the responsible party will host a stream generator that will initialize a root stream with the DLN 10200 as well as authenticate and initialize new machine clients to authenticate with the DLN 10200, for example for a given SaaS offering. New machine authenticators will respectively establish their new streams by taking the head of the current segment of the root stream, presenting that as proof of membership in the organization, and registering their own stream from that point.

A DLN implementation may maintain a ledger of transactions from the machine stream block writing attempts, authentication codes streamed from machine authenticators, transactions using aware machines, deregistration, etc. The DLN 10200 may be designed as a private consortium of nodes, each naturally incentivized to verify the identity of not only their own authentication-driven transactions but also those of other responsible parties on the DLN 10200.

The DLN 10200 may be private and permissioned using a public key infrastructure (PKI) system. Nodes may need to establish their identities with a certificate authority (CA) and then use private key certificates to establish secure communication channels with their peers on the DLN 10200. Accordingly, machine authenticators may be essentially clients of the DLN network 10200 that have minimal functionality of only writing transactions to the DLN 10200, namely stream blocks to update their continual authentication streams.

A primer integrates with the customer deployment server CICD and facilitates the seeding of newly deployed machines, such as physical servers, virtual machines or application containers, on the public or private cloud 10100. When a new machine is deployed, the primer may be adapted to request the stream generator SG to generate a seed such as a fork off the customer root stream. The forked authentication stream may be thereby associated with the newly deployed machine.

The authentication server AS of the customer enterprise network 10300 is an authentication server that validates stream challenges as credentials for API calls received from machines of the private or public cloud 10100 seeking to access the customer enterprise network. For example, the authentication server AS may validate a stream challenge received from the API call of a microservice (e.g., MS2) by verifying the stream challenge against the stream blocks stored in the distributed ledger network 10200 for that particular stream of the particular machine. The authentication server may be a command-line or web application server exposed via a remote API or through a web interface, and may be itself a client of the DLN 10200.

The authentication server AS can read from the DLN 10200. Additionally, the authentication server AS may leverage the same certificate authority (CA) system/certificates to establish secure communication channels between the DLN 10200 and the machine authenticators.

The authentication server AS may support machine registration, validation of transactions, and communication with the DLN 10200. The authentication server AS may authenticate incoming transactions from all machines to enterprise applications of the customer enterprise network 10300. The authentication server AS may monitor, alert on, and handle (grant or deny) transactions as appropriate. In order to authenticate incoming transactions, the authentication server AS may communicate with the DLN 10200.

Once the machine authenticator has initiated its stream with the DLN 10200, the authentication server AS may authenticate the machine to a requested network resource by validating the stream challenge presented by the machine. The stream challenge is, for example, the last 'n' stream blocks from local store of the machine. The authentication server AS uses the stream challenge presented to verify the stream blocks against the distributed ledger network DLN 10200. If the stream challenge is validated, the machine is granted access. Further the authentication system may commit the successful access attempt to the distributed ledger network DLN, thereby adding more fidelity to the hash stream for this particular machine.

The above-described workflow of the system of FIG. 10 requires no interaction on the part of the machine or personnel from the enterprise or any third party, and therefore can be performed frequently, invisibly, and at pre-configured re-authentication intervals.

FIGS. 11A and 11B illustrate a method of initializing a root stream for an organization according to an embodiment of the disclosure.

The method of FIGS. 11A and 11B may be implemented when an organization establishes authentication infrastructure within the enterprise network. Operations for implementing the authentication infrastructure include initializing and instantiating a stream generator, which includes initializing a root stream for the organization that is continually updated and from which a primer integrated with the customer deployment server (e.g., CICD system) may fork stream challenges to deploy new machines.

FIGS. 11A and 11b illustrate operations performed by the stream generator, the authentication server, and the distributed ledger network, which may be the stream generator SG, authentication server AS, and distributed ledger network DLN illustrated in FIG. 10. Interactions and communications between the stream generator, authentication server, and distributed ledger network may be performed over a mutual transport layer security (TLS) channel.

In FIGS. 11A and 11B step 11010, the stream generator generates and securely stores a root stream with an Origin Stream Code (OSC) and a stream public/private key pair to sign all stream blocks that might be provided to the DLN.

In FIGS. 11A and 11B step 11020, the stream generator may invoke a call (InitializeStream) to the distributed ledger network to initialize the authentication stream. Parameters of the call to initialize the authentication stream may include an account identification (accountID), a certificate signing request (CSR) taking a value or an identification of the key pairs (FabridID), and the signed OriginStreamCode (OSC-_streamSigned).

In steps 11030 and 11040, the distributed ledger network may validate a signature of the OriginStreamCode. The validation may include determining whether the OriginStreamCode is associated with more than a predetermined number of authentication streams. If the OriginStreamCode is associated with more than the predetermined number of authentication streams, then it may be determined that information of the OriginStreamCode has been compromised and the authentication stream may not be initialized. The validation may also include determining whether the account identifier is associated with more than a predetermined number of authentication streams. If the account identifier is associated with more than the predetermined number of authentication streams, then it may be determined that information of the account identifier has been compromised and the authentication stream may not be initialized. The validation may further include determining whether an identifier of the OriginStreamCode is unique to the distributed ledger network. If the identifier of the OriginStreamCode is not unique to the distributed ledger network, then it may be determined that information of the authentication stream has been compromised and the authentication stream may not be initialized. The validation may also include determining whether the account identifier is a universally unique identifier (UUID) that does not include private information. If the account identifier is not a UUID omitting private information, then the authentication stream may not be initialized.

In step 11050, the distributed ledger network may create a distributed ledger network identity for the authentication stream by signing the certificate signing request CSR.

In step 11060, the distributed ledger network may modify the authentication stream (MOSC) to add cryptographic entropy, for example to a stream block, and start the authentication stream for the account associated with the account identifier.

As a result, in step 11070, the distributed ledger network may return the first stream block of the stream generator. The return of the call to initialize the authentication stream may include parameters such as the account identifier, the signed certificate signing request CSR, and the modified authentication stream MOSC.

In step 11080, the stream generator may validate the modified authentication stream MOSC and store the modified authentication stream. The stream generator may securely store the modified authentication stream using any cryptographic or security mechanism. The authentication stream, including the first stream block, may be locally stored in memory of the device or server of the enterprise executing the stream generator.

In step 11090, the stream generator may securely store the signed certificate signing request CSR. Again, the signed certificate signing request CSR may be locally stored in memory of the device or server of the enterprise executing the stream generator using any cryptographic or security mechanism.

In step 11100, the authentication server may invoke a call to the authentication server to obtain a distributed ledger configuration. The blockchain configuration may be used by the stream generator to know the location of and communicate with nodes in the distributed ledger network.

In step 11110, the authentication server may return the configuration of the blockchain to the stream generator.

In step 11120, the stream generator may select the particular stream blocks to be provided to the distributed ledger network based on the configuration received from the authentication server. For example, the stream generator may select a quantity of stream blocks or codes (S1, S2, . . . Sn) for initializing the authentication stream. The quantity of stream blocks may be any quantity sufficient to securely initialize the authentication stream such that stream challenges may be appropriately serviced. The stream generator may sign the selected stream blocks or codes with an identifier of the stream (the stream signing key).

In step 11130, the stream generator may construct a stream challenge (StreamChallenge) using the authentication stream MOSC, and sign the stream challenge. The stream challenge may be signed, for example, with the stream signing key.

In step 11140, the stream generator may invoke a call (PrimeStream) to the distributed ledger network to certify and finalize the authentication stream. Parameters of the call to finalize the authentication stream may include an account identifier (accountID), a device identifier of the device or server of the enterprise (deviceID), the signed stream challenge (StreamChallenge signed), and the signed stream codes or blocks (S1, S2, . . . Sn) for finalizing the authentication stream. The call to finalize the authentication stream may be transmitted from the stream generator to the distributed ledger network through a secure channel such as mutualTLS via the Fabric key pair.

In step 11150, the distributed ledger network may commit the new stream codes (S1, S2, . . . Sn) to the blockchain, to thereby initialize the authentication stream. To finalize the authentication stream, the distributed ledger network may determine whether the call (PrimeStream) has been received within a predetermined period of time or time to live (TTL). The predetermined period of time may be a period of time since the distributed ledger network returned a result of the call to initialize the stream in step 11070. The distributed network leger may also verify whether the stream challenge, which may be a hash value of the authentication stream MOSC is valid based on a state of the blockchain.

In step 11160, the distributed ledger network may return a result of the call (PrimeStream) to the stream generator indicating success of finalizing the authentication stream. As a result, stream blocks are committed to the distributed ledger network, and the stream generator may now add stream blocks to the distributed ledger network, as described above. Using the authentication stream, a machine may be authenticated by issuing stream challenges based on the committed stream blocks, and thereby the authentication server may authenticate the machine.

FIGS. 12A-G illustrate a method and diagram of a machine authenticator initializing an authentication stream according to an embodiment of the disclosure.

The method of FIG. 12A-G may be implemented when the authenticator of a computer or a machine seeks to register with the authentication system, to thereby enable access resources on the customer enterprise network. For example, the machine may communicate through APIs to other computers, servers, or services in the customer enterprise network, upon successful authentication. Thus, the machine should establish its identify with the authentication system, for example by the machine verifying its identity using credentials provided by the customer deployment server CICD and the stream generator, then establishing a secure connection to the distributed ledger network, and establishing an authentication stream associated with the machine. The machine may be controlled by a developer of a customer seeking to access the customer enterprise network, for example when deploying a machine or virtual machine to the cloud using a new job of the customer deployment server CICD (i.e., a deployment job that deploys a machine).

FIG. 12A-G illustrate operations performed by an administration console of an administrator of the customer enterprise network, the primer as integrated into customer development server CICD jobs, the stream generator, an authenticator of the machine, the authentication server, and the distributed ledger network, which may be microservices MS1, MS2, or any other type of machine deployed to the private or public cloud, the customer deployment server CICD primer, the stream generator SG, authentication server AS, and distributed ledger network DLN illustrated in FIG. 10. Interactions and communications between the elements of FIG. 12A-G may be performed over a mutual transport layer security (TLS) channel.

In step 12010, an administrator of the customer enterprise network may login to the administration console of the authentication system. In step 12020, the administrator may obtain a secret (PrimerSecret) necessary for deployment of a new machine or instance.

In steps 12030 and 12040, the administrator may add the secret to the customer deployment server for a new job as an environmental variable secret and a machine identifier (machineID), a job identifier (jobID), a build identifier (buildID) as environmental variables for the new job.

In step 12050, the customer deployment server may invoke a call to obtain a deployment payload from the stream generator. Parameters of the call to obtain the deployment payload may include the machine identifier (machineID), the job identifier (jobID), the build identifier (buildID), and the primer secret as obtained from the administrative console of the authentication system.

In step 12060, the stream generator may invoke a call to validate the primer secret to the authentication server. A parameter of the call to validate the primer secret may be the primer secret (PrimerSecret).

In steps 12070 and 12080, the authentication server may validate the primer secret, and return a result of the validation to the stream generator.

In steps 12090 and 12100, the stream generator may obtain a stream challenge for the root stream if the primer secret is valid. The stream generator may store a mapping of the machine identifier and the account identifier of the new authentication stream to be created for the machine to be deployed.

In step 12110, the stream generator returns a deployment payload to the customer deployment server for the new job. The deployment payload may include the account identifier, a root stream identifier (rootStreamID), and a signed root stream challenge (rootStreamChallenge_sgSigned).

Figure 12G:
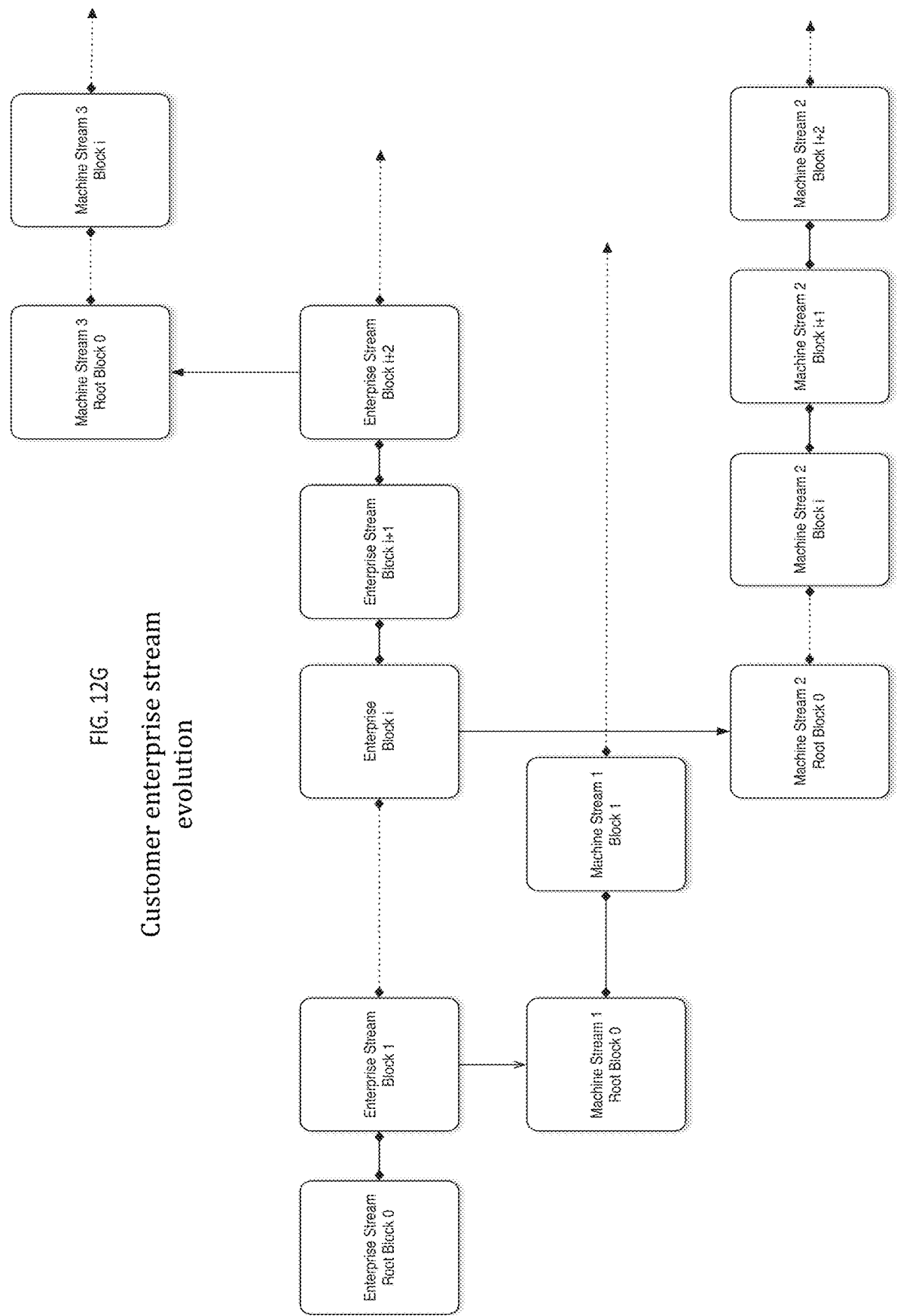

Referring to FIG. 12G, the root stream may be the root enterprise stream of the customer enterprise network. As illustrated in FIG. 12G, the root enterprise stream may include enterprise stream block 0 and enterprise stream block 1. Accordingly, the new authentication stream for a new machine may leverage the existing stream block structure of the root enterprise stream.

In step 12120, the customer deployment server may launch the new machine in accordance with an authenticator of the machine (e.g., MS2).

In step 12130, the authenticator of the machine creates and securely stores the authentication stream and key pairs as OriginStreamCode (OSC) and signs the stream and key pairs with a stream key. The authenticator may be either a Software Development Kit integrated directly into the machine or a standalone binary, application container, or other form factor tightly coupled with the machine.

In step 12140, the machine authenticator invokes a call to register the stream to the authentication server. Parameters of the call to register the stream may include a job identifier (jobID), a build identifier (buildID), an account identifier (accountID), a stream identifier (stream ID), a root payload (rootPayload), a signed authentication stream OSC, and a signed certificate signing request CSR. As described with respect to FIGS. 12A-G, the root payload may include hash values of the stream blocks of the root enterprise stream, such as enterprise stream root block 0 and enterprise stream block 1. Alternatively, the root payload may include the signed enterprise stream root block 0 and signed enterprise stream block 1. Alternatively the root payload may include a signedStreamChallenge constructed from the signed enterprise stream root block 0 and signed enterprise stream block 1.

In step 12150, the authentication server may verify the root stream challenge against the distributed ledger network, and in step 12160 the distributed network ledger may return a result of verifying the stream challenge to the authentication server. A parameter of the call to verify the stream challenge may include the root payload.

As a result, in step 12170, the authentication server may invoke a request to register the new machine to the stream generator. Parameters of the request to register the new machine may include the account identifier (accountID), the job identifier (jobID), the build identifier (buildID), and the stream identifier (streamID). Referring to FIGS. 12A-G, the stream identifier of the new machine may be machine streamID 1.

In steps 12180, 12190, and 12200, the stream generator/identity mapper may verify the identity of the newly deployed machine by performing a lookup operation to verify the machine identifier and store an association of a timestamp, the account identifier, the stream identifier, the job identifier, and the build identifier. For example, the association may be stored in a relational database, lookup table, or other storage mechanism. Thereby, the stream generator/identity mapper may provide a result of registering the new machine in its map to the authentication server.

In steps 12210, 12220, 12230, 12240, 12250, and 12260, the authentication server may initialize the authentication stream. The initialization of the authentication stream may be similar to the initialization of the root stream discussed above with respect to steps 11030 to 11070 in FIGS. 11A and 11B, and therefore a redundant description thereof is omitted. Accordingly, in step 12270, the authentication server returns a signed certificate signing request CSR and the authentication stream MOSC to the machine.

In steps 12280 and 11290, the machine may validate and secretly store the authentication stream MOSC and signed certificate signing request CSR. The validation and storing may be similar the validation and storing discussed above with respect to steps 11080 to 11090 in FIGS. 11A and 11B, and therefore a redundant description thereof is omitted.

In step 12300, the machine may invoke a call to the authentication server to obtain a blockchain configuration. The blockchain configuration may be used by the machine to know the location of and communicate with nodes in the distributed ledger network.

In step 12310, the authentication server may return the configuration of the blockchain to the machine.

In steps 12320 and 12330, the machine may generate stream codes and sign the stream codes, and construct a signed stream challenge using the authentication stream. Referring to FIG. 12G, because the machine authentication stream (machine stream 1) is dependent upon the root enterprise stream, selected stream codes may include one or more enterprise stream root blocks. For example, the selected stream codes may include enterprise stream root block 0, enterprise stream block 1, and machine stream root block 0. In an embodiment, the authentication stream of the machine may not include root enterprise stream blocks. Rather the signed root stream challenge may be used only as identity proof at time of registration. The generation and signing of the stream codes and the stream challenge may be similar to the generation and signing discussed above with respect to steps 11120 to 11130 in FIGS. 11A and 11B, and therefore a redundant description thereof is omitted.

In step 12340, the machine authenticator may invoke a call (PrimeStream) to the distributed ledger network to certify and finalize the authentication stream. Parameters of the call to finalize the authentication stream may include an account identifier (accountID), a device identifier of the machine (deviceID), the signed stream challenge (StreamChallenge signed), and the signed stream codes or blocks (S1, S2, . . . Sn) for finalizing the authentication stream. The call to finalize the authentication stream may be transmitted from the machine authenticator to the distributed ledger network through a client certified protected channel based on a public/private key pair (FabridID).

In step 12350, the distributed ledger network may commit the new stream codes (S1, S2, . . . Sn) to the distributed ledger network, to thereby initialize the authentication stream for the newly deployed machine. To finalize the authentication stream, the distributed ledger network may determine whether the call (PrimeStream) has been received within a predetermined period of time or time to live (TTL). The predetermined period of time may be a period of time since the distributed ledger network returned a result of the call to initialize the stream in step 12260. The distributed network leger may also verify whether the stream challenge, which may be a hash value of the authentication stream MOSC is valid based on a state of the blockchain.

In step 12360, the distributed ledger network may return a result of the call (PrimeStream) to the machine indicating success of finalizing the authentication stream. As a result, stream blocks are committed to the distributed ledger network, and the machine authenticator may now add stream blocks to the distributed ledger network, as described above. For example, as illustrated in FIG. 12G, additional stream blocks may be added to machine stream 1, such that the machine does then have further authentication access using its fully primed stream owing to the newly issued stream blocks (1, 2 . . . , etc.) that are appended to the its stream. Using the authentication stream, the machine may be authenticated by issuing stream challenges based on the committed stream blocks, and thereby the authentication server may authenticate the machine.

Figure 13:
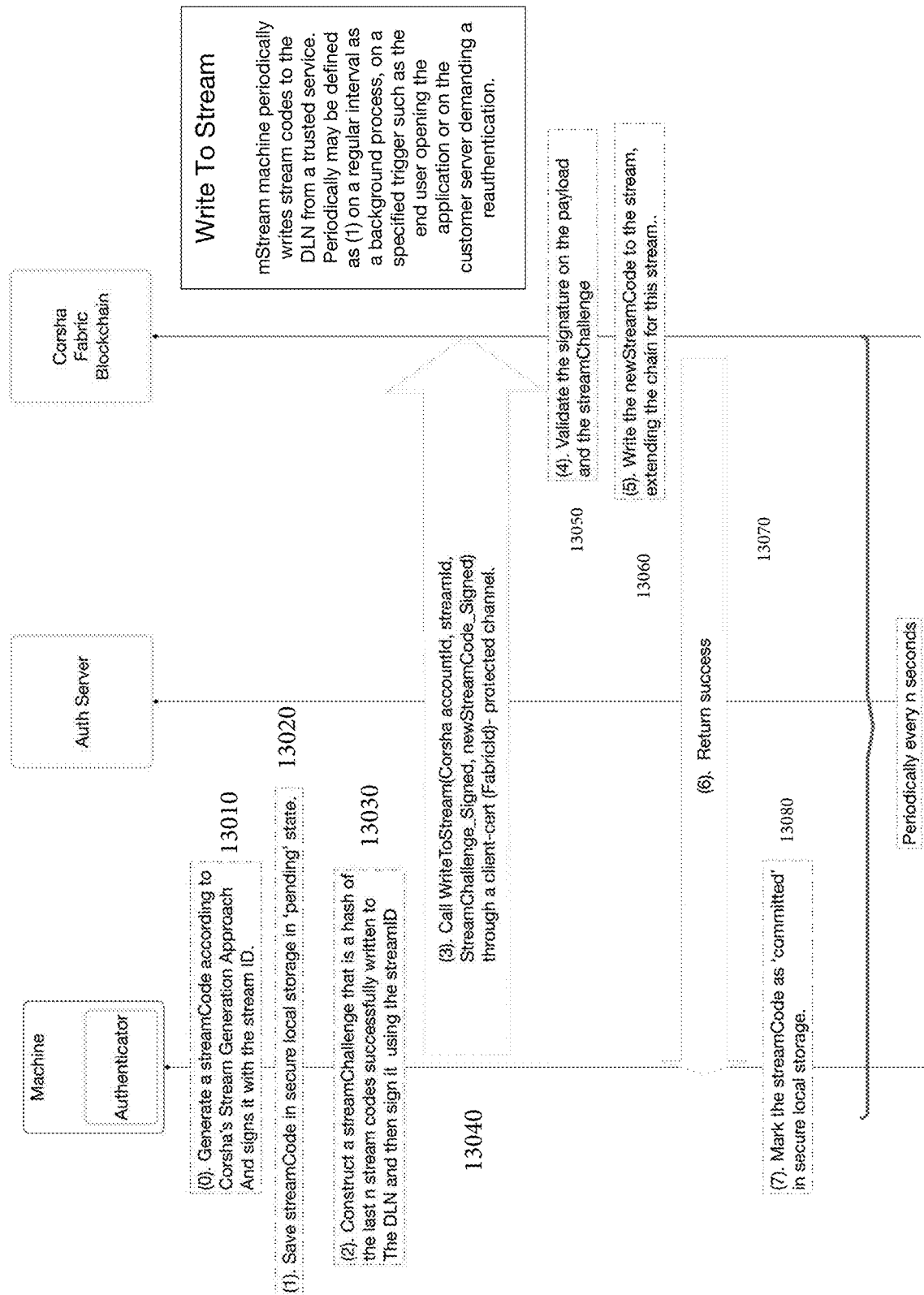
FIG. 13 illustrates a method of a machine authenticator writing stream blocks to an authentication stream according to an embodiment of the disclosure.

FIG. 13 illustrates a method of a machine authenticator writing stream blocks to an authentication stream according to an embodiment of the disclosure.

The method of FIG. 13 may be implemented when an authenticator representing a computer, machine, or other machine periodically writes stream codes or blocks to the distributed ledger network. For example, once the stream generator or machine authenticator has successfully registered an authentication stream, continuous authentication may be performed over time, as desired or requested. The periodic writing of the stream codes or blocks, such as a quantity of most recently written stream codes or blocks, to the distributed ledger network may performed on a regular interval as a background process, or based on a specified trigger or event, such as execution of an application seeking access to data or services on the customer enterprise network or an entity, machine, server, or service on the customer enterprise network requesting authentication of the machine. The stream codes or blocks represent the stream or proof challenge necessary to write a next stream code or block to the distributed ledger network and authenticate for access to resources. Interactions and communications between the elements of FIG. 13 may be performed over a mutual transport layer security (TLS) channel.

FIG. 13 illustrates operations performed by the machine authenticator, the authentication server, and the distributed ledger network, which may be a microservice (e.g., MS2), the authentication server AS, and the distributed ledger network DLN illustrated in FIG. 10.

In step 13010, 13020, and 13030, the machine authenticator of a service thereof (e.g., MS2) may generate a stream code or block. The stream code or block may be signed with the stream identifier (streamID). Generation of the stream codes or blocks has been described above with respect to FIGS. 1 to 3, and a redundant description thereof is omitted.

In step 13040, the machine authenticator may invoke a call to write a stream block or code of the authentication stream to the distributed ledger network. Parameters of the call to write a new stream block or code to the authentication stream stored on the distributed ledger network may include an account identifier of the machine (accountID), a stream identifier (streamID), a signed stream challenge (StreamChallenge Signed), and a new stream code or block to be appended to the authentication stream (newStreamCode Signed). The call to write a stream block or code may be transmitted from the machine authenticator to the distributed ledger network through a mutual TLS protected channel using a PKI key pair (FabricID).

In steps 13050 and 13060, the distributed ledger network may validate the signature on the payload and the stream challenge and commit the new stream code or block to the authentication stream in the DLN. Once the new stream code or block is appended, the authentication stream becomes extended by this additional stream code or block. As a result, subsequent authentication challenges may be predicated based on this additional stream code or block, in addition to some quantity and identity of previously committed stream blocks in the authentication stream. In step 13070, the distributed ledger network returns a result (success or failure) of writing the new stream code or block to the machine authenticator.

In step 13080, the machine authenticator marks the new stream code or block as committed in a local storage facility that has persistence and is ideally secure storage. As a result, subsequent authentication challenges predicated based on this additional stream code or block, in addition to some quantity and identity of previously committed stream blocks in the authentication stream, may be submitted by the machine.

Figure 14A:
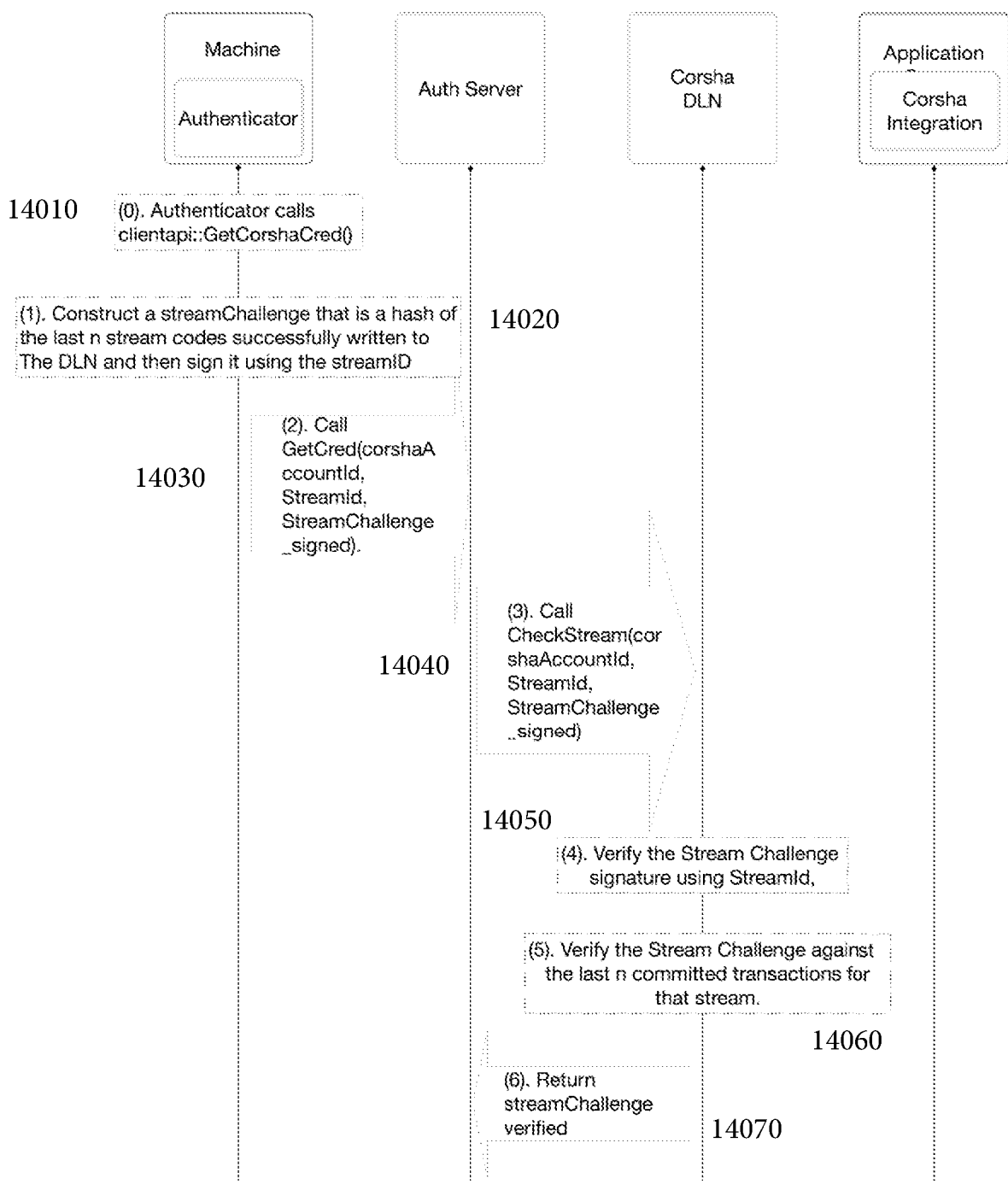
FIGS. 14A and 14B illustrate a method of a machine requesting access to data or services on a customer enterprise network.
Figure 14B:
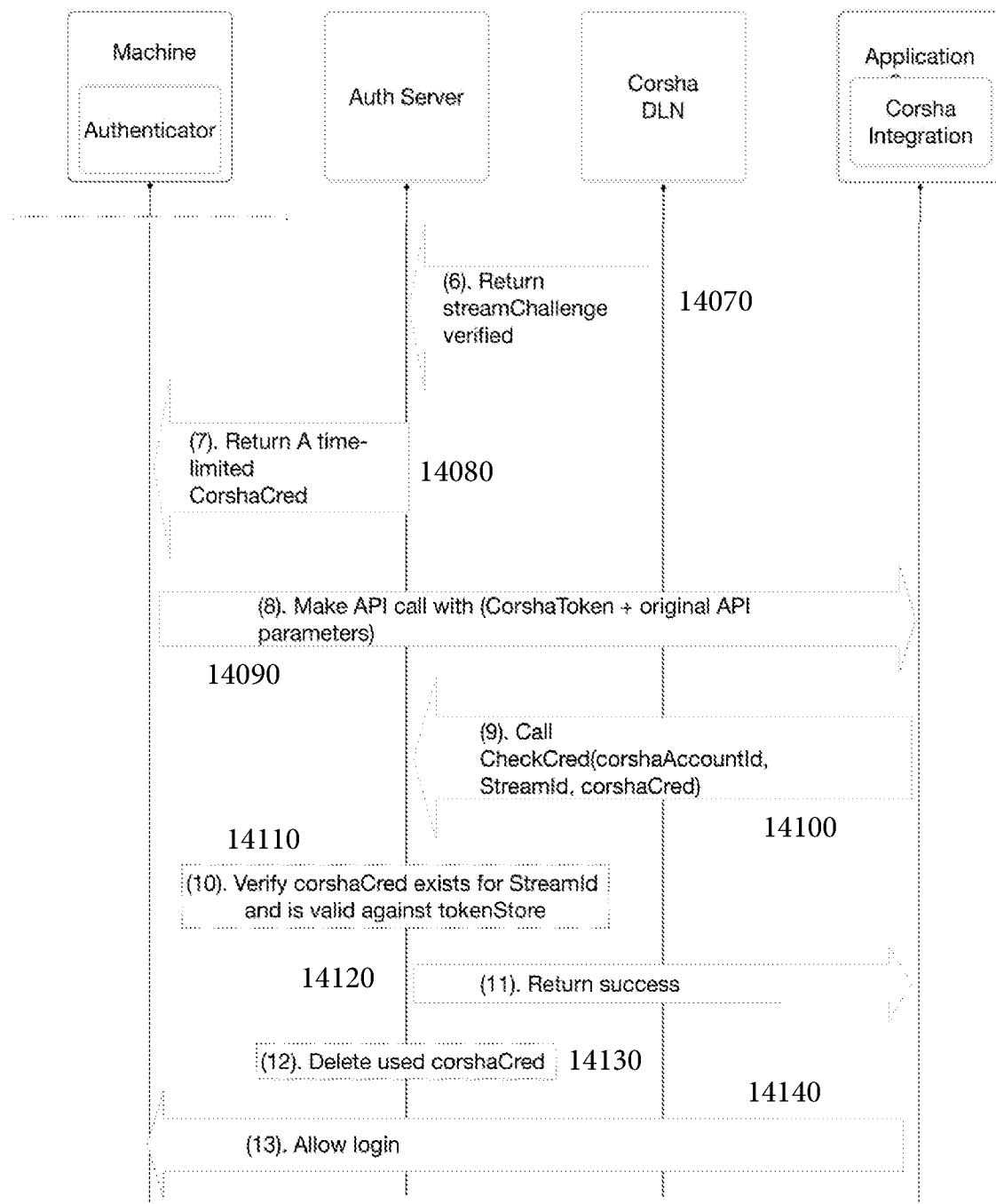

FIGS. 14A-B illustrate a method of a machine requesting access to data or services on a customer enterprise network.

The method of FIGS. 14A-B may be implemented when the authenticator of a machine has successfully registered a stream, has periodically updated the authentication stream with supplemental stream codes or blocks, and the machine requests to access data or services in the customer enterprise network via authenticated API requests. Thus, the stream blocks or codes of the authentication stream associated with the machine may now be leveraged to perform authenticated API requests for services and data.

In the embodiment of FIGS. 14A-B, the stream challenge presented by the machine may be a quantity of the most recently committed stream codes or blocks, for example the three most recent stream blocks or codes of the authentication stream. Alternatively, as described above, a selection of various stream blocks or codes may be configured to be provided by the authentication system. The stream codes submitted as proof in the authentication challenge may be compared against those stored on the distributed ledger network. Accordingly, such authentication challenge markedly improves upon other static or heuristically-driven API authentication approaches.

FIGS. 14A-B illustrate operations performed by the machine authenticator, the machine, the authentication server, the distributed ledger network, and the application server, which may be a microservice (e.g., MS1) as the machine, the authentication server AS, and the distributed ledger network DLN illustrated in FIG. 10, as well as an application server of the customer enterprise network providing data or a service to be accessed by the machine. Interactions and communications between the elements of FIGS. 14A-B may be performed over a secure mutual transport layer security (TLS) channel.

In steps 14010 and 14020, the machine invokes a call to obtain authentication credentials via the client API and constructs a stream challenge requesting authentication. The stream challenge may be a hash value of a quantity of the most recent stream codes or blocks written to the authentication stream associated with the machine. Alternatively, the stream challenge may include the most recent stream codes or blocks written to the authentication stream. The stream challenge is then signed using the stream identifier (streamID).

In step 14030, the machine authenticator invokes a call to obtain authentication credentials from the authentication server. The authentication credentials may be, for example, a token for authorization to access services or data provided by the application server of the customer enterprise network. Parameters of the call to obtain authentication credentials may include an account identifier (accountID), an authentication stream identifier (streamID), and the signed stream challenge (StreamChallenge signed).

In step 14040, the authentication server may invoke a call to verify the authentication stream to the distributed ledger network. Parameters of the call to verify the authentication stream may include the account identifier (accountID), the authentication stream identifier (streamID), and the signed stream challenge (StreamChallenge signed).

In step 14050, the distributed ledger network may verify the stream challenge using the stream identifier (streamID).

If the authentication stream is verified, in step 14060, the distributed ledger network may compare the payload of stream blocks or codes, hash values thereof, etc., against the stream blocks or codes stored on the distributed ledger network.

In steps 14070, the distributed network ledger may return a result of verify the stream challenge to the authentication server, and if verified the authentication server may then return a result of the request for credentials to the machine authenticator in step 14080. The credentials returned by the authentication server to the machine authenticator may be any form of credential, for example a token. The token may be a time-limited token or a use-limited token, thereby providing additional security and redundancy to the authentication system.

In step 14090, the machine may invoke an API call to access a service, data, or other resource provided by the application server of the customer enterprise network. The API call may include the credentials provided by the application server and any other parameters of the API required by the application server.

In step 14100, the application server may invoke a call to the authentication server to verify the credentials of the machine. The call to verify the credentials of the machine may include an account identifier (accountID) of the machine authenticator, a stream identifier (streamID) associated with the machine, and the credentials provided to the application server by the machine.

In steps 14110 and 14120, the authentication server may verify the credentials, and return a result of the verification to the application server. In the instance in which the credentials are a time-limited token or a use-limited token, the authentication server may delete reference to the credentials upon expiration or consumption thereof.

As a result, in step 14130, the application server may grant access to resources, data, or services requested by the machine.

Figure 15A:
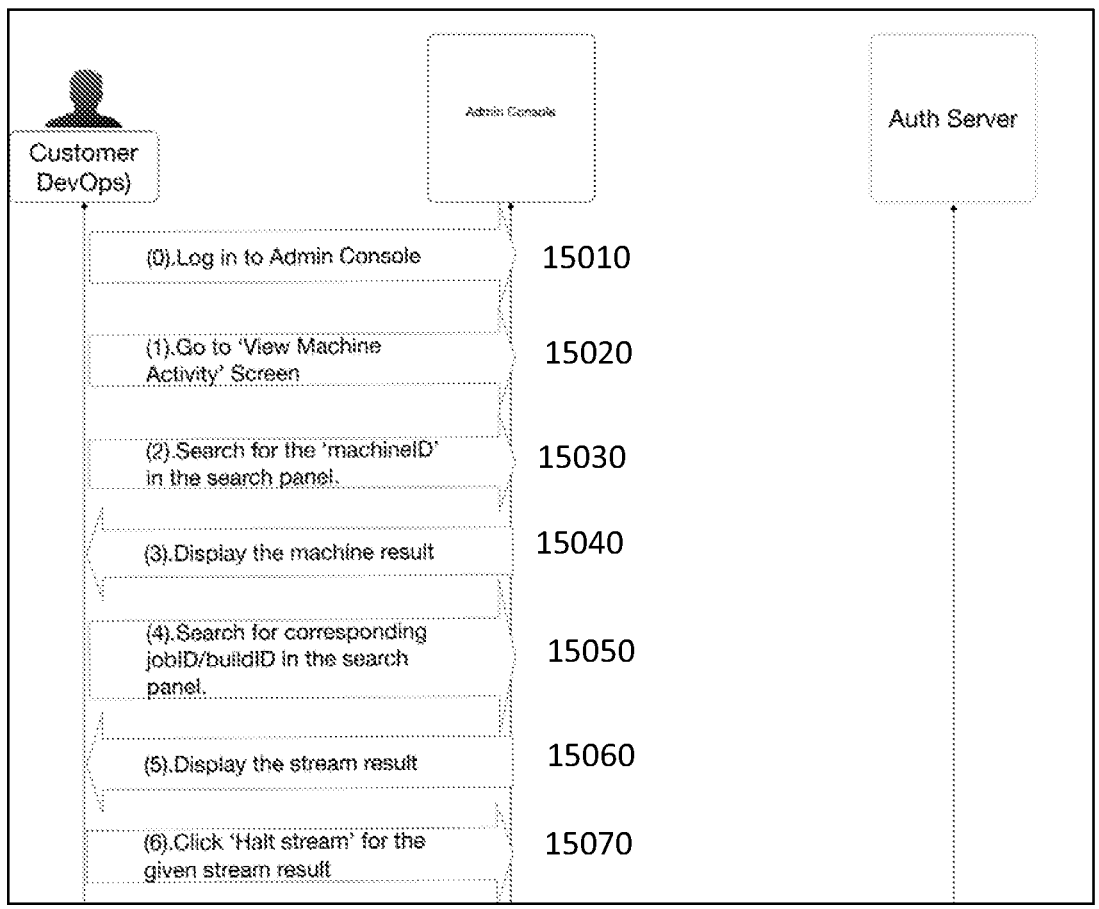
FIGS. 15A and 15B illustrate a method of halting a stream according to an embodiment of the disclosure.
Figure 15B:
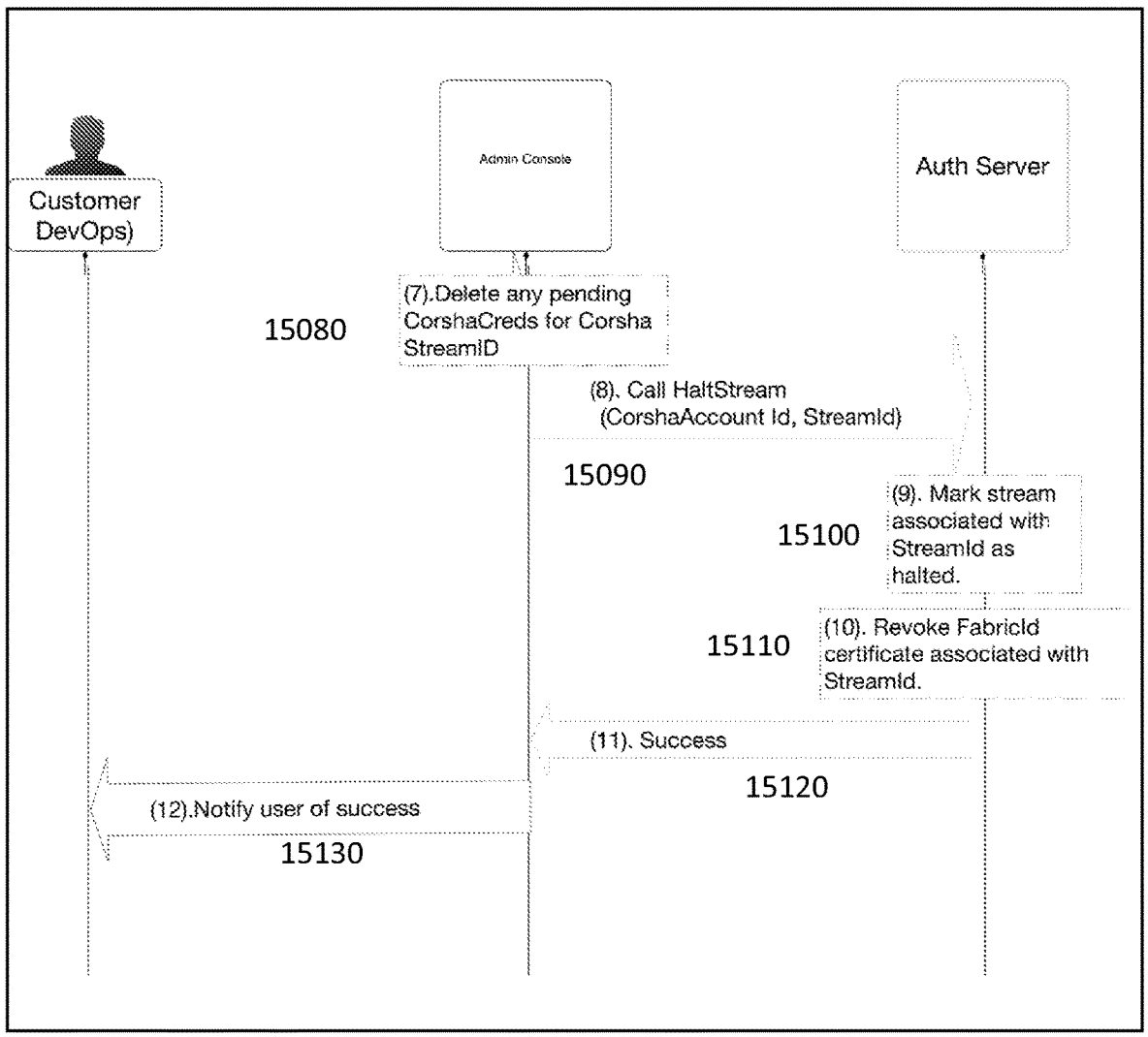

FIGS. 15A-B illustrate a method of halting a stream according to an embodiment of the disclosure.

The method of FIGS. 15A-B may be implemented when an administrator halts an authentication stream of a deployed machine, virtual machine, or other machine type. The administrator may have knowledge of the machine identifier (machineID), build identifier (buildID), and job identifier (jobID) of the deployed machine, virtual machine, or other machine type.

FIGS. 15A-B illustrate operations performed by the authentication server and the distributed ledger network, which may be the authentication server AS and distributed ledger network DLN illustrated in FIG. 10, as well as an administration console through which the administrator may manage the machine.

In steps 15010 and 15020, the administrator may access the administration console and view a user interface for deployed machine entities. The user interface may include any user interface identifying or showing a diagram, listing, or other screen of deployed machine entities controllable by the administrator.

In step 15030, the administrator may request to search for a particular machine via the user interface. For example, the administrator may search according to the machine identifier (machineID) of the deployed machine, virtual machine, or other machine type.

In step 15040, the administration console may return a result of the search. The result of the search may display a selectable representation of the machine, such as the machine associated with the machine identifier.

In step 15050, the administrator may request to search for a particular machine via the user interface. For example, the administrator may search according to the build identifier or the job identifier of the deployed machine, virtual machine, or other machine type.

In step 15060, the administration console may return a stream result. The result of the search may display a selectable representation of the stream, such as the stream associated with the stream identifier.

In step 15070, the administrator may provide a command via the user interface to halt the authentication stream. The command to halt the authentication stream may be a command to suspend the stream or terminate the authentication stream.

In step 15080, the administration console may delete any pending credentials for the authentication stream corresponding to the stream identifier.

In step 15090, based on the command to halt the stream, the administration console may invoke a call to halt the authentication stream to the authentication server. Parameters of the call to halt the authentication stream may include the account identifier (accountID) and the stream identifier (streamID).

In steps 15100 and 15110, the authentication server may halt the authentication stream associated with the stream identifier, and may revoke a key pair associated with the stream identifier.

In step 15120, the authentication server may provide a result of halting the authentication stream to the administrator via the authentication console.

Figure 16A:
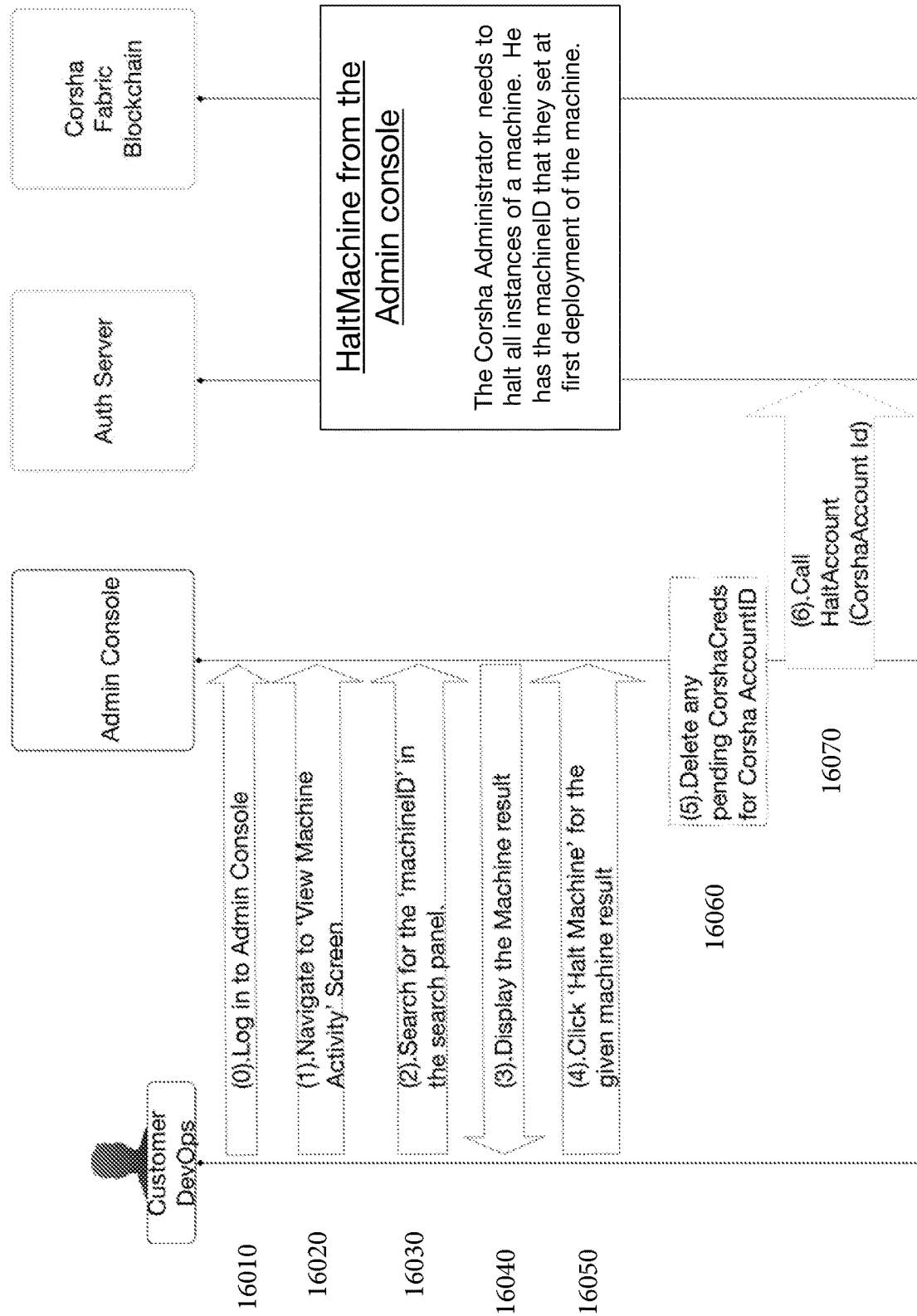
FIGS. 16A and 16B illustrate a method of halting a machine according to an embodiment of the disclosure.
Figure 16B:
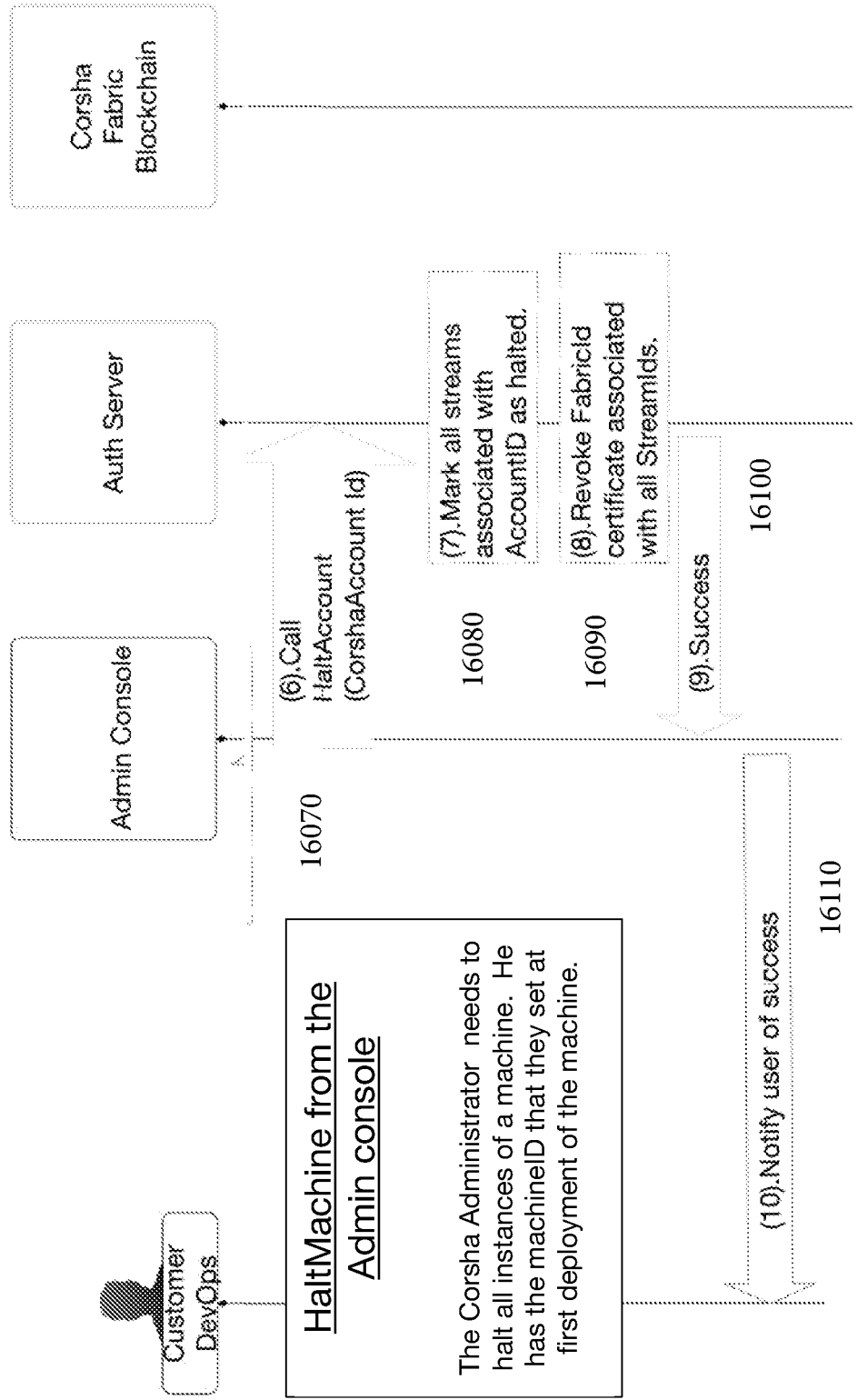

FIGS. 16A-B illustrate a method of halting a machine according to an embodiment of the disclosure.

The method of FIGS. 16A-B may be implemented when an administrator halts a deployed machine, virtual machine, or other machine type. The administrator may have knowledge of the machine identifier (machineID) of the deployed machine, virtual machine, or other machine type.

FIGS. 16A-B illustrate operations performed by the authentication server and the distributed ledger network, which may be the authentication server AS and distributed ledger network DLN illustrated in FIG. 10, as well as an administration console through which the administrator may manage the machine.

In steps 16010 and 16020, the administrator may access the administration console and view a user interface for deployed machines. The user interface may include any user interface identifying or showing a diagram, listing, or other screen of deployed machines controllable by the administrator.

In step 16030, the administrator may request to search for a particular machine via the user interface. For example, the administrator may search according to the machine identifier (machineID) of the deployed machine, virtual machine, or other machine type.

In step 16040, the administration console may return a result of the search. The result of the search may display a selectable representation of the machine, such as the machine associated with the machine identifier.

In step 16050, the administrator may provide a command via the user interface to halt the machine. The command to halt the authentication stream may be a command to halt the machine and all deployed authentication streams associated with the machine.

In step 16060, the administration console may delete any pending credentials for the machine corresponding to the machine identifier.

In step 16070, based on the command to halt the stream, the administration console may invoke a call to halt the authentication stream to the authentication server. Parameters of the call to halt the authentication stream may include the account identifier (accountID) associated with the machine.

In steps 16080 and 16090, the authentication server may halt the machine associated with the account identifier, and may revoke key pairs associated with all streams associated with stream identifiers of the machine.

In steps 16100 and 16110, the authentication server may provide a result of halting the machine to the administrator via the authentication console.

The systems, architectures, and frameworks of the disclosure may be implemented using any of various servers, computers, virtual machines, and other computing devices. The servers, computers, virtual machines, and other computing devices may include hardware and software for implementing the embodiments of the disclosure. For example, the servers, computers, virtual machines, and other computing devices may include hardware, such as one or more processors, one or more non-transitory memories (e.g., RAM, ROM, disk) storing computer-readable instructions, communication interfaces for communicating with other servers, computers, virtual machines, and other computing devices over computer networks. The processors may access the computer-readable instructions, which may be stored in the form of computer programs, to implement the embodiments of the disclosure. The computer programs may be software that is executed by one or more processors for controlling the servers, computers, virtual machines, and other computing devices to perform functions of the embodiments of the disclosure.

The invention claimed is:

1. A system for machine-to-machine authentication, the system comprising:
   a stream generator configured to generate a root enterprise stream;
   the root enterprise stream comprising enterprise stream blocks;
   a deployment server configured to deploy a machine;
   the deployment server being adapted to deploy the machine so as to have a respective machine authenticator;
   a primer adapted to communicate with the deployment server;
   the primer being further adapted to request a seed, from the stream generator, for the machine;
   the stream generator being adapted to generate the seed, for the machine, based at least on at least one of the enterprise stream blocks;
   the deployment server being configured to deploy the machine so that, when the machine is a deployed machine, the respective machine authenticator of the deployed machine generates a machine authentication stream;
   the machine authentication stream comprising machine stream blocks; and
   the respective machine authenticator of the deployed machine generating the machine authentication stream based on the seed generated by the stream generator.

2. The system of claim 1, wherein the machine authentication stream of the deployed machine is based on a fork of the root enterprise stream.

3. The system of claim 2, wherein the fork of the root enterprise stream is created by forking at least one of the enterprise stream blocks.

4. The system of claim 1, wherein:
   the machine is configured by the deployment server such that the respective machine authenticator, of the deployed machine, services the deployed machine with stream challenge requests, completes stream registration for the machine stream of the deployed machine, and manages the machine stream.

5. The system of claim 1, wherein the seed is based also on one or more of:
   a machine identifier of the machine,
   a job identifier of a deployment job that deploys the machine, and
   an environmental variable secret associated with at least one of the machine and the deployment job.

6. The system of claim 1, wherein the stream generator is further configured to:
   initialize the root enterprise stream to a distributed ledger network comprising a plurality of distributed nodes, each node among the plurality of distributed nodes storing the enterprise stream blocks.

7. The system of claim 6, further comprising:
   a memory configured to securely store the enterprise stream blocks.

8. The system of claim 6, wherein the stream generator is further configured to:
   select the enterprise stream blocks,
   sign the enterprise stream blocks with a signing key associated with the root enterprise stream, and
   transmit the enterprise stream blocks, signed with the signing key, to the distributed ledger network.

9. The system of claim 6, further comprising: an authentication server configured to:
   receive a root stream challenge, from the respective machine authenticator of the deployed machine, to initialize the machine authentication stream,
   perform a verification of the root stream challenge based on retrieving at least one of the enterprise stream blocks from the distributed ledger network, and
   initialize the machine authentication stream based on a result of the verification.

10. The system of claim 9, wherein the respective machine authenticator of the deployed machine is configured to transmit the machine stream blocks to commit them to the distributed ledger network.

11. The system of claim 10, wherein the machine stream blocks comprise at least one first machine stream block that is based on the at least one of the enterprise stream blocks and at least one second machine stream block generated by the respective machine authenticator of the deployed machine.

12. The system of claim 11, further comprising:
   an application server;
   the deployed machine being configured to request an access to the application server;
   the authentication server being configured to receive a stream challenge, generated by the respective machine authenticator of the deployed machine, relating to the access to the application server;
   the stream challenge comprising a payload;
   the payload comprising a hash value of at least one of the machine stream blocks;

the authentication server being configured to verify the stream challenge by checking the payload against the distributed ledger network to produce an authentication result; and the machine accessing the application server depending on the authentication result.

* * * * *